United States Patent
Hasegawa

(10) Patent No.: US 7,734,377 B2
(45) Date of Patent: Jun. 8, 2010

(54) GAIT GENERATOR OF LEGGED MOBILE ROBOT

(75) Inventor: Tadaaki Hasegawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 520 days.

(21) Appl. No.: 11/576,656

(22) PCT Filed: Jul. 28, 2005

(86) PCT No.: PCT/JP2005/013842
§ 371 (c)(1),
(2), (4) Date: Apr. 4, 2007

(87) PCT Pub. No.: WO2006/040868
PCT Pub. Date: Apr. 20, 2006

(65) Prior Publication Data
US 2008/0133055 A1    Jun. 5, 2008

(30) Foreign Application Priority Data
Oct. 15, 2004  (JP) .......................... 2004-300911

(51) Int. Cl.
*G05B 13/04* (2006.01)
(52) U.S. Cl. .................. 700/252; 901/1; 901/47
(58) Field of Classification Search .......... 700/245, 700/252, 54; 901/1, 47
See application file for complete search history.

(56) References Cited

U.S. PATENT DOCUMENTS

| | | | |
|---|---|---|---|
| 6,289,265 B1 * | 9/2001 | Takenaka et al. | 700/245 |
| 6,564,888 B1 * | 5/2003 | Gomi et al. | 180/8.6 |
| 6,832,132 B2 * | 12/2004 | Ishida et al. | 700/245 |
| 2002/0022907 A1 * | 2/2002 | Takenaka et al. | 700/245 |
| 2004/0044440 A1 * | 3/2004 | Takenaka | 700/245 |

FOREIGN PATENT DOCUMENTS

EP    1 798 004    6/2007

(Continued)

OTHER PUBLICATIONS

"The Virtual Robot Platform", Scholarly Journal of the Robotics Society of Japan, vol. 19, No. 1, pp. 28-36, Jan. 2001, English abstract included.
"Pushing Manipulation by a Humanoid Robot", K. Harada et al., pp. 115-116, Nov. 26, 2002, English abstract included.

(Continued)

*Primary Examiner*—Khoi Tran
*Assistant Examiner*—Rodney King
(74) *Attorney, Agent, or Firm*—Rankin, Hill & Clark LLP

(57) ABSTRACT

A gait generator determines a desired motional trajectory and a desired object reaction force trajectory of an object 120 for a predetermined period after the current time by using an object dynamic model while supplying, to the object dynamic model, a model manipulated variable (estimated disturbance force) for bringing a behavior of the object 120 on the object dynamic model close to an actual behavior, and provisionally generates a gait of a robot 1 for a predetermined period by using the aforesaid determined trajectories. Based on the gait and an object desired motion trajectory, a geometric restrictive condition, such as interference between the robot 1 and the object 120, is checked, and a moving plan for the object 120 or a gait parameter (predicted landing position/posture or the like) of the robot 1 is corrected as appropriate according to a result of the check, so as to generate a gait of the robot 1. Thus, a desired gait that satisfies a predetermined geometric restrictive condition related to the interference between the robot 1 and an object is generated by reflecting an actual environmental condition in real time while carrying out the operational control of the robot 1.

5 Claims, 25 Drawing Sheets

FOREIGN PATENT DOCUMENTS

| | | |
|---|---|---|
| JP | 05-324115 | 12/1993 |
| JP | 10-086080 | 4/1998 |
| JP | 10-230485 | 9/1998 |
| JP | 2002-326173 | 11/2002 |
| JP | 2004-209614 | 7/2004 |
| JP | 2005-115654 | 4/2005 |
| WO | 02/40224 | 5/2002 |
| WO | 03/057427 | 7/2003 |

OTHER PUBLICATIONS

"Motion Generation of Humanoids based on Object Trajectory Description", Kei Okada et al., University of Tokyo, English abstract included.

* cited by examiner

GAIT GENERATOR OF LEGGED MOBILE ROBOT

TECHNICAL FIELD

The present invention relates to a device for generating a desired gait for causing a legged mobile robot to perform an operation of moving an object while controlling motions of the robot such that the desired gait is followed.

BACKGROUND ART

When causing a legged mobile robot, such as a bipedal mobile robot, to perform an operation of, for example, moving a certain object by pushing, the robot is subjected not only to a floor reaction force from a floor with which a distal portion of a leg body thereof is in contact but also to a reaction force from the object. The reaction force received by the robot from the object as described above will be referred to as an object reaction force in the present description.

As a technology for generating a gait of a robot in a state wherein an object reaction force is acting on a legged mobile robot, or for carrying out motion control, there has been known a technology disclosed in, for example, Japanese Patent Application Laid-Open Publication No. H10-230485 by the inventor of the present application (hereinafter referred to as Patent Document 1). According to the technology, a desired gait is generated such that a dynamic balance condition in which a component (horizontal component), excluding a vertical component, of a moment produced about a desired ZMP (a desired floor reaction force central point) by a resultant force of an inertial force produced due to a motion of a robot and the gravity and an object reaction force acting on the robot is zero (a floor reaction force acting on the desired floor reaction force central point and the aforesaid resultant force are balanced with each other) is satisfied, and the motions of the robot are controlled so that the desired gait is followed. Furthermore, according to the technology, even if an external force acting on the robot turns into an unexpected external force (even if a difference between a desired external force and an actual external force increases to a certain extent), a desired gait of the robot is adjusted such that a position of the center of gravity of the robot is balanced to a position of the center of gravity that makes it possible to maintain the dynamic balance of the robot.

Further, as a technology for simulating the behaviors of a bipedal mobile robot (humanoid robot), there has been known a technology disclosed in Scholarly Journal of the Robotics Society of Japan/Vol. 19/No. 1, pp. 28~36, 2001/"Virtual Robot Platform" (hereinafter referred to as Non-Patent Document 1).

Meanwhile, when generating a desired gait of a robot for performing an operation of moving an object, generally, environmental conditions (the configuration of a floor, a frictional force condition, etc.) for moving the object are assumed, and then the basic parameters for generating a gait that define, for example, the trajectory of an object reaction force (a time series pattern), the motion trajectory of the object (the time series pattern of the movement position/posture of the object), and the motion trajectory of a distal portion of each leg body of the robot are determined on the basis of a plan for moving the object (such as a plan that specifies the timing and the method for moving the object). Then, by using the determined parameters, a desired gait of the robot is generated such that a dynamic restrictive condition (e.g., a condition that a ZMP satisfying the aforesaid dynamic balance condition lies within a ground contact surface of the robot) is satisfied under the aforesaid assumed environmental condition.

In this case, if the moving plan or the parameters for generating a gait are inappropriate, then a desired gait that fails to satisfy a geometric restrictive condition, such as the one in which the body of the robot does not bump against an object or in which an arm body of the robot to be engaged with the object does not exceed a movable range, may be inconveniently generated.

Hence, a solution is conceivable in which, for example, a desired gait is generated while simulating behaviors of a robot thereby to check whether a geometric restrictive condition is satisfied by applying the technology shown in the aforesaid Non-Patent Document 1 to the technology shown in the aforesaid Patent Document 1.

However, the technology shown in the aforesaid Non-Patent Document 1 is adapted to simulate (predict) a behavior of a robot on the assumption of a certain environmental condition, so that if an actual environmental condition differs from an assumed environmental condition (this situation frequently occurs), then a situation in which a generated desired gait actually fails to satisfy the aforesaid geometric restrictive condition frequently takes place.

The present invention has been made in view of the background described above, and it is an object of the invention to provide a gait generator of a legged mobile robot that is capable of generating a desired gait that makes it possible to satisfy a predetermined geometric restrictive condition related to the interference or the like between the robot and an object by reflecting an actual environmental condition in real time while controlling a motion of the robot.

DISCLOSURE OF INVENTION

To fulfill such an object, according to a first invention of a gait generator of a legged mobile robot in accordance with the present invention, there is provided a gait generator of a legged mobile robot for generating a desired gait for causing the legged mobile robot equipped with a plurality of leg bodies extended from its body to perform an operation for moving an object while actuating the robot such that the desired gait is followed, including:

an object dynamic model representing a relationship between forces acting on an object and motions of the object;

a model manipulated variable determining means for determining a model manipulated variable to be imparted to the object dynamic model in order to bring a behavior of the object on the object dynamic model close to a behavior of the actual object while observing the behavior of the actual object when actuating the robot such that the desired gait is followed;

a between-robot-and-object action force trajectory provisionally determining means for provisionally determining, on the basis of at least a moving plan of the object and a motion state amount of the object on the object dynamic model, the trajectory of a desired action force between the robot and the object, which is a desired trajectory of an action force between the object and the robot in a predetermined period after the present time such that the motion state amount follows the motion state amount of the object based on the moving plan while imparting the determined model manipulated variable to the object dynamic model when generating a new desired gait to be followed by the robot;

an object motion trajectory provisionally determining means for provisionally determining a desired motion trajectory of the object in the predetermined period by using the object dynamic model by inputting the provisionally determined trajectory of the desired action force between the robot and the object to the object dynamic model while imparting the determined model manipulated variable to the object dynamic model;

a robot gait provisionally generating means for provisionally determining a gait parameter to be used to generate a desired gait of the robot on the basis of at least the provisionally determined desired motion trajectory of the object and the provisionally determined trajectory of the desired action force between the robot and the object and for provisionally generating a desired gait of the robot in the predetermined period by using the provisionally determined gait parameter;

a restrictive condition determining means for determining whether a predetermined geometric restrictive condition related to at least one of the object and the robot is satisfied on the basis of the provisionally determined desired motion trajectory of the object and a motion trajectory of the provisionally generated desired gait of the robot; and a correcting means for selecting at least one of the moving plan, the provisionally determined gait parameter, and the provisionally determined desired motion trajectory of the object as a correction target and for correcting the correction target so as to satisfy the geometric restrictive condition if the geometric restrictive condition is not satisfied, wherein the new desired gait is generated by using the correction target that has been corrected.

According to the first invention described above, a desired trajectory of action force between a robot and an object and a desired motion trajectory of the object are provisionally determined by the between-robot-and-object action force provisionally determining means and the object motion trajectory provisionally determining means, respectively, while imparting the model manipulated variable to an object dynamic model (this being a forward dynamic model). This arrangement ensures the desired trajectory of action force between the robot and the object and the desired motion trajectory to be highly accurate (reliable) as predicted trajectories of an actual trajectory of action force between the robot and the object and an actual motion trajectory of the object in a predetermined period after the present point. As the model manipulated variable, of the forces that actually act on the object, an external disturbance force applied from something other than the robot (a frictional force or the like applied to an object from a floor) or a force defining it may be used. Further, a motion state amount to be followed when provisionally determining the desired trajectory of action force between the robot and the object may be, for example, a moving speed of the object.

Moreover, a gait parameter of the robot is determined on the basis of the desired trajectory of action force between the robot and the object and the desired motion trajectory of the object provisionally determined as described above, and then a desired gait in the predetermined period is provisionally generated; therefore, the provisionally generated desired gait is also highly accurate (reliable) as the predicted gait of an actual robot in the predetermined period after the present point. The gait parameter may be, for example, a parameter that defines a motion trajectory of each leg body of the robot (e.g., a predicted landing position or predicted landing time of each leg body) or a parameter that defines the trajectory of a desired ZMP or a desired floor reaction force central point. In this case, a desired gait may be provisionally generated on the basis of a gait parameter such that, for example, a predetermined dynamic balance condition in which a horizontal component of a moment generated about a desired ZMP by the resultant force of the inertial force produced by motions of portions of the robot, the gravity acting on the robot, and a reaction force from the object to the robot determined by a desired action force between the robot and the object becomes zero is satisfied on a dynamic model of a robot (a model expressing a relationship between motions of a robot and forces acting on the robot).

Further, based on the aforesaid provisionally determined desired motion trajectory of the object and the motion trajectory of the aforesaid provisionally generated desired gait of the robot, it is determined whether a predetermined geometric restrictive condition related to at least one of the object and the robot is satisfied in the aforesaid predetermined period, thereby making it possible to properly accomplish the determination (making it possible to accomplish highly reliable determination). Here, the aforesaid geometric restrictive condition is a geometric restrictive condition that depends on a position/posture relationship between the object and the robot, such as a condition in which the object and the body of the robot do not interfere with each other or a condition in which the joint of a part to be engaged with the object, such as an arm body of the robot, does not develop a displacement that exceeds a movable range.

Further, according to the present invention, if the geometric restrictive condition is not satisfied in the aforesaid determination, then at least one of the moving plan, the gait parameter, and the provisionally determined desired motion trajectory of the object is selected as the correction target, and the correction target is corrected such that the geometric restrictive condition is satisfied. Thereafter, a new desired gait is generated using the correction target that has been corrected. Thus, a new desired gait can be generated that satisfies the geometric restrictive condition.

As described above, according to the first invention, the trajectory of a desired action force between the robot and the object and the desired motion trajectory of the object in the future (in the aforesaid predetermined period) are provisionally determined by reflecting an actual behavior of the object on the object dynamic model in terms of the aforesaid model manipulated variable when generating a desired gait of the robot while performing operational control of the robot, and based on the provisionally determined trajectories, a desired gait of the robot in the future is provisionally determined, thus permitting highly reliable prediction of the behaviors of the object and the robot. And, it is determined whether the geometric restrictive condition is satisfied on the basis of the desired motion trajectory of the object and the motion trajectory of the desired gait in the future, and if the condition is not satisfied, then at least one of the moving plan, the gait parameter, and the provisionally determined desired motion trajectory of the object (the object to be corrected) is corrected, and a new desired gait is generated using the corrected object.

Thus, according to the first invention, it is possible to generate a desired gait that satisfies a required geometric restrictive condition related to the interference or the like between the robot and the object by reflecting an actual environmental condition in real time while carrying out the operational control of the robot.

In the first invention, when generating a desired gait by using a correction target that has been corrected, if the correction target is a moving plan, then the same processing as those of, for example, the between-robot-and-object action force trajectory provisionally determining means, the object motion trajectory provisionally determining means, and the robot gait provisionally generating means may be carried out in sequence to determine a gait parameter, and a new desired gait of the robot may be generated using the determined gait parameter. Further, if the correction target is a gait parameter, then a new desired gait of the robot may be generated using the gait parameter. In this case, the trajectory of the desired action force between the robot and the object and the desired motion trajectory of the object may be the same as the aforesaid provisionally determined trajectories. Further, if the correction target is the desired motion trajectory of the object, then the same processing as that of the robot gait provisionally generating means may be carried out to determine a gait parameter and the determined gait parameter may be used to generate a new desired gait of the robot. In this case, a desired motion trajectory of the object that has been corrected is to be used.

In the first invention, preferably, the model manipulated variable determining means is a means for estimating, as the aforesaid model manipulated variable, a disturbance force other than a force acting on an object from the robot out of a force acting on the actual object (a second invention). In this case, the object motion trajectory provisionally determining means may input the resultant force of the estimated disturbance force (model manipulated variable) and a desired action force applied from the robot to the object that is determined by the aforesaid provisionally determined trajectory of the desired action force between the robot and the object to the object dynamic model, and then determine a motion trajectory of the object that satisfies a dynamic relationship between the resultant force and the object dynamic model as the desired motion trajectory of the object.

Supplementally, the disturbance force can be estimated, for example, as follows. An actual motion velocity or acceleration of the object is estimated or detected, and the force actually acting on the object is grasped from the estimated value or the detected value. Further, a force actually acting on the object from the robot is estimated or detected, and the estimated value or the detected value of the force is subtracted from the aforesaid grasped force, thereby estimating the disturbance force.

Next, to fulfill the aforesaid object, according to a third invention of the gait generator of a legged mobile robot in accordance with the present invention, there is provided a gait generator of a mobile robot for generating a desired gait for causing the legged mobile robot equipped with a plurality of leg bodies extended from its body to perform an operation for moving an object while actuating the robot such that the desired gait is followed, including:

an object dynamic model representing a relationship between motions of the object and forces acting on the object;

a disturbance force estimating means for estimating a disturbance force, other than a force acting on the object from the robot, of a force acting on the actual object while observing the behavior of the actual object when actuating the robot such that the desired gait is followed;

a motion state amount provisionally determining means for provisionally determining a desired motion state amount that defines a desired motion trajectory of the object in a predetermined period after the present time on the basis of at least the moving plan of the object when generating a new desired gait to be followed by the robot;

an object action force trajectory provisionally determining means for provisionally determining an object action force desired trajectory, which is a desired trajectory of a force to be applied to the object in the predetermined period after the present time, by inputting the aforesaid provisionally determined desired motion state amount to the object dynamic model and by using the object dynamic model;

a between-robot-and-object action force trajectory provisionally determining means for provisionally determining the trajectory of a desired action force between the robot and the object, which is a desired trajectory of an action force between the object and the robot in the predetermined period on the basis of the provisionally determined object action force desired trajectory and the estimated disturbance force;

a robot gait provisionally generating means for provisionally determining a gait parameter to be used to generate a desired gait of the robot on the basis of at least the desired motion trajectory of the object defined by the provisionally determined desired motion state amount and the provisionally determined trajectory of the desired action force between the robot and the object and for provisionally generating a desired gait of the robot in the predetermined period by using the provisionally determined gait parameter, the estimated disturbance force, and the provisionally determined desired action force between the robot and the object;

a restrictive condition determining means for determining whether a predetermined geometric restrictive condition related to at least one of the object and the robot is satisfied on the basis of the desired motion trajectory of the object defined by the provisionally determined desired motion state amount and a motion trajectory of the provisionally generated desired gait of the robot; and a correcting means for selecting at least one of the moving plan, the provisionally determined gait parameter, and the desired motion trajectory of the object that is defined by the provisionally determined desired motion state amount as a correction target and for correcting the correction target so as to satisfy the geometric restrictive condition if the geometric restrictive condition is not satisfied, wherein the new desired gait is generated by using the correction target that has been corrected.

According to the second invention described above, by inputting the desired motion state amount of the object that has been provisionally determined by the motion state amount provisionally determining means on the basis of a moving plan of the object to the object dynamic model (this being an inverse dynamic model), an object action force desired trajectory in a predetermined period after the present time is provisionally determined by the object action force trajectory provisionally determining means, and based on the object action force desired trajectory and the estimated disturbance force, the trajectory of the desired action force between the robot and the object is provisionally determined by the between-robot-and-object action force trajectory provisionally determining means (specifically, for example, the trajectory of the desired action force between the robot and the object is provisionally determined, defining a result obtained by subtracting an estimated value of a disturbance force from an object action force as a desired action force to the object from the robot); therefore, the trajectory of the desired action force between the robot and the object is highly accurate (reliable) as a predicted trajectory of the trajectory of the action force between the robot and the object that should be produced between the actual robot and the object in moving the actual object according to a moving plan in a predetermined period after the present time. The aforesaid motion state amount is, for example, a moving velocity of the object. Further, the aforesaid disturbance force may be estimated as explained in relation to the aforesaid second invention.

Moreover, based on the desired motion trajectory of the object defined by the provisionally determined desired motion state amount and the provisionally determined trajectory of the desired action force between the robot and the object, a gait parameter of the robot is determined and a desired gait in the predetermined period is provisionally generated; therefore, the provisionally generated desired gait will also be highly accurate (reliable) as a predicted gait of the actual robot in a predetermined period after the present time. The gait parameter may be the same parameter as that in the first invention. In this case, as with the case of, for example, the first invention, a desired gait may be provisionally generated on the basis of a gait parameter such that a predetermined dynamic balance condition is satisfied on a dynamic model of the robot (a model showing a relationship between motions of the robot and forces acting on the robot).

And, as with the aforesaid first invention, based on the aforesaid provisionally determined desired object motion trajectory and the provisionally generated desired gait of the robot, it is determined whether a predetermined geometric restrictive condition related to at least one of the object or the robot is satisfied in the predetermined period, thus permitting proper determination (permitting highly reliable determination). The geometric restrictive condition is the same condition as that explained in relation to the aforesaid first invention. Further, if it is determined that the geometric restrictive condition is not satisfied, then at least one of the moving plan, the gait parameter, and the desired motion trajectory of the object defined by the provisionally determined desired motion state amount is selected as a correction target, and the correction target is corrected such that the geometric condition is satisfied, and a new desired gait is generated using the corrected gait parameter. Thus, a new desired gait can be generated that satisfies the geometric restrictive condition.

Thus, according to the third invention, when generating a desired gait of the robot while carrying out the operational control of the robot, the trajectory of a desired action force between the robot and an object is provisionally determined on the basis of an object action force desired trajectory determined by an object dynamic model as an action force to the object that is required to move the object according to a moving plan (the resultant force of a force to be applied to the object from the robot and a disturbance force applied to the object from a source other than the robot) and an estimated value of a disturbance force applied to an actual object. Then, based on the trajectory of the desired action force between the robot and the object and a desired motion trajectory of the object that is defined by a desired motion state amount input to the object dynamic model, a future desired gait of the robot is provisionally determined, thus permitting highly reliable prediction of the behaviors of the object and the robot. Further, it is determined whether the geometric restrictive condition is satisfied on the basis of the desired motion trajectory and a desired gait of the object in the future, and if the condition is not satisfied, then at least one (correction target) of a moving plan, a gait parameter, and a desired motion trajectory of the object that is defined by the aforesaid provisionally determined desired motion state amount is corrected, and a new desired gait is generated using the correction target.

Hence, the third invention also makes it possible to generate a desired gait that satisfies a predetermined geometric restrictive condition related to the interference or the like between the robot and the object by reflecting an actual environmental condition in real time while performing the operational control of the robot, as with the first invention.

In the third invention, when generating a desired gait by using a correction target that has been corrected, if the correction target is a moving plan, then, when generating a new desired gait, the same processing as those of, for example, the motion state amount provisionally determining means, the object action force trajectory provisionally determining means, the between-robot-and-object action force trajectory provisionally determining means, and the robot gait provisionally generating means may be carried out in sequence to determine a gait parameter, and a desired gait of the robot may be generated using the determined gait parameter. Further, if the correction target is a gait parameter, then a desired gait of the robot may be generated using the gait parameter. In this case, the trajectory of the desired action force between the robot and the object and a desired motion state amount (further, a desired motion trajectory of the object) may be the same as the aforesaid provisionally determined ones. Further, if the correction target is the desired motion trajectory of the object, then the same processing as that of the robot gait provisionally generating means may be carried out to determine a gait parameter and the determined gait parameter may be used to generate a desired gait of the robot. In this case, a desired motion trajectory of the object that has been corrected is to be used.

In the first to the third inventions described above, if the correcting means corrects the gait parameter as a correction target, then the gait parameter to be corrected preferably includes a predicted landing position of each leg body of the robot (a fourth invention).

This arrangement permits easy prediction of an influence on the geometric restrictive condition caused by correcting a gait parameter, so that it is possible to prevent a situation in which a gait parameter has to be repeatedly corrected, thus permitting easier corrective processing by the correcting means.

BEST MODE FOR CARRYING OUT THE INVENTION

The following will explain a gait generator of a legged mobile robot according to an embodiment of the present invention with reference to the accompanying drawings. A bipedal mobile robot will be taken as an example of a legged mobile robot.

FIG. 1 is a schematic diagram providing a general view of a bipedal mobile robot as a legged mobile robot according to the embodiment.

As shown in the figure, a bipedal moving robot (hereinafter referred to as "the robot") 1 is equipped with a pair of right and left leg bodies (leg links) 2, 2 extended downward from a body (a base body of the robot 1) 3. The two leg bodies 2, 2 share the same construction, each having six joints. The six joints are comprised of, in the following order from the body 3 side, joints 10R, 10L (the symbols R and L being the symbols meaning that they correspond to a right leg body and a left leg body, respectively, and the same applying hereinafter) for swinging (rotating) a hip (waist) (for rotating in a yaw direction relative to the body 3), joints 12R, 12L for rotating the hip (waist) in a roll direction (about an X axis), joints 14R, 14L for rotating the hip (waist) in a pitch direction (about a Y axis), joints 16R, 16L for rotating knees in the pitch direction, joints 18R, 18L for rotating ankles in the pitch direction, and joints 20R, 20L for rotating the ankles in the roll direction.

A foot (foot portion) 22R(L) constituting a distal portion of each leg body 2 is attached to the bottoms of the two joints 18R(L) and 20R(L) of the ankle of each leg body 2, and the body 3 is installed at the uppermost top of the two leg bodies 2, 2 through the intermediary of the three joints 10R(L), 12R(L) and 14R(L) of the hip of each leg body 2. A control unit 60 and the like, which will be discussed in detail hereinafter, are housed in the body 3. For the sake of convenience of illustration, the control unit 60 is shown outside the body 3 in FIG. 1.

In each leg body 2 having the construction, a hip joint (or a waist joint) is formed of the joints 10R(L), 12R(L) and 14R(L), the knee joint is formed of the joint 16R(L), and the ankle joint is formed of the joints 18R(L) and 20R(L). The hip joint and the knee joint are connected by a thigh link 24R(L), and the knee joint and the ankle joint are connected by a crus link 26R(L).

A pair of right and left arm bodies (arm links) 5, 5 is attached to both sides of an upper portion of the body 3, and a head 4 is disposed at a top end of the body 3. Both arm bodies 5, 5 share the same construction and each of them has seven joints. More specifically, each arm body 5 is provided with a shoulder joint composed of three joints 30R(L), 32R (L), and 34R(L), an elbow joint composed of a joint 36R(L), a wrist joint composed of three joints, namely, 38R(L), 40R (L) and 42R(L), and a hand 40R(L) connected to the wrist joint. The head 4 is not directly associated with the topic of the present invention, so that detailed explanation thereof will be omitted.

The construction described above imparts six degrees of freedom to the foot 22R(L) of each leg body 2 relative to the body 3. During a travel, such as walking, of the robot 1, desired motions of the two feet 22R and 22L can be accomplished by driving 6*2=12 joints of the two leg bodies 2, 2 together ("*" in this description denotes multiplication for scalar calculation, while it denotes an outer product in vector calculation) at appropriate angles. This arrangement enables the robot 1 to arbitrarily move in a three-dimensional space. Furthermore, each arm body 5 is given seven degrees of freedom relative to the body 3 and capable of performing a desired operation, such as pushing a carriage, which will be discussed later, by driving 7*2=14 joints of the two arm bodies 5, 5 together at appropriate angles.

As shown in FIG. 1, a publicly known six-axis force sensor 50 is provided under the ankle joints 18R(L), 20R(L) and between the ankle joints and the foot 22R(L) of each leg body 2. The six-axis force sensor 50 detects primarily whether the foot 22R(L) of each leg body 2 is in contact with the ground and a floor reaction force (ground contact load) acting on each leg body 2, and it outputs detection signals of components in three directions Fx, Fy and Fz of a translational force of the floor reaction force and components in three directions Mx, My and Mz of a moment to the control unit 60. A six-axis force sensor 52 similar to the six-axis force sensor 50 is provided between the hand portion (hand) 44R(L) of each arm body 5 and the wrist joints 38R(L), 40R(L), and 42R(L), and detection signals of components in three directions of a translational force and components in three directions of a moment of an external force acting on the hand portion 44R (L) are output from the six-axis force sensor 52 to the control unit 60. Furthermore, the body 3 is equipped with a posture sensor 54 for detecting an inclination angle of the body 3 relative to a Z-axis (vertical direction (gravitational direction)) and an angular velocity thereof, and a rotational angle (yaw angle) of the body 3 about the Z-axis and an angular velocity thereof, detection signals thereof being output from the posture sensor 54 to the control unit 60. The posture sensor 54 is provided with a three-axis-direction accelerometer and a three-axis-direction gyro sensor, which are not shown, and the detection signals of these sensors are used to detect posture angles (inclination angles and yaw angles) of the body 3 and angular velocities thereof and also to estimate its own position/posture of the robot 1. Although detailed structures are not shown, each joint of the robot 1 is provided with an electric motor 64 (refer to FIG. 2) for driving the joint and an encoder (rotary encoder) 65 (refer to FIG. 2) for detecting a rotational amount of the electric motor 64 (a rotational angle of each joint). Detection signals of the encoder 65 are output from the encoder 65 to the control unit 60.

Furthermore, although not shown, an elastic member, such as a spring, is installed between each foot 22R(L) and the six-axis force sensor 50, and an elastic member, such as rubber, is bonded to the bottom surface of the foot 22R(L). These elastic members constitute a compliance mechanism, which elastically deforms when each leg body 2 is subjected to a floor reaction force.

FIG. 2 is a block diagram showing the construction of the control unit 60. The control unit 60 is comprised of a microcomputer, and it includes a first calculator 90 and a second calculator 92 formed of CPUs, an A/D converter 80, a counter 86, a D/A converter 96, a RAM 84, a ROM 94, and a bus line 82 for transferring data among them. In the control unit 60, output signals of the six-axis force sensor 50 of each leg body 2, the six-axis force sensor 52 of each arm body 5, the posture sensor 54 (an accelerometer and a rate gyro sensor), etc. are converted into digital values by the A/D converter 80 and sent to the RAM 84 via the bus line 82. Outputs of the encoder 65 (rotary encoder) of each joint of the robot 1 are input to the RAM 84 via the counter 86.

As will be discussed hereinafter, the first calculator 90 generates a desired gait, calculates a joint angle displacement command (a command value of a displacement angle of each joint or a rotational angle of each electric motor 64), and sends the calculated command to the RAM 84. The second calculator 92 reads the joint angle displacement command from the RAM 84 and an actual measurement value of a joint angle detected on the basis of an output signal of the encoder 65 to calculate a manipulated variable required for driving each joint and outputs the calculated manipulated variable to the electric motor 64 for driving each joint through the intermediary of the D/A converter 96 and a servo amplifier 64a.

FIG. 3 is a block diagram providing a general view of the functional construction of a control device of a legged mobile robot according to an embodiment in the present description. A portion enclosed by the dashed line in this FIG. 3 is constituted of the processing functions (primarily the functions of the first calculator 90 and the second calculator 92) implemented by the control unit 60. In the following explanation, the symbols R and L will be omitted as long as it is not particularly necessary to discriminate right and left of the leg bodies 2 and the arm bodies 5.

The following will explain the functional construction of the control unit 60, which is comprised of a gait generator 100, an object reaction force balance controller 102, a leg main controller 104, and an arm main controller 106. In the embodiment in this description, the processing by the object reaction force balance controller 102, the leg main controller 104, and the arm main controller 106, excluding the gait generator 100 is the same as the one previously proposed by the present applicant in Japanese Patent Application Laid-Open Publication No. H10-230485 (Patent Document 1 mentioned above). Hence, in the following explanation of the present embodiment, the explanation will center around the gait generator 100, while the explanation of the object reaction force balance controller 102, the leg main controller 104, and the arm main controller 106 will be simply a schematic explanation.

The gait generator 100, which generates a desired gait of the robot 1 freely and in real time and outputs the desired gait, corresponds to a gait generator according to the invention of the present application. A desired gait output by the gait generator 100 is composed of a desired body position/posture trajectory (a desired position trajectory and a desired posture trajectory of the body 3), a desired foot position/posture trajectory (a desired position trajectory and a desired posture trajectory of each foot 22), a desired hand position/posture trajectory (a desired position trajectory and a desired posture trajectory of the hand 44 of each arm body 5), a desired total floor reaction force central point trajectory (the trajectory of a desired position of a total floor reaction force central point), a desired total floor reaction force trajectory, and a desired object reaction force trajectory. If a portion that can be moved relative to the body 3 is provided in addition to the leg bodies 2 and the arm bodies 5, then a desired position/posture trajectory of the movable portion is added to a desired gait. In the following explanation, the "desired" will be frequently omitted unless there is a danger of misunderstanding.

Here, the meanings and definitions of terms related to desired gaits generated by the gait generator 100 will be explained. The "trajectory" in a gait means a temporal change pattern (time series pattern).

The "position" of each portion of the robot 1, such as a foot position or a body position, means the position of a certain representative point fixedly set on the portion. For example, in the present embodiment, the representative point of each foot 22 is the point at which a perpendicular line extended from the center of the ankle joint of the leg body 2 provided with the foot 22 down to the bottom surface of the foot 22 intersects with the bottom surface, and the position of the representative point is the foot position. Further, a "posture" means a spatial orientation. Specifically, for example, a body posture is represented by an inclination angle of the body 3 in the roll direction (about the X-axis) relative to the Z-axis (vertical axis), an inclination angle of the body 3 in the pitch direction (about the Y-axis), and a rotational angle (yaw angle) of the body 3 in the yaw direction (about the Z-axis), and a foot posture is represented by means of a two-axis spatial azimuth fixedly set on each foot 22.

Components of a gait other than the components related to a floor reaction force and an object reaction force, i.e., a gait related to a motion of the robot 1, such as foot position/posture or body position/posture, will be generically referred to as "motion." A motion trajectory may be constant (unchanged time-wise) or substantially constant. For instance, if the robot 1 is maintained in a state wherein both feet 22 and 22 thereof have been landed and remain stationary, then the foot position/posture trajectory will be constant.

An object reaction force in a gait means a reaction force applied to an object from the robot 1 (a force acting on the robot 1 from an object) when causing the robot 1 to move the object. Thus, a desired object reaction force trajectory corresponds to the trajectory of a desired action force between a robot and an object in the present invention. In an embodiment of the present description, an explanation will be given, taking a case where the robot 1 carries out an operation of pushing an object 120 while walking with the hands 44R, 44L of both arm bodies 5, 5 engaged with predetermined portions of the object 120 (a carriage in the illustrated example) as an example, as shown in, for instance, FIG. 4. A force received by the robot 1 from the object 120 is an object reaction force. The object reaction force is generally composed of a translational force component and a moment component. However, in the embodiment of the present description, the object reaction force means a translational fore acting on the robot 1 from the object 120, and a moment about a certain point acting on the robot 1 due to the translational force is referred to as an object reaction force moment. Supplementally, an object reaction force is obtained by reversing the sign (direction) of a force to be applied to the object 120 from the robot 1, so that an action force from the robot 1 to the object 120 may be used in place of an object reaction force.

In the present description, regarding a motion of the object 120, a position of the object 120 means a position of a representative point fixedly set on the object 120, as with a foot position or the like of the robot 1. Further, a posture of the object 120 means a spatial orientation of the object 120, as with a posture or the like of the foot 22 of the robot 1. And, a position and a posture of the object 120 are generically referred to as object motion in some cases.

Further, a floor reaction force (a floor reaction force composed of a translational force and a moment) acting on each foot 22 is referred to as "the floor reaction force of each foot" and a result force of "the floor reaction force of each foot" of all (two) feet 22R and 22L of the robot 1 is referred to as "the total floor reaction force." In the following explanation, however, each foot floor reaction force will be hardly referred to, so that "the floor reaction force" will be handled as synonymous with "the total floor reaction force" unless otherwise specified.

A desired floor reaction force is generally expressed by a point of action and a translational force and a moment acting on the point. The point of action may be set at any point, so that there are countless conceivable expressions for the same desire floor reaction force. If a desired floor reaction force is expressed by taking a desired floor reaction force central point (a desired position of the central point of a total floor reaction force), in particular, as the point of action, then the moment component of the desired floor reaction force will be zero, excluding a vertical component (the moment about the vertical axis (Z-axis)). In other words, the horizontal component (the moment about the horizontal axis (the X-axis and a Y-axis)) of the moment of the desired floor reaction force about the desired floor reaction force central point will be zero. Hence, in the embodiment of the present description, the gait generator 100 performs generation, taking the desired floor reaction force central point as the point of action of the desired total floor reaction force. Incidentally, the desired floor reaction force central point has the meaning as the point of action of the desired total floor reaction force, so that it may be said to be a component of the desired total floor reaction force in the basic sense. In the embodiment of the present description, however, a desired floor reaction force central point in a desired floor reaction force is closely related to the operational control of the robot 1. In FIG. 3, therefore, the desired floor reaction force central point, which is the point of action in the desired total floor reaction force, is shown separately from the desired total floor reaction force.

In the present description, ZMP (zero moment point) is used to mean a point at which the moment acting about the point due to a resultant force (or a floor reaction force that balances out the resultant force) of an inertial force produced by a motion of the robot and the gravity and an object reaction force acting on the robot is zero, excluding the vertical component thereof. In a gait that satisfies a dynamic balance condition, the ZMP calculated from a desired motion trajectory of the robot, the gravity, and a desired object reaction force and a desired floor reaction force central point agree. In the present description, a desired ZMP is used instead of a desired floor reaction force central point in many cases.

Further, in the present description, a desired gait means a set of a desired motion, a desired floor reaction force (including a desired ZMP), and a desired object reaction force for a predetermined period. Especially, in the present embodiment, a desired gait (including a case where the desired gait is referred to simply as a gait) will mean a set of a desired motion, a desired floor reaction force (including a desired ZMP), and a desired object reaction force for the period of one step of the robot 1 unless otherwise specified. In this case, "one step" of a desired gait is used to mean the period from the instant when one leg body 2 of the robot 1 lands to the instant when the other leg body 2 lands. A series of gaits is formed of several gaits in connection (gaits for a predetermined period). In the explanation given hereinafter, a desired gait for one-step period may be referred to as a unit gait. Further, a one-step period in a state wherein the robot 1 is not traveling (a state wherein the contact of both feet 22 and 22 with the ground is maintained) means a certain predetermined period (a period corresponding to a one-step period in a case where the robot 1 travels).

A two-leg supporting period in a gait refers to a period during which the robot 1 supports its own weight by both leg bodies 2, 2 (a period during which both leg bodies 2, 2 are supporting legs), and a one-leg supporting period refers to a period during which the robot 1 supports its own weight only by one leg body 2 (a period during which only one leg body 2 is a supporting leg). In other words, a desired gait (unit gait) in the present embodiment is a desired gait for a period from the instant when a two-leg supporting period begins to the instant when a one-leg supporting period ends. The leg body 2 that supports the self-weight of the robot 1 is called a supporting leg. Both leg bodies 2, 2 become the supporting legs in the two-leg supporting period, while one leg body 2 becomes the supporting leg in the one-leg supporting period. Further, in the one-leg supporting period, the leg body 2 not supporting the self-weight of the robot 1 (the leg body 2 that is not a supporting leg) is called a free leg. In the explanation to be given hereinafter, a supporting leg in a desired gait will mean the leg body 2 that lands at the beginning of the two-leg supporting period (the leg body 2 that becomes a supporting leg in the one-leg supporting period following the two-leg supporting period) unless otherwise specified. Further, the foot 22 of the leg body 2 on the supporting leg side and the foot 22 of the leg body 2 on the free leg side will be referred to as the supporting leg foot 22 and the free leg foot 22, respectively. In addition, even in a state wherein the robot 1 does not travel (a state wherein the contact of both feet 22, 22 with the ground is maintained), one leg body 2 is a supporting leg, and the other leg body 2 is a free leg.

Further, a desired gait (unit gait) to be newly generated by the gait generator 100 or a desired gait (unit gait) that is being generated is called a current time's gait, a desired gait that is one step before the current time's gait is called a last time's gait, a desired gait that is one step following the current time's gait is called a next time's gait, and the further next desired gait is called the next but one time's gait.

A desired gait is described by means of a supporting leg coordinate system as a global coordinate system. In the present embodiment, the supporting leg coordinate system is a global coordinate system (a coordinate system fixed to a floor) in which the point at which a perpendicular line extended to a floor surface from the center of the ankle joints 18 and 20 of the supporting leg intersects with the floor surface in a state wherein substantially the entire bottom surface of the supporting leg foot 22 is in contact (close contact) with the floor surface (this point agreeing with the representative point of the foot 22 in a state wherein substantially the entire bottom surface of the supporting leg foot 22 is in contact with the floor surface in an example of the present embodiment) while the supporting leg foot 22 is in a horizontal posture (more generally, a posture parallel to the floor surface) is defined as the origin, and a horizontal plane that passes the origin is defined as an XY plane. In this case, the X-axis and the Y-axis direction indicate the longitudinal direction and the lateral direction, respectively, of the supporting leg foot 22. In the following explanation, the X-axis, the Y-axis, and the Z-axis mean three axes of the supporting leg coordinate system unless otherwise specified. The origin of the supporting leg coordinate system does not necessarily have to agree with the representative point of the foot 22 in the state wherein substantially the entire bottom surface of the supporting leg foot 22 is in contact with the floor surface, and it may alternatively be set at a point on the floor surface that is different from the representative point.

The matters explained above apply not only to a first embodiment to be explained below but also apply to all embodiments explained in the present description.

First Embodiment

The following will explain in detail a gait generator 100 according to a first embodiment of the present invention. FIG. 5 to FIG. 7 are flowcharts showing the processing by the gait generator 100. The first embodiment is an embodiment of the first invention, the second invention, and the fourth invention. The arithmetic processing functions of the gait generator 100 constitute the model manipulated variable determining means, the between-robot-and-object action force trajectory provisionally determining means, the object motion trajectory provisionally determining means, the robot gait provisionally generating means, the restrictive condition determining means, and the correcting means in the first invention of the present invention.

The gait generator 100 sequentially carries out the processing shown in the flowcharts of FIG. 5 to FIG. 7 at a predetermined calculation processing cycle.

First, in S01, a moving plan for an object 120 is determined. The moving plan to be determined here includes at least a moving plan for the object 120 for a predetermined future period (for a plurality of steps of the robot 1) from the current time. The moving plan is decided basically according to a moving requirement of the object 120 (a design requirement on a method and timing for moving the object 120), and it is constituted of a position/posture trajectory (a time series of position and posture) of the object 120 or a parameter or a function expression or the like that defines the trajectory. For instance, if a moving requirement for the object 120 is to move the object 120 at a constant velocity in the X-axis direction at certain time t0, then the moving plan is decided as illustrated by a graph g1 of FIG. 8. The graph g1 shows time-dependent changes of an object position (a position in the X-axis direction) in the moving plan. In this case, for instance, the time series of the position of the object 120 at each time (time at each certain time interval) after the current time may be decided as the moving plan, or time t0 and the inclination of the graph g1 (moving velocity of the object 120) may be decided as the elements (the parameters) that define the moving plan or a function expression of the graph g1 may be decided as the element (the parameter) that defines the moving plan. Incidentally, the moving requirement is supplied to the gait generator 100 from outside, as necessary, or stored and retained in a storage means, which is not shown, of the control unit 60 beforehand.

Supplementally, the moving plan decided in S01 is not necessarily decided according to a moving requirement; it is corrected as appropriate when necessary, which will be discussed hereinafter.

The procedure then proceeds to S03 wherein a desired object motion trajectory (a desired object position/posture trajectory) and a desired object reaction force trajectory are provisionally determined using an object dynamic model on the basis of the moving plan decided in S01 as described above.

Now, the processing of this S03 and the object dynamic model used in the processing will be explained with reference to the block diagram of FIG. 9. FIG. 9 is the block diagram showing the calculation processing for determining a desired object position trajectory and a desired object reaction force trajectory of a desired object motion trajectory in S03. The portion enclosed by the dashed line in the block diagram provides the object dynamic model showing a relationship between forces acting on the object 120 and motions of the object 120. In the present embodiment, for the convenience of understanding, the explanation will be given by taking, as an example, a case where the object 120 is moved on a substantially horizontal floor.

The object dynamic model shown in FIG. 9, which corresponds to the object dynamic model in the first invention of the present invention, is a dynamic model (forward dynamic model) that receives a force (more specifically, a translational force in the horizontal direction) to be applied to the object 120 as an input, and outputs a position of the object 120. To be more specific, the object dynamic model determines a motional acceleration of the object 120 by multiplying an input value of a translational force in the horizontal direction to be applied to the object 120 (the value determined by an adder 204, which will be discussed later) by a reciprocal 1/M of a mass M of the object 120 by a multiplier 206, then the obtained result is sequentially integrated (double-integrated) by integrators 208 and 210 thereby to output a position of the object 120 (a position on the object dynamic model). In other words, in the present embodiment, the object dynamic model shown in FIG. 9 is constructed on the basis of a dynamic equation that a translational force acting on the object 120 is equal to a product of an acceleration and a mass of the object 120. An output of the integrator 208 means a moving velocity of the object 120 on the object dynamic model and this will be hereinafter referred to as an object model velocity.

The calculation processing in S03 that uses such an object dynamic model will be specifically explained with reference to FIG. 9. First, a desired object velocity, which is a desired velocity at each instant (at each time) of the object 120 based on the moving plan determined in S01 described above, and the object model velocity previously determined by the integrator 208 are input to a subtracter 200, which determines a difference therebetween (=the desired object velocity−the object model velocity). Here, the desired object velocity is a value obtained as a first-order differential value of a position trajectory of the object 120 in the moving plan or a component of the moving plan. In the example of the moving plan shown in FIG. 8 described above, the inclination of the graph g1 may be directly used as the desired object velocity, and in this case, the desired object velocity will continually take a constant value. Then, the time series of the desired object velocity for a predetermined future period (for a plurality of steps of the robot 1) from the current time is sequentially input to the subtracter 200. The object model velocity input to the subtracter 200 is the value output from the integrator 208 when a desired object velocity immediately preceding the desired object velocity to be newly input is supplied to the subtracter 200.

Subsequently, the difference is multiplied by a predetermined gain Kv by a multiplier 202 to determine a required value of a translational force that should be applied to the object 120 from the robot 1. This means that, in the present embodiment, the required value of the translational force is determined by a feed-back control law such that the difference between the desired object velocity and the object model velocity converges to zero (such that the object model velocity follows the desired object velocity). As the feed-back control law, a proportional control law is used in this example. Then, a time series of the result obtained by reversing the sign of the determined required value of the translational force is output as a desired object reaction force trajectory.

Further, the determined required value of the translational force and an estimated disturbance force, which is an estimated value of a disturbance force applied to the object 120 from a source other than the robot 1 (e.g., a frictional force acting on the object 120 from a floor), are supplied to the adder 204, and the sum of the required value of the translational force and the estimated disturbance force is determined by the adder 204 as an input value of the translational force for the object dynamic model. Here, the estimated disturbance force, which corresponds to the model manipulated variable in the first invention of the present invention, is determined by the processing in S35, which will be described later, for each calculation processing cycle of the gait generator 100. As an estimated disturbance force to be input to the adder 120, the value determined at the previous calculation processing cycle of the gait generator 100 is used. Then, the input value of the translational force determined as described above is supplied to the object dynamic model so as to determine the position of the object 120 as described above, and the time series of the determined position is output from the integrator 210 as a desired object position trajectory.

An initial value of an output of the integrator 208 of the object dynamic model is set to a value at time associated with a previous calculation processing cycle (the current time at the previous calculation processing cycle) in the time series of an object model velocity determined by carrying out the processing of S03 at the previous calculation processing cycle of the gait generator 100. Further, an initial value of an output of the integrator 210 is set to a value at time associated with a previous calculation processing cycle (the current time at the previous calculation processing cycle) in the time series of a desired object position determined by carrying out the processing of S03 at the previous calculation processing cycle of the gait generator 100.

A desired object posture trajectory in a desired object motion trajectory is determined such that, for example, it substantially agrees with the direction of a desired object velocity.

Supplementally, as long as a moving plan and an estimated disturbance force are maintained to be constant, a desired object motion trajectory and a desired object reaction force trajectory remain to be constant; therefore, the processing in S03 does not necessarily have to be implemented at each calculation processing cycle of the gait generator 100. Hence, for example, the processing in S03 may be carried out at each step of the robot 1 or at each more than one calculation processing cycle of the gait generator 100, or when a moving plan has been changed in S01 or if an estimated disturbance force has incurred a relatively significant change.

By the processing in S03 explained above, a desired object motion trajectory and a desired object reaction force trajectory for a predetermined future period from the current time are provisionally determined.

The processing in S03 corresponds to the between-robot-and-object action force trajectory provisionally determining means and the object motion trajectory provisionally determining means in the first invention of the present invention. More specifically, the processing whereby a required value of a translational force to be applied from the robot 1 to the object 120 so that an object model velocity, which is the moving velocity of the object on the object dynamic model, follows a desired object velocity (desired motion state amount) based on a moving plan is determined by an subtracter 200 and a multiplier 202, and a desired object reaction force trajectory is determined from the required value (the sign of the required value is reversed) corresponds to the processing by the between-robot-and-object action force trajectory provisionally determining means. Further, the processing carried out by an adder 204 and a multiplier 206 and integrators 208 and 210 of the object dynamic model corresponds to the processing by the object motion provisionally determining means.

Subsequently, the procedure proceeds to SOS wherein predicted landing positions/postures and predicted landing time of the free leg foot 22 of the robot 1 are provisionally determined on the basis of the desired object motion trajectory provisionally determined as described above. The predicted landing positions/postures and the predicted landing time provisionally determined here are the predicted landing positions/postures and the predicted landing time of the free leg foot 22 for a plurality of steps (for at least two steps) of the robot 1, including the predicted landing position/posture and the predicted landing time of the free leg foot 22 in the current time's gait, which is the desired gait to be created now. In other words, the predicted landing position/posture and the predicted landing time to be provisionally determined include at least the predicted landing position/posture and the predicted landing time of the free leg foot 22 for the current time's gait and the predicted landing position/posture and the predicted landing time of the free leg foot 22 for the next time's gait. In this case, the predicted landing position/posture and the predicted landing time of the free leg foot 22 are determined such that the landing position/posture of the free leg foot 22 at predicted landing time have a predetermined relative position/posture relationship with the object position/posture at that time in relation to the desired object motion trajectory determined in S03.

However, the predicted landing position/posture and the predicted landing time of the free leg foot 22 do not have to be necessarily determined such that they follow desired object position/posture. For example, if the object 120 is moved by pushing in a state wherein the robot 1 does not travel (a state wherein the contact of both feet 22, 22 with the ground is maintained), and after the movement is started, the hands 44 of the arm bodies 5, 5 are disengaged from the object 120, then the predicted landing position/posture of the free leg foot 22 in each gait will be maintained to be constant as time elapses. In other words, the predicted landing position/posture and the predicted landing time of the free leg foot 22 are generally determined not only on the basis of a desired object motion trajectory but also a design requirement on the type of motion of the robot 1 to move the object 120.

More detailedly, the predicted landing position/posture of the free leg foot 22 are the position/posture of the free leg foot 22 in a state wherein substantially the entire bottom surface of the free leg foot 22 is brought into contact with a floor surface by landing the heel of the free leg foot 22 and rotating it in the pitch direction without slippage while the free leg foot 22 is held in contact with the floor. Hence, in the present embodiment, the predicted landing position/posture of the free leg foot 22R or 22L define the position/posture on a supporting leg coordinate system in a unit gait from the landing instant to the landing of the next free leg foot 22L or 22R. Thus, determining the predicted landing position/posture of the free leg foot 22 accordingly determines the position/posture on the supporting leg coordinate system in each unit gait according to the technique for setting the supporting leg coordinate system described above. Specifically, the supporting leg coordinate system in each unit gait will be a coordinate system in which the origin thereof is the point at which a perpendicular line extended from the center of the ankle joint of the leg body 2 having the foot 22 to a floor surface intersects with the floor surface in a state wherein the free leg foot 22 of a unit gait immediately preceding the aforesaid unit gait has been matched to the predicted landing position/posture.

Subsequently, the procedure proceeds to S07 wherein a ZMP trajectory parameter that defines a desired ZMP trajectory of the current time's gait is provisionally determined. The ZMP trajectory parameter provisionally determined here is determined such that the desired ZMP (hereinafter referred to as the provisional desired ZMP) of the current time's gait defined thereby exists substantially around the center of a ground contact plane of the supporting leg foot 22 in the current time's gait (a so-called supporting polygon that includes the ground contact plane of both feet 22 in a two-leg supporting period) that is determined by the predicted landing position/posture and the predicted landing time provisionally determined in S05 and that it does not suddenly change. In other words, the ZMP trajectory parameter is determined such that the provisional desired ZMP in the current time's gait exists at a position where the stability allowance of the robot 1 is maximized within the ground contact plane (or the supporting polygon) of the robot 1 and that it does not suddenly change. The provisional desired ZMP determined according to such guidelines exhibits, for example, a pattern as shown in FIG. 10(a). FIG. 10(a) shows the pattern of the position of the provisional desired ZMP in the X-axis direction. In the case of this example, the positions and the times of the break points in the provisional desired ZMP pattern (trajectory) are provisionally determined as ZMP trajectory parameters.

Subsequently, the procedure proceeds to S09 wherein the trajectory of an object reaction force moment (the time series of instantaneous values of an object reaction force moment) about the provisional desired ZMP determined by the currently provisionally determined ZMP trajectory parameters is calculated on the basis of the desired object motion trajectory and the desired object reaction force trajectory that are currently provisionally determined. More specifically, first, the motion trajectories (position/posture trajectories) of portions of the object 120 with which the hands 44R, 44L of the two arm bodies 5, 5 of the robot 1 are to engage are determined on the basis of the desired object motion trajectory. The positions/postures of the portions are to have a predetermined position/posture relationship relative to the position/posture of the object 120. Then, the hand position/posture trajectories of the robot 1 (defining the trajectory of the point of action of an object reaction force to the robot 1) are determined such that they match the motion trajectories (position/posture trajectories) of the portions. Subsequently, the object reaction force moment about the provisional desired ZMP at each time (time at each certain time interval) is calculated from the determined hand position/posture trajectories, the desired object reaction force trajectory, and the provisional desired ZMP trajectory. And, the time series of the calculated object reaction force moment is obtained as the object reaction force moment trajectory. In a case where the robot 1 is moved close to the object 120 from a location that is apart from the object 120 and then the hands 44R, 44L are engaged with the object 120 to start the operation of pushing the object 120, the object reaction force trajectory and eventually the object reaction force moment trajectory until the time at which the hands 44R, 44L are engaged with the object 120 (the time being decided as appropriate) will be zero.

Subsequently, the procedure proceeds to S11 wherein a gait parameter of a normal turning gait as a cyclic gait following the current time's gait is determined. The gait parameter includes a foot trajectory parameter, which defines a foot position/posture trajectory in a normal turning gait, a ZMP trajectory parameter, which defines a desired ZMP trajectory, and an object reaction force trajectory parameter, which defines a desired object reaction force moment trajectory.

Before specifically explaining these gait parameters, an overview of a normal turning gait will be explained. In the following explanation, "start" and "end" of a gait means the start time and the end time, respectively, of each gait or an instantaneous gait at the start time or the end time.

A normal turning gait means a cyclic gait that does not cause discontinuity in a motion state (a state, such as foot position/posture or body position/posture) of the robot 1 at a boundary of a gait (a boundary of a gait for each step in the present embodiment) when the gait is repeated.

In the present embodiment, a normal turning gait, which is a cyclic gait, is a gait for two steps of the robot 1. In other words, a gait composed of a first turning gait following the current time's gait and a second turning gait following the first turning gait is defined as the gait for one cycle of the normal turning gait, and the gait for one cycle is repeated. Here, the term "turning" is used, because setting a turning rate to zero means moving straight, so that moving straight can be also included in turning in a broad sense. Hereinafter, a normal turning gait may be abbreviated to a normal gait.

To supplement the explanation of a normal gait, in a bipedal mobile robot as the robot 1, a normal gait for one cycle is composed of gaits for at least two steps (two successive unit gaits). It is also possible to set a complicated normal gait that has gaits for three steps or more defined as the gaits for one cycle. However, as will be discussed hereinafter, a normal gait is used only to determine a divergent component at the end of the current time's gait (the details thereof will be discussed later). For this reason, using the normal gait having the gaits for three steps or more as one cycle would provide low effect, while the processing for generating the gaits would be complicated. Thus, the gaits for one cycle of normal gaits in the present embodiment are composed of gaits for two steps (first and second turning gaits). In the following explanation of the normal gaits, for the convenience of explanation, the normal gaits composed of gaits for two steps are regarded as the gaits for one step. The normal gaits are virtual gaits temporarily assumed (in the calculation processing by the gait generator 100) to determine a divergent component at the end of the current time's gait by the gait generator 100, and they are not directly output from the gait generator 100.

The term "divergence" means that the horizontal position of the body 3 of the bipedal mobile robot 1 shifts to a position apart from the positions of both feet 22, 22. A value of a divergent component is a numeral value that indicates the degree of distance of the horizontal position of the body 3 of the bipedal mobile robot 1 apart from the positions of both feet 22, 22 (more specifically, the origin of a supporting leg coordinate system set on the ground contact surface of the supporting leg foot 22).

In the present embodiment, gaits are generated using divergent components as indicators such that desired gaits are continuously generated without developing the divergence. More specifically, a divergent component at the start of a normal gait following a current time's gait is determined, and then the current time's gait is generated (a gait parameter that defines the current time's gait is determined) such that a divergent component at the end of the current time's gait matches the divergent component at the start of the normal gait (more generally, the body position/posture of the current time's gait converge to the body position/posture of the normal gait). Then, the divergent component at the start of the normal gait is determined on the basis of the gait parameter determined in S11 such that a condition of a normal gait in which a motion state of the robot 1 at the start of the normal gait (the start of the first turning gait) agrees with that at the end thereof (the end of the second turning gait) (this will be hereinafter referred to as a boundary condition of a normal gait) is satisfied on a dynamic model of the robot 1. The basic guideline for generating gaits described above is the same as that previously proposed in PCT international publication WO/02/40224A1 by the present applicant. Therefore, in the following explanation regarding the normal gaits, technical matters that are different from the matters described in PCT international publication WO/02/40224A1 will be mainly explained, and detailed explanation of similar technical matters may be omitted.

Returning to the explanation of S11, the foot trajectory parameter of the gait parameter of the normal gait is composed of the positions/postures of the supporting leg foot 22 and the free leg foot 22, respectively, at the start and the end of the first turning gait and the second turning gait, respectively, the gait cycle of each turning gait, and the like, and it is determined such that the foot position/posture trajectory is connected in the order of the current time's gait, the first turning gait, and the second turning gait. The following will explain a specific setting method with reference to FIG. 11.

The free leg foot position/posture at the start of a first turning gait are to be the supporting leg foot position/posture at the end of the current time's gait observed from the next time's gait supporting leg coordinate system. The supporting leg foot position/posture at the end of the current time's gait are the position/posture of the supporting leg foot 22 obtained when the supporting leg foot 22 at the start of the current time's gait is rotated in the pitch direction until substantially the entire bottom surface of the supporting leg foot 22 is brought in contact with a floor without slippage while the supporting leg foot 22 at the start of the current time's gait is held in contact with the floor (they agree with the predicted landing position/posture of the free leg foot 22 of the last time's gait). The position/posture on a next time's gait supporting leg coordinate system are determined on the basis of the predicted landing position/posture of the free leg foot 22 of the current time's gait, as shown in FIG. 11.

The supporting leg foot position/posture at the start of the first turning gait are to be the free leg foot position/posture at the end of the current time's gait observed from the next time's gait supporting leg coordinate system. The free leg foot position/posture at the end of the current time's gait are determined to be the position/posture based on the predicted landing position/posture of the free leg foot 22 of the current time's gait (or the next time's gait supporting leg coordinate system determined based thereon). Specifically, the free leg foot position/posture at the end of the current time's gait are determined such that the position/posture obtained when the free leg foot 22 of the current time's gait is rotated by a predetermined angle in the pitch direction without slippage from the free leg foot position/posture at the end of the current time's gait while it is held in contact with a floor provide the predicted landing position/posture of the free leg foot 22 of the current time's gait.

The free leg foot position/posture at the end of the first turning gait are to be the free leg foot position/posture at the end of the next time's gait observed from the next time's gait supporting leg coordinate system. The free leg foot position/posture at the end of the next time's gait are determined to be the position/posture based on the predicted landing position/posture of the free leg foot 22 of the next time's gait (or the next but one time's gait supporting leg coordinate system determined based thereon) in the same manner as the technique for determining the free leg foot position/posture at the end of the current time's gait.

The supporting leg foot position/posture at the end of the first turning gait are the position/posture of the supporting leg foot 22 obtained when the supporting leg foot 22 whose position/posture have been matched with the next time's gait supporting leg coordinate system is rotated in the pitch direction until substantially the entire bottom surface of the supporting leg foot 22 is brought in contact with a floor without slippage while the supporting leg foot 22 is held in contact with the floor (the position/posture agree with the predicted landing position/posture of the free leg foot 22 of the current time's gait).

The free leg foot position/posture at the start of the second turning gait are to be the supporting leg foot position/posture at the end of the first turning gait observed from the next but one time's gait supporting leg coordinate system. The supporting leg foot position/posture at the start of the second turning gait are to be the free leg foot position/posture at the end of the first turning gait observed from the next but one time's gait supporting leg coordinate system.

The free leg foot position/posture at the end of the second turning gait is determined such that the position/posture thereof observed from the next but one time's gait supporting leg coordinate system agree with the free leg foot position/posture at the end of the current time's gait observed from the current time's gait supporting leg coordinate system. The supporting leg foot position/posture at the end of the second turning gait are determined such that the position/posture thereof observed from the next but one time's gait supporting leg coordinate system agree with the supporting leg foot position/posture at the end of the current time's gait observed from the current time's gait supporting leg coordinate system.

The gait cycles of the first turning gait and the second turning gait are set to be the same as the next time's gait cycle (this being the difference between the predicted landing time of the free leg foot 22 of the current time's gait and the predicted landing time of the free leg foot 22 of the next time's gait). The gait cycles of the first turning gait and the second turning gait do not necessarily have to be the same with each other; however both cycles are preferably decided on the basis of at least the next time's gait cycle. Motion parameters (including time parameters, such as a two-leg supporting period) of the current time's gait, the first turning gait, and the second turning gait other than those described above are appropriately determined on the basis of the aforesaid determined parameters such that a gait condition (e.g., whether the velocity of an actuator falls within a permissible range, whether a movable angle is exceeded, or whether there is interference with a floor) is satisfied.

A ZMP trajectory parameter of the gait parameter of a normal gait is determined such that the ZMP trajectory defined by the ZMP trajectory parameter leads to an increased stability allowance of the robot 1 and the ZMP trajectory does not incur a sudden change, as in the case where a desired ZMP trajectory parameter has been provisionally determined in S07 described above.

Further, an object reaction force moment trajectory parameter of a normal gait is determined such that a cyclic condition is satisfied. For example, it is assumed that an object reaction force moment trajectory associated with a current time's gait, a next time's gait, and a next but one time's gait is as shown in FIG. 12(*a*). Here, the object reaction force moment trajectory of the current time's gait is the trajectory determined in S09. The object reaction force moment trajectory of the next time's gait is the trajectory calculated in the same manner as that in S09 on the basis of the object reaction force trajectory and the desired object motion trajectory of the next time's gait determined in S03 and the ZMP trajectory defined by the ZMP trajectory parameter of a normal turning gait. The object reaction force moment trajectory of the next but one time's gait is the trajectory calculated in the same manner as that in S09 on the basis of the object reaction force trajectory and the desired object motion trajectory of the next but one time's gait determined in S03 and the ZMP trajectory defined by the ZMP trajectory parameter of a normal turning gait.

At this time, the object reaction force moment trajectory parameter of the normal turning gait is determined such that the object reaction force moment trajectory of the normal turning gait will be, for example, the trajectory shown in FIG. 12(*b*). In this example, the object reaction force moment trajectory from the start to the end of the first turning gait of the normal turning gait is determined such that it continues to the object reaction force moment trajectory of the current time's gait and agrees with the object reaction force moment trajectory of the next time's gait. Further, the object reaction force moment trajectory of the second turning gait of the normal turning gait is determined such that it continues to the object reaction force moment trajectory of the first turning gait and agrees with the object reaction force moment trajectory of the next but one time's gait from the start of the second turning gait up to time tx immediately before the end thereof, while it continually changes to the same value as the value at the start of the first turning gait (the start of the normal turning gait) from the value at time tx from time tx to the end thereof. Time tx corresponds to, for example, the time at a break point of the ZMP trajectory of the normal turning gait.

If the difference between the value of an object reaction force moment at the start of the next time's gait and the value of an object reaction force moment of the next but one time's gait is not very large, then the value of the object reaction force moment at the start of the normal turning gait and the value of the object reaction force moment at the end thereof do not necessarily have to be the same.

Subsequently, the procedure proceeds to S13 wherein a divergent component at the start of the normal turning gait is determined. In this case, since the normal turning gait is a cyclic gait, the divergent component at the start of the normal turning gait is determined such that the initial state (including the divergent component at the start) of a motion of the first turning gait and the terminal state (including the divergent component at the end) of a motion of the second turning gait agree with each other on a predetermined dynamic model of the robot 1.

Before explaining in detail the processing in this S13, the dynamic model of the robot 1 used for the processing in this S13 and the dynamic calculation for determining a desired body position by using the dynamic model will be explained. The dynamic model is used for the processing in S13 and also for determining a current time's gait by the processing up to S37, which will be discussed later; it is a dynamic model that expresses simplified (approximate) dynamic behaviors of the robot 1 (a relationship between forces acting on the robot 1 and motions). Hereinafter, the dynamic model will be referred to as the robot simplified model. The basic structure of this robot simplified model is the same as that in PCT international publication WO/02/40224A1, but it differs from the one in the application in that an object reaction force moment is taken into account.

FIG. 13 shows the structure of the robot simplified model. As illustrated, the robot simplified model is a three-mass-point model and constructed such that the dynamics of the leg bodies 2 and the dynamics of the body 3 do not interfere with each other, and the dynamics of the entire robot 1 is indicated by linear connections thereof.

The robot simplified model is constructed of an inverted pendulum A and two leg mass points $2m$, $2m$ (a supporting leg mass point and a free leg mass point). Each leg mass point $2m$ is a mass point associated with each leg body 2. Each of these leg mass points $2m$ is a fixed point in a local coordinate system arbitrarily set fixedly on the foot 22 of each corresponding leg body 2, and the position thereof is uniquely determined on the basis of the position/posture of each foot. For example, each foot mass point $2m$ is set at the point that is shifted toward the center of the ankle joint from a representative point of the sole of the foot 22 to the ankle joint side by a predetermined distance.

The inverted pendulum A is constituted of a free supporting point "a", which moves horizontally, a mass point b, and a mass-free, length-variable link c that connects the supporting point "a" and the mass point b. In this case, it is assumed that even if the link c inclines, the link c expands or contracts so as to maintain a height h of the mass point b observed from the supporting point "a" at a constant value.

The mass point b of the inverted pendulum A (hereinafter referred to simply as the inverted pendulum mass point b) corresponds to a mass point of the body 3 of the robot 1, and therefore, the inverted pendulum mass point b may be hereinafter referred to as the body mass point b. A position of the inverted pendulum mass point b will be hereinafter abbreviated to an inverted pendulum position. The mass of the body mass point b includes the mass of the body 3 and the masses of the arm bodies 5, 5 and the head 4.

The horizontal position of the body 3 of the robot 1 is geometrically determined from the horizontal position of the inverted pendulum mass point b. Specifically, for example, the horizontal position (an XY coordinates observed in the supporting leg coordinate system) of the representative point of the body 3, i.e., the horizontal component of the body position, agrees with the horizontal position of the inverted pendulum mass point b. In other words, as shown in FIG. 13, the representative point of the body 3 and the inverted pendulum mass point b are on the same vertical line.

The ZMP of the inverted pendulum A is located at the position of the free supporting point "a" (no moment is generated about the supporting point "a"); therefore, the position of the supporting point "a" of the inverted pendulum A will be hereinafter referred to as the inverted pendulum ZMP and denoted by ZMPpend.

To represent the robot simplified model by mathematical expressions, the variables and parameters related to the model will be defined as follows.

msup: Mass of supporting leg mass point $2m$; mswg: Mass of free leg mass point $2m$; mb: Mass of inverted pendulum mass point b; mtotal: Total mass of the robot 1 (=msup+mswg+mb); mfeet: Total mass of both leg bodies 2, 2 (=msup+mswg); xsup: Position of supporting leg mass point $2m$; xswg: Position of free leg mass point $2m$; xb: Position of inverted pendulum (Position of the body mass point b); and h: Height of inverted pendulum (Height from the supporting point "a" to the inverted pendulum mass point b of the inverted pendulum A).

Hereinafter, xb, xsup, and xswg will be expressed by three-dimensional vectors (XYZ coordinate vectors) unless otherwise specified. When X takes an arbitrary variable, dX/dt denotes a first-order differential of X and d2X/dt2 denotes a second-order differential of X. "g" denotes a gravitational acceleration constant. G denotes a gravitational acceleration vector whose X component, Y component, and Z component are 0, 0, and −g, respectively.

In the robot simplified model shown in FIG. 13, the moment acting about a certain point of action P due to a total inertial force of both leg mass points $2m$, $2m$ (a resultant force of the inertial force due to the motions of both leg mass points $2m$, $2m$ and gravity) is defined as a leg total inertial force moment about point P, and a coordinate (position) of the point of action P is denoted by xp.

Expression 01 given below is a dynamic definitional equation of the leg total inertial force moment about the point P.

Leg total inertial force moment about point $P=$
$msup(xsup-xp)*G-msup(xsup-xp)*d2xsup/dt2+$
$mswg(xswg-xp)*G-mswg(xswg-xp)*d2xswg/dt2$  Expression 01

The leg ZMP is denoted by ZMPfeet and defined by Expression 02. However, the height of the leg ZMP (Z component of ZMPfeet) is the same as the height of the point P. This leg ZMP is a value that is associated, in a quasi manner, with the resultant force of the inertial force generated by motions of the two leg bodies 2, 2 and gravity.

Leg total inertial force moment about point $P=mfeet*$
$(ZMPfeet-xp)*G$  Expression 02

The point of action P is set such that the approximation accuracy of the robot simplified model is enhanced. For example, the point of action P related to the current time's gait is set such that it linearly moves at constant velocity from the origin of the supporting leg coordinate system of the last time's gait to the origin of the supporting leg coordinate system of a current time's gait during a two-leg supporting period and that it is maintained at the origin of the supporting leg coordinate system of the current time's gait during a one-leg supporting period following the two-leg supporting period. The same applies to the point of action P related to the first turning gait and the second turning gait of a normal turning gait.

Further, the result obtained by dividing an object reaction force moment about a desired ZMP by the total mass mtotal of the robot 1 is defined as the object reaction force ZMP, and this is denoted as ZMPobj. More specifically, ZMPobj is defined by the following Expression 03.

$ZMPobj=$Object reaction force moment about desired
$ZMP/m$total  Expression 03

At this time, a linear relationship of the following Expression 04 approximately holds among the desired ZMP, the leg ZMP (ZMPfeet), the inverted pendulum ZMP (ZMPpend), and the object reaction force ZMP.

$ZMPpend=m$total/$mb*$desired $ZMP-m$feet/
$mb*ZMPfeet-m$total/$mb*ZMPobj$  Expression 04

Expression 04 is a relational expression on a sagittal plane (XZ plane), and on a lateral plane (YZ plane), the sign of a third term of the right side in Expression 03 is reversed from "−" to "+."

Further, a differential equation denoting a behavior of the inverted pendulum A is represented by the following Expression 05.

Horizontal component of $d2xb/dt2=g/h*$(Horizontal
component of $xb$−Horizontal component of
$ZMPpend$)  Expression 05

Expressions 01 to 05 given above are the expressions that describe the dynamics of the robot simplified model shown in FIG. 13.

Using the robot simplified model makes it possible to determine a desired body position from desired foot position/ posture, an object reaction force moment about a desired ZMP, the desired ZMP, and a desired body posture by the following dynamic calculation.

The dynamic calculation will be explained with reference to the block diagram of FIG. 14. FIG. 14 is the block diagram showing the dynamic calculation. The leg ZMP (ZMPfeet) is calculated according to Expressions 01 and 02 given above by a leg ZMP calculator 220 from the trajectories of desired positions/postures of both feet (desired positions/postures of the supporting leg foot 22 and the free leg foot 22) and the point of action P set as described above.

Further, the object reaction force moment about the desired ZMP is multiplied by 1/mtotal by a multiplier 222 to calculate the object reaction force ZMP (ZMPobj). Then, the result obtained by multiplying the calculated ZMPfeet by mfeet/mtotal by a multiplier 224 and the ZMPobj are subtracted from the desired ZMP by a subtracter 226, and a multiplier 228 multiplies the result of the subtraction by mtotal/mb, thereby carrying out the calculation of the right side of Expression 04 mentioned above. Thus, the inverted pendulum ZMP(ZMPpend) is calculated. Incidentally, ZMPpend determined according to the aforesaid calculation processing is on the sagittal plane. To calculate ZMPpend on the lateral plane, the calculation result of the multiplier 222 with a reversed sign may be input to the subtracter 226.

By supplying the ZMPpend calculated as described above to the inverted pendulum A, the inverted pendulum horizontal position xb is calculated according to Expression 05 given above. Further, based on the inverted pendulum horizontal position xb and the desired body posture, a desired body position is determined by a body position determiner 230. In this case, the body position determiner 230 defines the inverted pendulum horizontal position xb as the desired body horizontal position. Further, a desired body vertical position is determined on the basis of a desired body posture or the like by the body height determining technique previously proposed by the present applicant in, for example, Japanese Patent Application Laid-Open Publication H10-86080. Incidentally, in the present embodiment, the desired body posture of the robot 1 is, for example, a vertical posture.

Returning to the explanation of FIG. 5, the processing in S13 will be explained in detail below.

The processing in S13 determines the divergent component at the start of a normal gait on the basis of the aforesaid robot simplified model. If the divergent component in the gait is denoted by q and the horizontal velocity of the mass point b of the inverted pendulum A (or the body horizontal velocity) is denoted by vb, then q is defined by the following Expression 06 in the present embodiment.

$q = xb + vb/\omega 0$ \hfill Expression 06 where $\omega 0$ denotes a natural frequency of the inverted pendulum A, that is, a square root of g/h.

The technical meaning of the divergent component defined as described above has been explained in detail in PCT international publication WO/02/40224A1, so that the explanation thereof will be omitted herein.

When the divergent component q is defined as described above, if the dynamic equation of the inverted pendulum A (the above Expression 05) is broken up, a solution is given to q, and the above Expression 04 is applied to the solution result, then the following Expression 07 is obtained. The desired ZMP is denoted as ZMPtotal.

$q[k]=\exp(\omega 0 k\Delta t)*q[0]+\exp(\omega 0 k\Delta t)*$
$(\exp(-\omega 0\Delta t)-1)*\Sigma(\exp(-i\omega 0\Delta t)*$
$m\text{total}/mb*ZMP\text{tot al}[i])-\exp(\omega 0 k\Delta t)*$
$(\exp(-\omega 0\Delta t)-1)*(\exp(-i\omega 0\Delta t)*$
$m\text{feet}/mb*ZMP\text{feet}[i])-\exp(\omega 0 k\Delta t)*$
$(\exp(-\omega 0\Delta t)-1)*\Sigma(\exp(-i\omega 0\Delta t)*$
$m\text{total}/mb*ZMP\text{obj}[i])$ \hfill Expression 07 where exp( ) means an exponential function of the base e of a natural logarithm. Further, $\Delta t$ denotes time interval of a discrete system, and k denotes the number of steps ($k\Delta t$ means time). Further, $\Sigma$( ) of Expression 07 means cumulative adding calculation from i=0 to i=k−1.

Expression 07 is an expression that describes the divergent component q on the sagittal plane, and the expression that describes the divergent component q on the lateral plane is an expression obtained by reversing all signs of a fourth term of the right side of Expression 07 from "−" to "+".

Here, attention will be focused on a divergent component at the start of a normal turning gait (the start of the first turning gait) (hereinafter referred to as the initial divergent component) and a divergent component at the end (the end of the second turning gait) (hereinafter referred to as the terminal divergent component); q[0] (a divergent component at time 0) denotes the initial divergent component, and q[k] (a divergent component at time $k\Delta t$) denotes a terminal divergent component.

At this time, a first term of the right side of Expression 07 denotes the terminal divergent component generated by the initial divergent component. A second term of the right side denotes the terminal divergent component generated by a desired ZMP pattern. A third term of the right side denotes the terminal divergent component generated by motions of both leg bodies 2, 2 (motions of both leg mass points 2m, 2m). A fourth term of the right side denotes the terminal divergent component generated by an object reaction force moment pattern. Hereinafter, the second term of the right side will be denoted by Wzmptotal, the third term of the right side will be denoted by Wfeet, and the fourth term of the right side will be denoted by Wobj. More specifically, Wzmptotal, Wfeet, and Wobj are defined by the following expressions 08a, 08b, and 08c.

$W\text{zmp}\text{total}=-\exp(\omega 0 k\Delta t)*(\exp(-\omega 0\Delta t)-1)*$
$\Sigma(\exp(-i\omega 0\Delta t)*m\text{total}/mb*ZMP\text{tot al}[i])$ \hfill Expression 08a $W\text{feet}=-\exp(\omega 0 k\Delta t)*(\exp(-\omega 0\Delta t)-1)*$
$\Sigma(\exp(-i\omega 0\Delta t)*m\text{feet}/mb*ZMP\text{fe et}[i])$ \hfill Expression 08b $W\text{obj}=-\exp(\omega 0 k\Delta t)*(\exp(-\omega 0\Delta t)-1)*$
$\Sigma(\exp(-i\omega 0\Delta t)*m\text{total}/mb*ZMP\text{o bj}[i])$ \hfill Expression 08c Incidentally, Expression 08c is an expression that defines Wobj on the sagittal plane, and Wobj on the lateral plane is obtained by reversing the sign of the right side of Expression 08c.

Rewriting the above Expression 07 by using these Wzmptotal, Wfeet, and Wobj provides the following Expression 09.

$q[k]=\exp(\omega 0 k\Delta t)*q[0]+W\text{zmp}\text{total}+W\text{feet}+W\text{obj}$ \hfill Expression 09

In the present embodiment, the initial divergent component that satisfies a boundary condition of a normal turning gait is analytically determined according to the above Expressions 08a, 08b, 08c, and 09 such that the initial divergent component observed in the supporting leg coordinate system of the normal turning gait following a current time's gait (the next time's gait supporting leg coordinate system (X'Y' coordinate system) shown in FIG. 11) agrees with the terminal divergent component of the normal turning gait (the normal turning gait following the current time's gait) observed from the supporting leg coordinate system of the gait following the normal turning gait (the next but two time's gait supporting leg coordinate system (X'''Y''' coordinate system) shown in FIG. 11).

Here, if the terminal divergent component of the normal turning gait observed from the supporting leg coordinate system of the gait following the normal turning gait (next but two time's gait supporting leg coordinate system (X'''Y''' coordinate system) shown in FIG. 11) is denoted by q'[k], then the following Expression 10 must hold to satisfy the boundary condition of the normal turning gait.

$$q[0]=q'[k] \quad \text{Expression 10}$$

Further, if a rotating matrix for coordinate-converting a value described in the supporting leg coordinate system of the gait following the normal turning gait (next but two time's gait supporting leg coordinate system (X'''Y''' coordinate system) shown in FIG. 11) into a value described in the supporting leg coordinate system of the normal turning gait (the next time's gait supporting leg coordinate system (X'Y' coordinate system) shown in FIG. 11) is denoted by M, and a parallel movement vector of a coordinate origin is denoted by B, then the following Expression 11 is obtained.

$$q[k]=Mq'[k]+B \quad \text{Expression 11}$$

Thus, the following Expression 12 is derived from these Expressions 10 and 11.

$$q[k]=Mq[0]+B \quad \text{Expression 12}$$

This Expression 12 indicates the condition to be satisfied by the initial divergent component q[0] and the terminal divergent component q[k] in order to satisfy the boundary condition of the normal gait.

And, the following Expression 13 is derived from this Expression 12 and the above Expressions 08a to 08c and 09.

$$q[0]=inv(M-\exp(\omega 0 k \Delta t)I)(W zmp\text{total}+W\text{feet}+ W\text{obj}-B) \quad \text{Expression 13}$$

In Expression 13, inv( ) indicates an inverted matrix of the matrix in the parenthesis, and I denotes a unit matrix.

In the present embodiment, based on this Expression 13, the initial divergent component q[0] that satisfies the boundary condition of the normal turning gait is determined.

Specifically, based on the ZMP trajectory parameter of the normal turning gait determined in S11 described above, ZMPtotal[i](i=0, 1, ..., k−1), which denotes an instantaneous value of a desired ZMP at each time iΔt(i=0, 1, ..., k−1) of a normal turning gait, is determined, and the determined value is used to carry out the calculation of the right side of Expression 08a mentioned above, thereby calculating Wzmptotal. Incidentally, Wzmptotal may be calculated by algorithm that utilizes the fact that a desired ZMP trajectory is a kinked-line trajectory, as explained in the PCT international publication WO/02/40224A1.

Further, based on the foot trajectory parameter of the normal turning gait determined in the above S11, the instantaneous values of the foot position/posture at each time iΔt(i=0, 1, ..., k−1) of a normal turning gait are determined, and the determined values are applied to an expression that represents the above Expressions 01 and 02 in terms of discrete systems, thereby determining ZMPfeet[i]. Incidentally, the foot position/posture are calculated for each foot 22 by using, for example, the finite-duration setting filter proposed by the present applicant in Patent No. 3233450. In this case, the foot position/posture trajectory to be calculated will be a trajectory in which the free leg foot 22 in each of the first turning gait and the second turning gait of a normal turning gait rises at the start time of a one-leg supporting period and moves toward a predicted landing position of the free leg foot 22, and the free leg foot 22 lands at the heel thereof at a position corresponding to the predicted landing position at predicted landing time of the free leg foot 22. Then, the right side of the above Expression 08b is calculated using the ZMPfeet1[i] determined as described above, thereby calculating Wfeet. Supplementally, if the predicted landing position/posture of the free leg foot 22 are the same landing position/posture of the supporting leg foot 22 in the preceding gait, then the foot position/posture trajectory will be a trajectory in which the landing position/posture are maintained to be constant. Alternatively, however, a foot position/posture trajectory in which the free leg foot 22 is raised once and then put back to its original landing position/posture may be generated.

Further, based on an object reaction force moment trajectory parameter of the normal turning gait determined in the above S11, an object reaction force moment about a desired ZMP at each time iΔt(i=0, 1, ..., k−1) of a normal turning gait is determined, and the result is divided by mtotal to determine ZMPobj[i]. The determined ZMPobj[i] is used to calculate the right side of the above Expression 08c, thereby calculating Wobj.

The interval time Δt used in the calculation of Wzmptotal, Wfeet, and Wobj is preferably the same as the calculation processing cycle of the gait generator 100; however, it may be set to be longer than that to shorten the calculation processing time.

Then, from Wzmptotal, Wfeet, and Wobj determined as described above, the right side of the above Expression 12 is calculated so as to calculate the initial divergent component q[0] that satisfies the boundary condition of the normal turning gait.

The above has given the details of the processing in S13 in the present embodiment.

In the present embodiment, the initial divergent component q[0] has been analytically determined; alternatively, however, an initial divergent component of the normal turning gait that substantially agrees with a terminal divergent component of the normal turning gait observed from the supporting leg coordinate system of the gait that follows a normal turning gait following a current time's gait may be determined by an exploratory technique, as explained in, for example, the second embodiment in PCT international publication WO/02/40224A1.

Returning to the explanation of the flowchart of FIG. 5, after the processing in S13 is carried out as described above, the procedure proceeds to S15 wherein a gait parameter of a current time's gait is provisionally determined. The gait parameter includes a foot trajectory parameter that defines the foot position/posture trajectory, a ZMP trajectory parameter that defines a desired ZMP trajectory, and an object reaction force trajectory parameter that defines a desired object reaction force moment trajectory in the current time's gait.

The foot trajectory parameter of the gait parameter of the current time's gait is composed primarily of the positions/postures of the supporting leg foot 22 and the free leg foot 22, respectively, at the start and the end of the current time's gait and a gait cycle of the current time's gait. In this case, the free leg foot position/posture at the start of the current time's gait are the free leg foot position/posture of the current time's gait at the end of the last time's gait (the supporting leg foot position/posture of the last time's gait) observed from the supporting leg coordinate system of the current time's gait. The supporting leg foot position/posture at the start of the current time's gait are the supporting leg foot position/posture of the current time's gait at the end of the last time's gait (the free leg foot position/posture of the last time's gait) observed from the supporting leg coordinate system of the current time's gait. The free leg foot position/posture at the end of the current time's gait are determined on the basis of the predicted landing position/posture of the free leg foot 22 of the current time's gait. Specifically, the free leg foot position/posture at the end of the current time's gait are determined such that the position/posture obtained when the free leg foot 22 of the current time's gait is rotated by a predetermined angle in the pitch direction without slippage from the free leg foot position/posture at the end of the current time's gait while it is held in contact with a floor provide the predicted landing position/posture of the current time's gait. The supporting leg foot position/posture at the end of the current time's gait are the position/posture of the supporting leg foot 22 obtained when the supporting leg foot 22 is rotated in the pitch direction until substantially the entire bottom surface thereof is brought in contact with a floor without slippage while the supporting leg foot 22, whose position/posture have been matched with the supporting leg coordinate system of the current time's gait, is held in contact with the floor (the position/posture agree with the predicted landing position/posture of the free leg foot 22 of the last time's gait).

In the present embodiment, the supporting leg foot 22 at the end of the current time's gait has a posture that is substantially parallel to a floor surface; however, there is no need to always stick to this posture. For example, the heel of the supporting leg foot 22 may be off the floor surface at the end of a gait.

The ZMP trajectory parameter of the gait parameter of the current time's gait is set to be the same as the ZMP trajectory parameter provisionally determined in S07. Hence, a desired ZMP trajectory defined by this ZMP trajectory parameter has a pattern as shown in, for example, FIG. 10(a) mentioned above.

Further, the object reaction force moment trajectory parameter of the gait parameter of the current time's gait is determined such that the object reaction force moment trajectory defined thereby agrees with the trajectory associated with the current time's gait of the object reaction force moment trajectory calculated in S09 mentioned above.

Subsequently, the procedure proceeds to S17 wherein the ZMP trajectory parameter of the gait parameter provisionally determined in S15 is corrected such that the current time's gait converges to a normal turning gait. To be more specific, the ZMP trajectory parameter is corrected such that the divergent component at the end of the current time's gait substantially agrees with the divergent component at the start of the normal turning gait.

In the present embodiment, the provisional desired ZMP is corrected by adding the ZMP correction amount shown in FIG. 10(b) to the provisional desired ZMP so as to cause the divergent component at the end of the current time's gait to agree with the divergent component at the start of the normal turning gait. Thus, the desired ZMP as shown in FIG. 10(c) is obtained.

In this case, the basic guideline of the processing for correcting the provisional desired ZMP is the same as that in PCT international publication WO/02/40224A1, but it differs from the one in the application in that an object reaction force moment is taken into account. The following will specifically explain the processing in S17, focusing mainly on the different aspect. Among the variables and symbols used in this processing, regarding the variables having the meanings similar to those explained in relation to the processing for determining the divergent component at the start of a normal gait (S13), the same variables and symbols previously defined in relation to a normal gait will be used in the explanation of the processing in S17. In the following explanation, for the convenience of understanding, a correction of a component of a ZMP in the X-axis direction will be explained.

In the present embodiment, the ZMP correction amount has a trapezoidal shape, as shown in FIG. 10(b), the height thereof being denoted by "a". The time of the break points of the trapezoid are set to match the time of the break points of the provisional desired ZMP trajectory, as illustrated. In the present embodiment, the ZMP correction amount is generated in a one-leg supporting period of a current time's gait. Further, a result obtained by coordinate-converting the initial divergent component determined in S13 described above into the value observed from the supporting leg coordinate system of the current time's gait is denoted by q". In other words, the divergent component at the start of the normal turning gait observed in the supporting leg coordinate system of the current time's gait is denoted by q". Further, the divergent component at the end of the current time's gait generated due to the provisional desired ZMP trajectory is denoted by Wzmptmp and the divergent component at the end of the current time's gait generated due to the ZMP correction amount pattern when a=1 is denoted by Wtrim.

At this time, if the terminal divergent component generated due to the desired ZMP trajectory that has been corrected is denoted by Wzmptotal, then the following Expression 14 is approximately obtained.

$$Wzmp\text{total}=Wzmp\text{tmp}+a*W\text{trim} \qquad \text{Expression 14}$$

Accordingly, the terminal divergent component q" of the current time's gait after the desired ZMP has been corrected is represented by the following Expression 15 similar to the aforesaid Expression 09 explained in relation to the normal gait.

$$q''=\exp(\omega 0 k\Delta t)*q[0]+Wzmp\text{tmp}+a*W\text{trim}+W\text{feet}+W\text{obj} \qquad \text{Expression 15}$$

In Expression 15, $k\Delta t$ denotes the time of the end of a current time's gait, $q[0]$ denotes the divergent component at the start of the current time's gait, Wfeet denotes the terminal divergent component generated by motions of both leg bodies 2, 2 of the current time's gait, and Wobj denotes a terminal divergent component generated due to the object reaction force moment trajectory of the current time's gait.

From this Expression 15, the following Expression 16 for determining the height "a" of the trapezoid of the ZMP correction amount is obtained.

$$a=(q''-\exp(\omega 0 k\Delta t)*q[0]-Wzmp\text{tmp}-W\text{feet}-W\text{obj})/W\text{trim} \qquad \text{Expression 16}$$

Thus, in the present embodiment, the height "a" of the trapezoid of the ZMP correction amount is determined according to Expression 16. In this case, the initial divergent component $q[0]$ is calculated according to the aforesaid Expression 06 from the position of the inverted pendulum (or the body position) at the start of the current time's gait and the changing velocity thereof. Further, Wzmptmp is determined in the same manner as that for determining Wzmptotal related to a normal turning gait from the provisional desired ZMP trajectory defined by the ZMP trajectory parameter provisionally determined in S15. Wtrim is determined in the same manner as that for determining Wzmptotal related to a normal turning gait from the ZMP correction amount pattern determined by setting the height "a" of the trapezoid to 1. Wfeet is determined according to the aforesaid Expression 08b in the same manner as that for determining Wfeet related to a normal turning gait from the foot trajectory parameter provisionally determined in S15. Wobj is determined according to the aforesaid Expression 08c in the same manner as that for determining Wobj related to a normal turning gait from the object reaction force moment trajectory parameter provisionally determined in S15.

In S17, the ZMP correction amount determined on the basis of the height "a" of the trapezoid determined as described above is added to a provisional desired ZMP trajectory so as to correct the ZMP trajectory parameter.

In the present embodiment, the ZMP correction amount has been analytically determined; alternatively, however, it may be determined in an exploratory manner. In this case, processing is repeated in which a current time's gait is provisionally created using a desired ZMP trajectory obtained by correcting a provisional desired ZMP by a ZMP correction amount in which the value of the trapezoid height "a" has been set to a proper value, then based on, for example, the difference between the divergent component at the end of the provisionally created current time's gait and the divergent component at the start of a normal gait, the value of the trapezoid height "a" is corrected such that the difference is reduced. And, lastly, the ZMP correction amount may be determined on the basis of the value of the trapezoid height "a" obtained when the divergent component at the end of the provisionally created current time's gait and the divergent component at the start of a normal gait substantially agree with each other.

After the processing in S17, the procedure proceeds to S19 wherein it is determined whether the desired ZMP determined on the basis of the corrected ZMP trajectory parameter is appropriate. Specifically, if the desired ZMP after a correction does not deviate from the ground contact surface of the supporting leg foot 22 of the current time's gait or deflected to the vicinity of a boundary of the ground contact surface, that is, if a stability allowance of the robot 1 can be secured, then it is determined that the desired ZMP is appropriate, and if not, then it is determined that the desired ZMP is inappropriate.

If the determination result of S19 is NO, then the procedure proceeds to S21 wherein an element related to a parameter other than the ZMP trajectory parameter of the current time's gait parameter, e.g., a desired object reaction force trajectory related to an object reaction force moment trajectory parameter, is corrected. In this case, the desired object reaction force trajectory is corrected such that a ZMP correction amount is minimized as much as possible (smaller than at least the ZMP correction amount determined before the desired object reaction force trajectory is corrected) when the processing of S09 to S17 is carried out again after the correction.

An example of correcting a desired object reaction force trajectory will be explained below. For instance, it is assumed that a desired object motion trajectory (position trajectory) based on a moving plan is a trajectory in which the object 120 is decelerated in the X-axis direction from time t1 and stopped at time t3, as shown by a graph g2 of FIG. 15($a$). A graph g3 of FIG. 15($a$) is an example of a desired body position trajectory determined on the basis of the desired object motion trajectory. At this time, if deceleration or acceleration of the object 120 from time t1 is relatively large, then the ZMP correction amount related to the current time's gait at certain current time t2 after the time t1 may become excessive in the positive direction of the X axis, thus deviating from the ground contact surface of the supporting leg foot 22 (in this case, a determination result of S19 is NO). And, if a desired gait were continued to be generated as it is, then a desired gait in which the body 3 of the robot 1 bumps against the object 120 at certain time t4 would be undesirably generated, as illustrated in the figure.

Therefore, in such a case, the desired object reaction force trajectory is corrected such that the desired object reaction force is increased in the negative direction of the X axis during a certain period ΔT1 after the current time t2, as shown in FIG. 15($b$), in relation to the desired object reaction force trajectory provisionally determined in S03, as described above. In other words, the desired object reaction force is corrected such that an acting force to be applied to the object 120 from the robot 1 (a force obtained by reversing the sign of the desired object reaction force) is increased in the positive direction of the X axis. In this case, the magnitude of the period ΔT1 during which the desired object reaction force is increased or an increment ΔF1 thereof is determined such that the ZMP correction amount determined by the processing of the aforesaid S09 to S17 on the basis of a corrected desired object reaction force is minimized as much as possible and a determination result of S19 is YES. Such ΔT1 or ΔF1 can be determined in an analytical manner or an exploratory manner.

By correcting the desired object reaction force trajectory as described above, the object reaction force moment trajectory parameter of the current time's gait parameter is determined in S15 such that a motion of the body 3 that causes the robot 1 to positively push the object 120 is implemented. As a result, the desired gait generated on the basis of the current time's gait parameter will be a gait that prevents the body 3 of the robot 1 from bumping against the object 120 while securing a stability allowance.

After carrying out the processing in S21, the processing of S09 to S17 is executed again as mentioned above. At this time, the determination result in S19 following S17 will be YES, and in this case, the procedure will then proceed to S23 in FIG. 6.

In S23, based on a current time's gait parameter and a normal gait parameter at current time, a desired body position/posture trajectory from the current time to the end of a second turning gait of a normal gait (up to the third step, including one step of the current time's gait) is calculated, and also, based on a desired object motion trajectory, a desired hand position/posture trajectory is calculated. In other words, in S23, a desired gait in the period of three steps, including the current time step, is provisionally generated.

In this case, the desired body position/posture trajectory is calculated, as explained with reference to the block diagram of FIG. 14 mentioned above, on the basis of the gait parameter of each gait in the order of the first turning gait and the second turning gait of the current time's gait and the normal turning gait. To be more specific, the trajectories of the desired positions/postures of both feet are calculated on the basis of a foot trajectory parameter of each gait, and a desired ZMP trajectory and an object reaction force moment trajectory are calculated on the basis of a ZMP trajectory parameter and an object reaction force moment trajectory parameter, respectively. In the same manner as in the case explained in relation to the processing for calculating ZMPfeet[i] in the processing of S13 described above, the processing for calculating the trajectories of the desired positions/postures of both feet is carried out on each foot 22 by using the finite-duration setting filter proposed by the present applicant in Japanese Patent No. 3233450. Then, these trajectories of the desired positions/postures of both feet, the desired ZMP trajectory, and the object reaction force moment trajectory are used in the calculation processing shown in the block diagram of FIG. 14 so as to determine desired body position/posture. In the present embodiment, the desired state posture is a vertical posture. Thus, by calculating the desired body position/posture, a desired body position/posture trajectory of a desired motion of the robot 1 is calculated such that the dynamic balance condition in which the horizontal component of a moment generated about the desired ZMP by the resultant force of an inertial force produced by a motion of the robot 1 and a desired object reaction force and gravity acting on the robot 1 becomes zero on the simplified model of the robot is satisfied.

Further, the desired hand position/posture trajectory is calculated on the basis of the desired object motion trajectory in the same manner as that for determining in S09 in the order of the first turning gait and the second turning gait of the current time's gait and a normal turning gait. The desired object motion trajectory associated with the first turning gait and the second turning gait of the normal turning gait is the desired object motion trajectory associated with a next time's gait and a next but one time's gait of the desired object motion trajectory provisionally determined in S03.

The processing in S05 to S23 explained above corresponds to the processing of the robot gait provisionally determining means in the first invention of the present invention. In this case, the current time's gait parameter and the normal gait parameter finally obtained by the processing in S05 to S21 correspond to the gait parameters provisionally determined by the processing carried out by the robot gait provisionally generating means in the first invention.

Subsequently, the procedure proceeds to S25 wherein the geometric restrictive conditions of the robot 1 and the object 120 are checked. Here, the geometric restrictive conditions include conditions that, for example, whether the object 120 and the robot 1 interfere with each other (e.g., the body 3 coming in contact with the object 120) and whether the rotational angles of the joints of each arm body 3 remain within mechanical limits. Whether the body 3 of the robot 1 and the object 120 interfere with each other can be determined from desired body position/posture and a desired object motion trajectory. Further, the rotational angles of the joints of each arm body 3 can be determined from the desired body position/posture and the desired hand position/posture, so that it can be determined whether the rotational angles fall within the mechanical limits.

The determination processing in S25 is sequentially carried out on an instantaneous value of a desired body posture and the like at predetermined time intervals from current time to the end of the second turning gait. More specifically, on each instantaneous value, if the determination result of S25 is OK, then it is determined in S27 whether checking at every time from current time to the end of the second turning gait has been completed. And, if the determination result in this S27 indicates NO, then the determination processing in S25 is repeated.

If the determination result in S25 is NG, then the procedure proceeds to S29 wherein at least one of the predicted landing position/posture and the desired object motion trajectory is corrected so as to satisfy the geometric restrictive conditions at the time when the determination result indicated NG. An example of the correction will be explained with reference to FIG. 16.

Referring to the figure, it is assumed that the desired object motion trajectory (position trajectory) in the X-axis direction on the basis of a moving plan at current time t1 is the trajectory indicated by a graph g4 in the figure (hereinafter referred to as "the original trajectory"), and it is further assumed that a desired body position and a desired object position at certain time t2 in the future come excessively close to each other with resultant interference between the body 3 and the object 120, causing the determination result of S25 to be NG. At this time, the desired object position at time t2 at which the interference occurs is shifted in the positive direction of the X axis, i.e., away from the robot 1, as indicated by the dashed-line arrow in the figure, and the desired object motion trajectory (position trajectory) over a period $\Delta T2$ before and after time t2 is changed to the corrected trajectory indicated by a graph g5. The corrected trajectory g5 is determined such that it smoothly connects to the original trajectory g4 at both ends of the period $\Delta T2$ in order to avoid a sudden change of a behavior of the robot 1. A shift amount $\Delta X$ at time t2 is determined such that it eliminates the possibility of interference between the body 3 of the robot 1 and the object 120 (such that the determination result of S25 indicates OK).

In the aforesaid example, the case where the desired object motion trajectory is corrected has been taken as an example and explained; alternatively, however, the predicted landing position/posture of the free leg foot 22 in a gait that includes the time at which the determination result of S25 is NG may be corrected instead of correcting the desired object motion trajectory. For instance, if the interference occurs at time t2 as in the case shown in FIG. 16, then the predicted landing position/posture in the gait that includes the time t2 may be corrected to position/posture away from the object 120 in the X-axis direction. As an alternative, both the desired object motion trajectory and the predicted landing position/posture may be corrected.

Upon completion of the correction processing in S29, the procedure returns to S05 to carry out the processing from this S05, as described above. Thus, if the geometric restrictive conditions are not satisfied, a desired object motion trajectory or predicted landing position/posture are corrected and eventually a foot trajectory parameter of a current time's gait parameter is corrected. In this case, if the desired object motion trajectory is corrected, then the foot trajectory parameter (the predicted landing position/posture and the predicted landing time of the free leg foot 22) will be accordingly corrected by the processing in SOS. If the predicted landing position of the free leg foot 22 is corrected without correcting the desired object motion trajectory in S29, then the processing from S07 may be carried out, omitting the processing in SOS.

Supplementally, the processing of S25 to S29 corresponds to the correcting means in the first invention of the present invention.

Meanwhile, if the determination result of S27 indicates YES, then the procedure proceeds to S31 of FIG. 7. In this S31, current time's gait instantaneous values at current time except for hand position/posture instantaneous values are calculated on the basis of the current time's gait parameter such that a desired ZMP is satisfied.

The calculation processing is performed as described below. Based on a foot trajectory parameter of the current time's gait parameter, the instantaneous values of desired foot position/posture are calculated. In the same manner as in the case explained in relation to the processing for calculating ZMPfeet[i] in the processing of S13 described above, this calculation processing is performed on each foot 22 by using the finite-duration setting filter proposed by the present applicant in Patent No. 3233450. As in the case explained regarding a normal gait, if the predicted landing position/posture of the free leg foot 22 of the current time's gait are the same as the landing position/posture of the supporting leg foot 22 of the last time's gait, then the instantaneous values of the desired foot positions/postures of the current time's gait are maintained to be the state at the start of the current time's gait. Alternatively, however, the instantaneous values of the foot position/posture trajectory of the free leg foot 22 of the current time's gait may be generated such that the free leg foot 22 of the current time's gait is raised once and then put back to its original landing position/posture.

Further, an instantaneous value of the desired ZMP is calculated on the basis of a ZMP trajectory parameter of the current time's gait parameter, and an instantaneous value of a desired object reaction force moment is calculated on the basis of an object reaction force moment trajectory parameter.

Further, the instantaneous values of the desired body position/posture are calculated by the dynamic calculation in FIG. 14 described above from the instantaneous values of the desired foot position/posture, the instantaneous value of the desired ZMP, and the instantaneous value of the desired object reaction force moment calculated as described above. In the present embodiment, the desired body posture is, for example, a vertical posture. However, it is not required to maintain the desired body posture at the vertical posture; the desired body posture may be changed. If the desired body posture is changed, the robot simplified model is desirably a dynamic model that takes into account an angular momentum change of the robot 1 involved in the change of the posture of the body 3. For example, a dynamic model proposed by the applicant of the present application in PCT international publication WO/03/057422A1, as shown in FIG. 10 of the publication, may be used.

By the processing in S31 described above, the instantaneous values of the desired foot position/posture and the desired body position/posture of a motion of the desired gait of the robot 1 are determined. In the robot 1 in the present embodiment, each leg body 2 has six degrees of freedom, so that once the desired body position/posture and the desired foot position/posture are determined, the rotational angles of the joints of each leg body 2 are uniquely determined. Supplementally, in the present embodiment, the desired body position/posture determined in S31 are further corrected by the processing in S39, which will be discussed later.

Subsequently, the procedure proceeds to S33, wherein an actual object position, which is an actual position (moving position) of the object 120 at the previous calculation processing cycle (the calculation processing cycle of the gait generator 100), is estimated on the basis of a last time value of a final corrected desired hand position (a value at the last time calculation processing cycle). Here, the final corrected desired hand position is determined by an arm main controller 106, which will be discussed later, and it corresponds to a command value of an actual hand position of the robot 1. Thus, for example, the last time value of the final corrected desired hand position is defined as the last time value of an actual hand position of the robot 1, and a position that has a predetermined relative positional relationship therewith is estimated as the actual object position. It is also possible to provide the object 120 with a gyro sensor or an acceleration sensor, and to estimate an actual object position from detection values thereof.

Subsequently, the procedure proceeds to S35 wherein an instantaneous value (current time value) of a desired object motion, an instantaneous value (current time value) of an estimated disturbance force, and an instantaneous value (current time value) of a desired object reaction force are calculated using an object dynamic model on the basis of a difference between the actual object position estimated as described above and the desired object position (hereinafter referred to as the object position difference) and the current desired object motion trajectory. The desired object position out of the actual object position and the desired object position that define the object position difference uses the value determined at the last time calculation processing cycle (the last time value).

Here, the object dynamic model used in the processing in S35 and the processing in S35 will be explained with reference to the block diagram of FIG. 17. FIG. 17 is a block diagram showing the calculation processing for determining a desired object position, a desired object reaction force, and an estimated disturbance force of a desired object motion in S03. The part indicated by a reference numeral 238 in the figure is an object dynamic model showing a relationship between forces acting on the object 120 and motions of the object 120. This object dynamic model partly differs in structure from that shown in FIG. 9 mentioned above, so that the object dynamic model in FIG. 17 will be referred to as an object dynamic model 2 in the following explanation to distinguish it from the object dynamic model shown in FIG. 9.

The basic structure of the object dynamic model 2 is the same as that of the object dynamic model in FIG. 9. A force acting on the object 120 (more specifically, a translational force in the horizontal direction) is taken as an input, and the input value (the value determined by a multiplier 242, which will be discussed later) is multiplied by an inverse number 1/M of a mass M of the object 120 by a multiplier 244 so as to determine a motional acceleration of the object 120, then the determined motional acceleration is sequentially integrated (double-integrated) by integrators 246 and 250. However, the object dynamic model 2 differs from the object dynamic model in FIG. 9 in that the integrator 250 additionally receives a model velocity manipulated variable in addition to an output (an integral value of motional acceleration) of the integrator 246. This model velocity manipulated variable is a velocity manipulated variable determined by a model velocity manipulated variable determiner 252 and by a feedback control law such that a difference between an actual object position and a desired object position is approximated to zero, and it is determined according to the following expression 17 in the present embodiment.

Model velocity manipulated variable=$Ke1*$ Object position error+$\int (Ke2*$ Object position error)$dt$    Expression 17

In other words, the model velocity manipulated variable is determined from an object position error by a PI control law (a proportional integral control law). Incidentally, Ke1 and Ke2 of Expression 17 denote predetermined gains. A model velocity manipulated variable determiner 252 in FIG. 17 is an calculation processor that performs the calculation of the right side of Expression 17. More specifically, based on an actual object position (the current time value determined in S33 at the current calculation processing cycle) and a desired object position (a last time value determined in S35 at the last calculation processing cycle), the model velocity manipulated variable determiner 252 determines an object position error, which is the difference thereof, by a subtracter 254. Then, a result obtained by multiplying the determined object position error by the gain Ke1 by a multiplier 256 (a proportional) and a result obtained by further integrating by an integrator 260 the result obtained by multiplying the object position error by the gain Ke2 by a multiplier 258 (an integral term) are added by an adder 262 to calculate a model velocity manipulated variable. The calculated model velocity manipulated variable is added to an output of the integrator 246 by an adder 248 provided at the input side of the integrator 250 of the object dynamic model 2, and then the result is supplied to the integrator 250. Supplementally, in the block diagram of FIG. 17, the model velocity manipulated variable is calculated and then the calculation result is additionally supplied to the object dynamic model 2; alternatively, however, the integrator 260 of the model velocity manipulated variable determiner 252 may be omitted and an output of the multiplier 258 may be input to the integrator 246 and the sum of an output of the integrator 246 at this time and an output of the multiplier 256 may be input to the integrator 250 at the same time. This will also cause an output of the object dynamic model 2 (output of the integrator 250) to be the same as that in FIG. 17.

In the object dynamic model 2 described above, a result obtained by integrating an output of the adder 248 by the integrator 250 is obtained as an instantaneous value of a desired object position. Further, an output of the adder 248 is an object model velocity, which is a moving velocity of the object 120 on the object dynamic model 2.

A required value of a force (translational force) acting on the object 120, which is an input to the object dynamic model 2, is obtained by multiplying a difference (Desired object velocity−Object model velocity), which is determined by a subtracter 240 from a desired object velocity based on a current desired object motion trajectory (a desired object motion trajectory when a determination result of S27 is YES) and an object model velocity, by a predetermined gain Kv by the multiplier 242. In other words, the required value of a translational force input to the object dynamic model 2 is determined by a feedback control law (the proportional control law in this example) such that a difference between an object desired velocity and an object model velocity converges to zero, as that shown in FIG. 9. However, the object model velocity in this case is an output of the adder 248, as described above, so that it is different from that shown in FIG. 9 in that a model velocity manipulated variable has been taken into account. Further, a desired object velocity is obtained as a first-order differential value of a position trajectory of a current desired object motion trajectory.

And, a value obtained by reversing the sign of the required value of the translational force determined as described above is determined as an instantaneous value of a desired object reaction force. Further, the required value of the translational force is input to the multiplier 244 of the object dynamic model 2, and the model velocity manipulated variable is input to the adder 248, thereby outputting an instantaneous value of a desired object position from the integrator 250 of the object dynamic model 2. In other words, the object model velocity as a motion state amount of the object 120 on the object dynamic model 2 is corrected using a model velocity manipulated variable for bringing the difference between the desired object position and an actual object position close to zero, thereby sequentially determining desired object positions by the dynamic calculation of the object dynamic model 2.

Further, the part indicated by a reference numeral 264 in FIG. 17 is an estimated disturbance force determiner that carries out the processing for determining an estimated disturbance force. An object model velocity and the required value of the translational force are input to the estimated disturbance force determiner 264. The object model velocity is input to a converter 266 expressed by a transfer function in the form of M·s/(Tc·s+1), and an estimated value of a translational force acting on the object 120 is calculated by the converter 266. The M in the transfer function of the converter 266 denotes the mass of the object 120 and Tc denotes a predetermined time constant. Hence, the converter 266 determines, as an estimated value of a translational force acting on the object 120, the value obtained by carrying out filtering processing that has the time constant Tc on the result obtained by multiplying a differential value (first-order differential value) of the object model velocity by the mass of the object 120 (this corresponds to the instantaneous value of the resultant force of all forces acting on the object 120). In other words, the estimated value calculated by the converter 266 follows, with a first-order lag of the time constant Tc, a translational force that generates a motional acceleration of the object 120 (a differential value of an object model velocity) on the object dynamic model 2. Further, an instantaneous value of an estimated disturbance force is calculated by subtracting the required value of a translational force, which is an output of the multiplier 242 (this meaning an estimated value of a force to be applied to the object 120 from the robot 1), from the estimated value of the translational force by the subtracter 268. The instantaneous value of the estimated disturbance force thus determined is used in the calculation processing in S02 (refer to FIG. 9), as described above.

Supplementally, the estimated disturbance force determiner 264 corresponds to the model manipulated variable determining means in the first invention of the present invention, and an estimated disturbance force determined thereby corresponds to a model manipulated variable in the first invention of the present invention.

Incidentally, an instantaneous value of a desired object posture of a desired object motion is determined such that it substantially agrees with, for example, the direction of a desired object velocity.

The above describes the calculation processing in S35. The estimated disturbance force determined by the calculation processing in this S35 is the actual disturbance force of a force acting on the actual object 120 that is estimated in real time, the actual disturbance force being applied from a source other than the robot 1. Hence, using the estimated disturbance force in the calculation processing in S02 described above (inputting the estimated disturbance force to the object dynamic model in FIG. 9) makes it possible to bring a behavior (motional state) of the object 120 on the aforesaid object dynamic model in FIG. 9 close to a behavior (motional state) of the actual object 120.

Subsequently, the procedure proceeds to S37 wherein the instantaneous values (the current time values) of desired hand position/posture are determined on the basis of the instantaneous value of the desired object motion determined in S35. The instantaneous values of the desired hand position/posture are determined in the same manner as that for determining the desired hand position/posture trajectory in S09.

Of the instantaneous values of the desired gait determined by the processing up to S37 described above, the desired body position/posture are determined using the aforesaid robot simplified model such that a desired ZMP is satisfied on the robot simplified model (such that the horizontal component of a moment generated about a desired ZMP by a resultant force of an inertial force attributable to a motion of the robot 1, the gravity, and an object reaction force moment is zero). Hence, the desired gait determined by the processing up to S37 is a gait in which a floor reaction force moment horizontal component about a desired ZMP is zero on the robot simplified model.

Here, the robot simplified model does not necessarily exhibit high dynamic accuracy although it is highly advantageous in that the calculation load of the gait generator 100 can be effectively reduced. For this reason, in the present embodiment, some constituent elements of a desired gait (specifically, the instantaneous values of desired body position/posture and the instantaneous value of a floor reaction force moment about a desired ZMP) are corrected by further using a robot dynamic model having higher dynamic accuracy (hereinafter referred to as "the full model"). This correction processing is called the full model correction, and this full model correction is performed in S39 that follows the processing in S37.

The full model correction is performed in exactly the same manner as that explained in, for example, Japanese Patent Application Laid-Open Publication No. 2002-326173 previously proposed by the applicant of the present application. Therefore, the explanation thereof will be omitted in the present description. The full model correction may alternatively be accomplished in the same manner as that explained in, for example, PCT international publication WO 03/057427 A1 by the applicant of the present application.

The desired body position/posture and the floor reaction force moment about the desired ZMP are corrected by the full model correction in S39. Thus, the instantaneous values of all constituent elements of the desired gait finally output by the gait generator 100 are obtained. Incidentally, the full model correction may be omitted.

The processing of S01 to S39 explained above is the processing carried out for each calculation processing cycle of the gait generator 100.

The following explains the processing for correcting a moving plan in S01, the explanation of which has been postponed.

When the robot 1 is traveling while pushing the object 120, if a step (a convex portion on a floor) not expected in a current moving plan (e.g., a moving plan as per the aforesaid traveling request) is encountered or if an unexpected external force acts on the object 120 from something other than the robot 1, then a deviation of a real object motion trajectory (hereinafter referred to as the actual object motion trajectory) from a desired object motion trajectory based on a moving plan increases. Meanwhile, the gait generator 100 determines a gait parameter or the like on the basis of a desired object motion trajectory to generate a gait, so that if the deviation of an actual object motion trajectory from a desired object motion trajectory becomes excessive, then it is difficult to generate a gait that allows continual stability of the robot 1 to be secured. Hence, in S01 in the present embodiment, if the deviation reaches a certain degree (or if it is expected to increase), then the moving plan determined in S01 is corrected in real time.

The following will explain a specific example of the processing with reference to FIGS. 18(a) and (b). For instance, it is assumed that a current moving plan (before corrected) is a plan for moving the object 120 at a constant velocity in the positive direction of the X axis. At this time, a desired object position trajectory of a desired object motion trajectory (a time series of instantaneous values) calculated in S35 as described above on the basis of the moving plan before a correction (hereinafter referred to as the before-correction moving plan) will be approximately the trajectory as shown by a graph g6 in FIG. 18(a). Here, it is assumed that the actual object 120 stops at time t1 by being caught by a step (a convex portion) of a floor, which is not expected in the before-correction moving plan. At this time, the trajectory of the actual object position (the time series of the actual object positions estimated in S33) will be a trajectory as shown by a graph g7 in FIG. 18(a). In this case, after time t1, the difference between the desired object position based on the before-correction moving plan and the actual object position will increase as time elapses.

Hence, in S01, the magnitude (the absolute value) of an object position error (a difference between an actual object position and a desired object position) determined in S35 at, for example, a last calculation processing cycle, that is, the object position error determined by the subtracter 254 in FIG. 17, is compared with a predetermined value. Then, when the magnitude of the object position error increases to be larger than the predetermined value (time t2 in FIG. 18(a)), the before-correction moving plan is corrected so as to restrain the increase in the object position error, as indicated by a graph g8 in FIG. 18(a). The corrected moving plan will be hereinafter referred to as the after-correction moving plan. In the example shown in FIG. 18(a), the after-correction moving plan will be a moving plan in which the moving velocity of the object 120 is gradually decelerated after time t2 until the moving velocity reaches substantially zero. The after-correction moving plan is desirably determined such that a desired object motion defined thereby will smoothly continue without causing a sudden change relative to the before-correction moving plan.

Thus, correcting a moving plan as described above makes it possible to generate a gait that allows continual stability of the robot 1 to be secured without causing a desired object reaction force to become excessive.

Further, in the processing of S01 in the present embodiment, a moving plan is corrected so as to bring an after-correction moving plan close to a before-correction moving plan when an actual object position better follows a desired object position trajectory based on the after-correction moving plan after the moving plan has been corrected as described above, causing the difference between a desired object motion trajectory and an actual object motion trajectory to be reduced to a certain degree. The moving plan after the correction will be hereinafter referred to as an after-recorrection moving plan.

The following will explain by taking, as an example, a case where the after-correction moving plan has been determined as shown in FIG. 18(a). When the object 120 rides over a step (time t3 in FIG. 18(b)), the actual object position trajectory will approximate the desired object position trajectory g8 based on the after-correction moving plan, as indicated by the graph g7 in FIG. 18(b).

At this time, in S01, when the object position error reduces to be smaller than the predetermined value (time t4 in FIG. 18(b)), the after-correction moving plan is recorrected such that the moving velocity of the object 120 approximates the moving velocity of the object 120 based on the original before-correction moving plan, as indicated by a graph g9 in FIG. 18(b), thus determining an after-recorrection moving plan. In the example of FIG. 18(b), the after-recorrection moving plan will be a moving plan in which the moving velocity of the object 120 is gradually increased until the moving velocity of the object 120 substantially agrees with the moving velocity based on the original before-correction moving plan after time t4. The after-recorrection moving plan is desirably determined such that the desired object motion defined thereby smoothly continues without causing a sudden change relative to the after-correction moving plan.

In the example described above, the moving velocity of the object 120 based on the after-recorrection moving plan has been approximated to the moving velocity based on the before-correction moving plan; it is also possible, however, to bring the desired object position trajectory based on the after-recorrection moving plan close to the object position trajectory based on the before-correction moving plan.

The above has described in detail the processing of the gait generator 100 in the present embodiment.

The following will explain processing other than that carried out by the gait generator 100 of the control unit 60. This processing is the same as that proposed in the first embodiment in Japanese Patent Application Laid-Open Publication H10-230485, as previously mentioned, so that only a schematic explanation thereof will be given.

A desired body position/posture trajectory, a desired ZMP trajectory, and a desired object reaction force trajectory of a desired gait generated by the gait generator 100 are input to an object reaction force balance controller 102. The object reaction force balance controller 102 calculates a compensating total floor reaction force for object reaction force balance control to correct a desired floor reaction force moment about a desired ZMP so as to cancel (bring close to zero) the difference between a desired object reaction force and an actual object reaction force, which is the reaction force received by the actual robot 1 from the object 120, and also determines corrected desired body position/posture obtained by correcting the desired body position/posture of a desired motion. The processing of the object reaction force balance controller 102 will be discussed later.

Further, a desired foot position/posture trajectory, a desired ZMP trajectory, and a desired total floor reaction force trajectory of a desired gait are supplied to a leg main controller 104. The leg main controller 104 further receives corrected desired body position/posture and a compensating total floor reaction force for object reaction force balance control from the object reaction force balance controller 102. The leg main controller 104 controls the joint actuators (electric motors) of the leg bodies 2, 2 by compliance control processing such that a motion (excluding motions of the arm bodies 5, 5) and a floor reaction force of a desired gait are followed. More specifically, in order to restore a detection value (actual body posture) of the posture sensor 54 to a corrected desired body posture, a restoring total floor reaction force to be generated at a desired ZMP is calculated, and desired foot position/posture are corrected such that an actual total floor reaction force moment component (this being determined from a detection value of the six-axis force sensor 50 of each of leg bodies 2, 2) acting on the desired ZMP agrees with a moment component of a resultant force of the restoring total floor reaction force, the desired total floor reaction force, and the compensating total floor reaction force for object reaction force balance control. The desired foot position/posture that have been corrected are referred to as the corrected desired foot position/posture. Then, the leg main controller 104 controls the joint actuators of both leg bodies 2, 2 (outputs a motor drive command of each leg body 2 to each joint actuator) such that actual joint displacements follow the desired joint displacements of both leg bodies 2, 2 determined from the corrected desired foot position/posture and the corrected desired body position/posture.

Further, a desired hand position/posture trajectory and a desired object reaction force trajectory of a desired gait are input to the arm main controller 106. The arm main controller 106 further receives corrected desired body position/posture from the object reaction force balance controller 102. The arm main controller 106 controls the joint actuators (electric motors) of the arm bodies 5, 5 by the compliance control processing so as to follow the desired hand position/posture trajectory and the desired object reaction force trajectory. More specifically, the desired hand position/posture are corrected on the basis of a difference between a detection value of the six-axis force sensor 52 (actual object reaction force) and a desired object reaction force. The desired hand position/posture that have been corrected are referred to as the final corrected desired hand position/posture. Then, the arm main controller 106 controls the joint actuators of both arm bodies 5, 5 (outputs a motor drive command for each arm body 5 to each joint actuator) such that actual joint displacements follow the desired joint displacements of both arm bodies 5, 5 determined from the final corrected desired hand position/posture and the corrected desired body position/posture.

The processing by the object reaction force balance controller 102 will be explained below more specifically. FIG. 19 is a block diagram functionally showing the processing by the object reaction force balance controller 102.

In the object reaction force balance controller 102, an object reaction force error, which is a difference between a desired object reaction force moment about a desired ZMP attributable to a desired object reaction force and an actual object reaction force moment about a desired ZMP attributable to an actual object reaction force, is first calculated by a moment error calculator 270. In this case, the desired object reaction force moment is calculated from a desired object reaction force and a desired ZMP output from the gait generator 100 and a final corrected desired hand position/posture (more specifically, the values at the last time control processing cycle) determined by the arm main controller 106. Further, the actual object reaction force moment is calculated from a detection value of the six-axis force sensor 52 (actual object reaction force), a desired ZMP, and final corrected desired hand position/posture (more specifically, the values at the last time control processing cycle).

Based on the above object reaction force moment error, a desired center-of-gravity position perturbation amount, which is a desired perturbation amount of a total center-of-gravity position of the robot 1, is calculated by a center-of-gravity position perturbation amount calculator 272. The desired center-of-gravity position perturbation amount has a meaning as a perturbation amount of the total center of gravity of the robot 1 to cancel, in the long term, an object reaction force moment error by the gravity acting on the robot 1, and it is determined to be, for example, a value that is proportional to an object reaction force moment. Subsequently, a difference between a total center-of-gravity position model perturbation amount, which is a perturbation amount of the total center of gravity of the robot 1 on the perturbation dynamic model, which is calculated using the perturbation dynamic model to be discussed later, and the aforesaid desired center-of-gravity position perturbation amount is calculated by the subtracter 274. Based on this difference, a compensating total floor reaction force moment for object reaction force balance control, which is a moment manipulated variable about a desired ZMP, for converting the difference to zero is calculated by a feedback control law 276, e.g., the PD control law. Further, the sum of compensating total floor reaction force moment for object reaction force balance control and the aforesaid object reaction force moment error is calculated by an adder 278. Then, an output of the adder 278 is input to a perturbation dynamic model 280 that indicates a relationship between a perturbation of the total center of gravity of the robot 1 and a perturbation of a moment about a desired ZMP and a relationship between the perturbation of the total center of gravity and the perturbation of body position/posture, and this perturbation dynamic model calculates a body position/posture perturbation amount.

In this case, the perturbation dynamic model is a model that describes the relationship (dynamic relationship) between a perturbation of the total center of gravity of the robot 1 and a perturbation of a moment about a desired ZMP according to the following expression 18.

$$m\text{total}*hG*d2\Delta xG/dt2 = \Delta xG*m\text{total}*g + \Delta Mx \qquad \text{Expression 18}$$

where hG denotes the height from a desired ZMP to the total center of gravity; $\Delta xG$ denotes a perturbation amount of the total center of gravity in the horizontal direction; and $\Delta Mx$ denotes a moment horizontal component about the desired ZMP. Other variables are the same as those defined in relation to the aforesaid robot simplified model. Expression 18 is an expression on a sagittal plane, and a relational expression on a lateral plane may be obtained by reversing the sign of the second term of the right side of Expression 18.

This Expression 18 is an expression showing a dynamic behavior of an inverted pendulum having a mass point of the total mass mtotal of the robot 1, the horizontal component of a moment generated about a desired ZMP, which is a supporting point of the mass point, being denoted by $\Delta Mx$.

Further, the relationship between the perturbation amount $\Delta xG$ of a total center-of-gravity position of the robot 1 and the perturbation amount of a body position (hereinafter denoted as Δxb) is represented by Expression 19 given below.

$$\Delta xb = k^* \Delta xG \qquad \text{Expression 19}$$

where k denotes a proportionality constant. Therefore, Δxb is proportional to ΔxG. For a perturbational motion, Expression 19 may be considered to approximately hold.

Thus, in the perturbation dynamic model 280, an output of the adder 278 is used as ΔMx of the right side of Expression 18 to calculate the perturbation amount ΔxG of the total center of gravity, and from the determined ΔxG, a body position perturbation amount is determined according to Expression 19. In the present embodiment, a corrected desired body posture of corrected desired body position/posture agrees with a desired body posture, and the perturbation amount of the body posture is zero.

In the object reaction force balance controller 102, the corrected desired body position/posture are calculated by adding the body position perturbation amount output from the perturbation dynamic model 280, as described above, to the desired body position/posture (the output of the gait generator 100) by an adder 282.

The above has described the specific calculation processing of the object reaction force balance controller 102.

A current time's gait is generated such that the current time's gait converges to a normal gait, taking an object reaction force into account, by the operation of the first embodiment, especially the processing carried out by the gait generator 100, explained above. Hence, an operation, such as pushing the object 120, by the robot 1 can be smoothly performed while securing continual stability of the robot 1.

Further, in S03, a desired object motion trajectory and a desired object reaction force trajectory for a predetermined period (for a plurality of steps) from the current time are provisionally determined by reflecting the estimated disturbance force determined in the block diagram of FIG. 17 mentioned above on the object dynamic model of FIG. 9 while observing an actual behavior of the object 120 (a behavior of an actual object position in the present embodiment). Then, based on the desired object motion trajectory and the desired object reaction force trajectory that have been provisionally determined, the gait parameters of a current time's gait and a normal turning gait are determined, and a desired gait of the robot in the future after the current time is provisionally generated in S23. Furthermore, based on a motion trajectory and a desired object motion trajectory of the provisionally generated desired gait, it is determined in S25 whether a geometric restrictive condition is satisfied, and if the condition is not satisfied, then the predicted landing position/posture of the free leg foot 22 of the robot 1 or the desired object motion trajectory is corrected in S29 and eventually a foot trajectory parameter of a gait parameter is corrected so that the geometric restrictive condition is satisfied. Then, lastly, the corrected gait parameter is used to sequentially generate, in real time, an instantaneous value of a current time's gait at each calculation processing cycle of the gait generator 100. Thus, it is possible to generate a desired gait that satisfies the geometric restrictive condition by reflecting an actual environmental condition in real time while controlling an operation of the robot 1, and moreover, it is possible to smoothly move the object 120 by the robot 1 without causing interference or the like between the object 120 and the robot 1.

Second Embodiment

A second embodiment of the present invention will now be explained with reference to FIG. 20 and FIG. 21. In the explanation of the second embodiment, the like components or the like functional portions as those of the first embodiment will use like reference numerals as those of the first embodiment, and the explanation thereof will be omitted. The second embodiment is an embodiment of the first invention, the second invention, and the fourth invention.

In the aforesaid first embodiment, if a determination result in the aforesaid STEP25 (refer to FIG. 6) is NG, then at least one of the predicted landing position/posture and the desired object motion trajectory has been corrected in S29. In place thereof, according to the present embodiment, if a determination result in STEP25 is NG, then a moving plan is corrected in S29' such that a geometric restrictive condition at the time is satisfied, as shown in the flowchart of FIG. 20. Then, after the processing in S29', the processing from S03 in FIG. 5 mentioned above is carried out. The rest is the same as the aforesaid first embodiment.

An example of correcting the moving plan in S29' will be explained with reference to FIG. 21. Referring to the figure, it is assumed that a desired object motion trajectory (position trajectory) in the direction of an X axis based on a moving plan at current time t1 is a trajectory indicated by a graph g10 in the figure (hereinafter referred to as a before-correction moving plan), that is, a trajectory in which the moving velocity of an object 120 suddenly increases after current time. In this case, the trajectory of a desired body position of the robot 1 after the current time is calculated using, for example, the trajectory indicated by a graph g11 in the figure. The desired body position at certain time t2 in the future may move excessively apart from a desired object position, causing arm bodies 5 and 5 to excessively extend and consequently leading to a determination result NG in S25 in some cases. If the moving velocity of the object 120 based on the before-correction moving plan suddenly changes, such a situation may take place. At this time, the before-correction moving plan of the object 120 is corrected to be a moving plan that provides the trajectory indicated by a graph g12 (hereinafter referred to as the after-correction moving plan). In other words, a correction is made such that the moving velocity of the object 120 based on the after-correction moving plan is lower than the moving velocity based on the before-correction moving plan. This makes it possible to generate a desired gait that brings the desired body position closer to the desired object position.

As in the case shown in FIG. 16 explained in the aforesaid first embodiment, even if a desired gait that causes interference between the body 3 of the robot 1 and the object 120 at certain time in the future is generated in S23, the moving plan may be corrected in S29'. In this case, the moving plan associated with the original trajectory of FIG. 16 may be corrected to be a moving plan that has the corrected trajectory of FIG. 16.

The second embodiment described above is also capable of providing the same advantages as those of the first embodiment. Supplementally, according to the second embodiment, the processing from S03 is carried out after correcting the moving plan in S29', so that a desired object motion trajectory, a desired object reaction force trajectory, and a foot trajectory parameter (predicted landing position/posture and predicted landing time of the free leg foot 22) of a gait parameter will be accordingly corrected.

Third Embodiment

A third embodiment of the present invention will now be explained with reference to FIG. 22. In the explanation of the third embodiment, the like components or the like functional portions as those of the first embodiment will use like reference numerals as those of the first embodiment, and the explanation thereof will be omitted. The third embodiment is an embodiment of the third invention and the fourth invention.

In the aforesaid first embodiment, the forward dynamic model shown in FIG. 9 has been used as the object dynamic model used for the calculation processing in S03 (refer to FIG. 5). The present embodiment uses an inverse dynamic model in place of the forward dynamic model, and the present embodiment differs from the first embodiment only in the calculation processing in S03.

FIG. 22 is a block diagram showing the calculation processing in S03 according to the present embodiment. In the block diagram, the section enclosed by the dashed line corresponds to the object dynamic model in the second invention. The object dynamic model is a model that receives a desired object moving velocity as a desired motion state amount of an object 120 on the basis of a moving plan of the object 120 and outputs a force (translational force) to be applied to the object 120 and a position of the object 120. More specifically, the object dynamic model determines a motional acceleration of the object 120 by carrying out differentiation (first-order differentiation) of the desired object moving velocity (the input value) by a differentiator 300, then multiplies the motional acceleration by a mass M of the object 120 by a multiplier 302 thereby to output a required value of the force (translational force) to be applied to the object 120. Here, the required value of the translational force output from the object dynamic model is the required value of the resultant force of all translational forces to be applied to the object 120 (the translational force in the moving direction of the object 120). Further, the object dynamic model integrates a desired object moving velocity by an integrator 304 thereby to output a desired object position, which is the desired value of a position of the object 120.

As in the first embodiment, the desired object velocity is calculated as a first-order differential value of a position trajectory of the object 120 in a moving plan or a moving velocity as a constituent element of the moving plan is directly determined as a desired object velocity in a gait generator 100.

The calculation processing in S03 that uses the aforesaid object dynamic model will be specifically explained with reference to FIG. 22. First, a desired object velocity at each instant (at each time) of the object 120 based on the moving plan determined in S01 of the aforesaid FIG. 5 is input to an object dynamic model to calculate the required value of a translational force acting on the object 120 and a desired object position in time series, as described above.

Subsequently, the estimated disturbance force determined in the aforesaid S35 (refer to FIG. 7) at the previous calculation processing cycle of the gait generator 100 is subtracted from the aforesaid required value of the translational force by a subtracter 306 so as to determine the desired value of a force (translational force) to be applied to the object 120 from a robot 1. Then, the time series obtained by reversing the sign of the desired value is determined as a desired object reaction force trajectory.

The initial value of an output of an integrator 304 of the object dynamic model is set to a value of the time series of the desired object position, which has been determined by carrying out the processing in S03 at the previous calculation processing cycle of the gait generator 100, at the time corresponding to the previous calculation processing cycle (the current time at the previous calculation processing cycle). Further, a desired object posture trajectory of a desired object motion trajectory is determined such that the desired object posture trajectory substantially agrees with, for example, the direction of a desired object velocity.

The processing in S03 explained above provisionally determines a desired object motion trajectory and a desired object reaction force trajectory for a predetermined period in the future from the current time. The rest other than this processing in S03 is the same as the aforesaid first embodiment.

This processing in S03 corresponds to the desired motion state amount provisionally determining means, the object action force trajectory provisionally determining means, and the desired action force trajectory provisionally determining means in the second invention of the present invention. To be more specific, the processing for determining a desired object velocity on the basis of a moving plan corresponds to the desired motion state amount provisionally determining means, and the processing by the differentiator 300 and the multiplier 302 of the object dynamic model corresponds to the processing by the object action force provisionally determining means. In this case, an output of the multiplier 302 corresponds to an object action force desired trajectory. Further, the processing by the subtracter 306 corresponds to the processing by the between-robot-and-object action force trajectory provisionally determining means.

The operation of the third embodiment, especially the processing by the gait generator 100, explained above permits a smooth operation, such as pushing the object 120 by the robot 1, while securing continual stability of the robot 1, as with the first embodiment.

Further, in S03, a desired object motion trajectory is provisionally determined on the basis of a desired object velocity based on a moving plan of the object 120 while at the same time, an estimated disturbance force determined in the block diagram of FIG. 17 described above is reflected on the processing in the block diagram of FIG. 22 while observing an actual behavior (a behavior of an actual object position in the present embodiment) of the object 120, thereby provisionally determining the desired object reaction force trajectory for a predetermined period (for a plurality of steps) from the current time. Then, in the same manner as in the aforesaid first embodiment, based on these provisionally determined desired object motion trajectory and the desired object reaction force trajectory, the gait parameters of a current time's gait and a normal turning gait are determined to provisionally generate a desired gait of the robot in the future after the current time in S23. Further, based on a motion trajectory of the provisionally generated desired gait and the desired object motion trajectory, it is determined in S25 whether a geometric restrictive condition is satisfied or not, and if the condition is not satisfied, then the predicted landing position/posture of the free leg foot 22 of the robot 1 and the desired object motion trajectory are corrected and further, a foot trajectory parameter of the gait parameters is corrected in S029 so as to satisfy the geometric restrictive condition. Then, lastly, the corrected gait parameters are used to sequentially generate, in real time, an instantaneous value of a current time's gait at each calculation processing cycle of the gait generator 100. For this reason, as with the first embodiment, it is possible to generate a desired gait that satisfies the geometric restrictive condition by reflecting an actual environmental condition in real time while conducting the operational control of the robot 1, thereby permitting smooth movement of the object 120 by the robot 1 without causing interference or the like between the object 120 and the robot 1.

In the present embodiment also, as an alternative, a moving plan may be corrected by the processing in S29 of FIG. 6, as with the second embodiment.

Fourth Embodiment

A fourth embodiment of the present invention will now be explained with reference to FIG. 23. In the explanation of the fourth embodiment, the like components or the like functional portions as those of the first embodiment will use like reference numerals as those of the first embodiment, and the explanation thereof will be omitted.

The fourth embodiment differs from the first embodiment only in the processing for correcting a moving plan in S01 of FIG. 5. The following will explain the difference. A situation in which the difference between an actual object motion trajectory and a desired object motion trajectory based on a moving plan increases takes place if a disturbance force of the force acting on an actual object 120 other than a force acting from a robot 1 incurs a relatively large change.

Hence, according to the fourth embodiment, a moving plan is corrected on the basis of a change in, for example, the aforesaid estimated disturbance force, instead of correcting a moving plan on the basis of an object position error as explained in the first embodiment.

The following will explain a specific example. For instance, in the case of the example shown in the aforesaid FIG. 18(a), the estimated disturbance force (the component in the X-axis direction) calculated in the aforesaid S35 suddenly increases in the negative direction after time t1 when the object 120 is caught by a step, as shown in FIG. 23(a). Therefore, according to the fourth embodiment, if the estimated disturbance force changes by a predetermined value or more (time t5 in FIG. 23(a)), then a before-correction moving plan is corrected to determine an after-correction moving plan, as explained in the first embodiment in relation to FIG. 18(a).

Further, in the example shown in FIG. 18(b), after time t3 when the object 120 rides over the step, the estimated disturbance force (the component in the X-axis direction) calculated in the aforesaid S35 starts to return to a value that is substantially the same as an original value before time t1, as shown in FIG. 23(b). Thus, when the estimated disturbance force returns to a value that is substantially close to the original value after having changed by the predetermined value or more (time t6 in FIG. 23(b)), the after-correction moving plan is corrected to determine an after-recorrection moving plan, as explained in the first embodiment in relation to FIG. 18(b).

The processing other than the one explained above is the same as that of the aforesaid first embodiment.

The fourth embodiment also provides the same operations and advantages as those of the first embodiment.

Supplementally, in the fourth embodiment, a moving plan has been corrected according to a change in an estimated disturbance force; alternatively, however, the moving plan may be corrected if the difference between an actual object reaction force grasped from the detection values of six-axis force sensors 52 of both arm bodies 5 and 5 and a desired object reaction force determined in S35 increases, exceeding a predetermined value. Further, in S03, as explained in the third embodiment, the object dynamic model in the aforesaid FIG. 22 may be used to determine a desired object position trajectory and a desired object reaction force trajectory. Further, in S29, a moving plan may be corrected, as explained in the second embodiment.

Fifth Embodiment

A fifth embodiment of the present invention will be now explained with reference to FIG. 24 to FIG. 26. In the explanation of the fifth embodiment, the like components or the like functional portions as those of the first embodiment will use like reference numerals as those of the first embodiment, and the explanation thereof will be omitted.

FIG. 24 is a flowchart showing the processing by a portion of the processing by a gait generator 100 in the fifth embodiment, the portion corresponding to the processing shown in FIG. 5 related to the first embodiment. As shown in FIG. 25, the fifth embodiment differs from the first embodiment only in the processing carried out if a determination result in S19 is NO.

In the first embodiment, if a determination result in S19 is NO, then a desired object reaction force trajectory is corrected; instead thereof, according to the fifth embodiment, the predicted landing position/posture or the predicted landing time of a free leg foot 22 is corrected in S21'. This means to correct a foot trajectory parameter of a current time's gait parameter. In this case, the predicted landing position/posture or the predicted landing time is corrected such that a ZMP correction amount is minimized (smaller than at least a ZMP correction amount determined before the predicted landing position/posture or the predicted landing time is corrected) when the processing of S07 to S17 is carried out again after the correction. Then, after the correction, the processing from S07 is carried out again. The rest is the same as the first embodiment.

A specific example of correction made in S21' will be explained below. For instance, if it is assumed that, currently, the predicted landing position/posture of the free leg foot 22 of a current time's gait and the predicted landing position/posture of the free leg foot 22 of a next time's gait have been determined as indicated by the solid lines shown in FIG. 25. Incidentally, in the illustrated example, a robot 1 is to walk straight in an X-axis direction of a current time's gait supporting leg coordinate system at a substantially constant step length.

It is further supposed that the robot 1 moves toward an object 120 up to the current time's gait, then the robot 1 starts an operation of pushing the object 120 in the positive direction of the X axis in the middle of the next time's gait. In this case, as shown in FIG. 26(a), a desired object reaction force trajectory will be a stepped trajectory that rises, for example, in the middle of the next time's gait.

At this time, if the processing up to S17 is carried out while maintaining the predicted landing position/posture as indicated by the solid line shown in FIG. 25, then the ZMP correction amount (the component in the X-axis direction) determined by the processing in S17 becomes relatively large, as indicated by, for example, the solid line in FIG. 26(b), causing a determination result in S19 to be NO in some cases.

In this case, the processing in S21' corrects, for example, the predicted landing position/posture of the free leg foot 22 of the next time's gait to bring them closer to a supporting leg foot 22L of the current time's gait in the X-axis direction, as indicated by the dashed line in FIG. 25. In other words, the predicted landing position/posture of a free leg foot 22L are corrected such that the step length of the next time's gait is smaller. After correcting the predicted landing position/posture of the next time's gait as described above, carrying out the processing from S05 again will reduce the ZMP correction amount determined in S17, as indicated by the dashed line in FIG. 26(b). As a result, the determination result in S19 will be YES. Supplementally, when the predicted landing position/posture of the free leg foot 22L of the next time's gait are corrected as shown in FIG. 25, the free leg foot position at the end of a second turning gait of a normal gait will be closer to the free leg foot position at the start of the second turning gait (the predicted landing position of the free leg foot 22R of the current time's gait) by the technique for determining a foot trajectory parameter of a normal gait described above.

In the aforesaid example, the predicted landing position/posture of the free leg foot 22L of the next time's gait has been corrected; if, however, there is an allowance for correcting the predicted landing position/posture of a free leg foot 22R of the current time's gait, then a correction thereof may be made. Alternatively, the predicted landing positions/postures of both the current time's gait and the next time's gait may be corrected.

Further, in the aforesaid example, the predicted landing position/posture have been corrected; alternatively, however, the predicted landing time of the free leg foot 22 of at least one of the current time's gait and the next time's gait may be corrected. In the situation shown in FIG. 23, for example, the predicted landing time of the next time's gait may be delayed.

The above has explained the fifth embodiment of the present invention. The fifth embodiment described above also provides the same operations and advantages as those of the first embodiment. In the fifth embodiment, the predicted landing position/posture or the predicted landing time of the free leg foot 22 has been corrected if the determination result in S19 is NO; alternatively, however, a desired object reaction force trajectory may be corrected in addition thereto, as with the first embodiment. Further, in S01, a moving plan may be estimated on the basis of an estimated disturbance force, as explained in the fourth embodiment. Also, in S03, a desired object position trajectory and a desired object reaction force trajectory may be determined using the object dynamic model shown in FIG. 22 described above, as explained in the third embodiment. Further, in S29, a moving plan may be corrected, as explained in the second embodiment.

In the first to the third embodiments explained above, the case where the object 120 is moved by pushing by the robot 1 has been taken as an example; however, the present invention can be applied also to, for example, a case where the object 120 is moved by pulling or a case where the object 120 is moved by lifting.

Further, in the embodiments described above, when determining a current time's gait parameter, a gait parameter for a normal gait, which is a cyclic gait, has been determined and then a current time's gait parameter has been determined such that the current time's gait is converged to the normal gait (such that the divergent component at the end of the current time's gait agrees with the divergent component at the start of the normal gait); this, however, is not essential to the present invention. Basically, according to the present invention, an operation of a robot may be controlled by a technique that is different from the techniques explained in the aforesaid embodiments as long as the operation of the robot can be controlled so as to allow a desired action force between a robot and an object that is finally determined (a desired object reaction force in the aforesaid embodiments) and a desired moving position of the object (a desired object motion trajectory in the aforesaid embodiments) to be satisfied.

INDUSTRIAL APPLICABILITY

As described above, the present invention is useful as it is capable of generating a desired gait that satisfies a geometric restrictive condition related to interference or the like between a robot and an object when generating a gait for causing the robot, such as a bipedal mobile robot, to perform an operation for moving the object.

Figure 1:
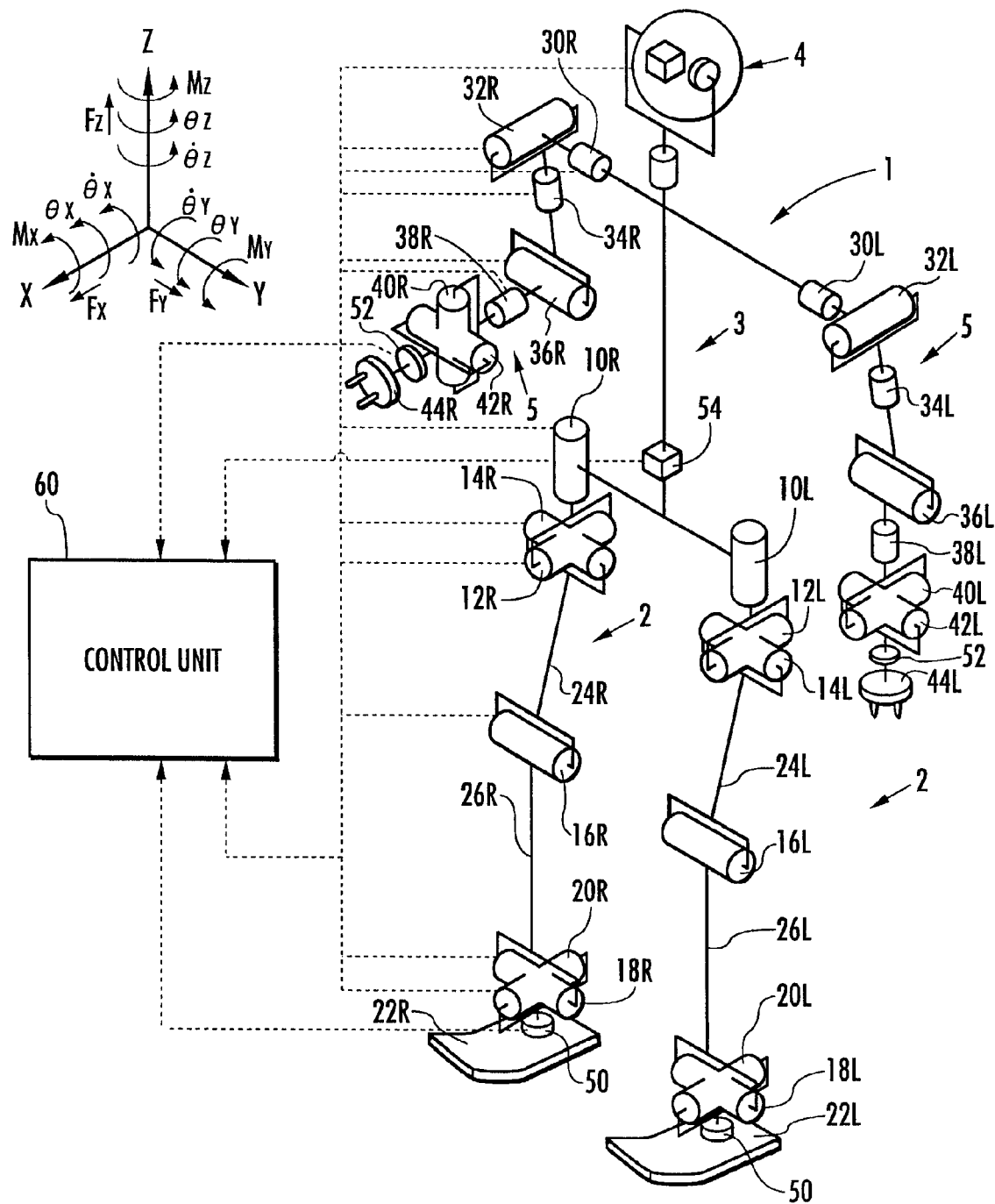
FIG. 1 is a diagram showing a schematic construction of a bipedal mobile robot as a legged mobile robot in embodiments of the present invention.
Figure 2:
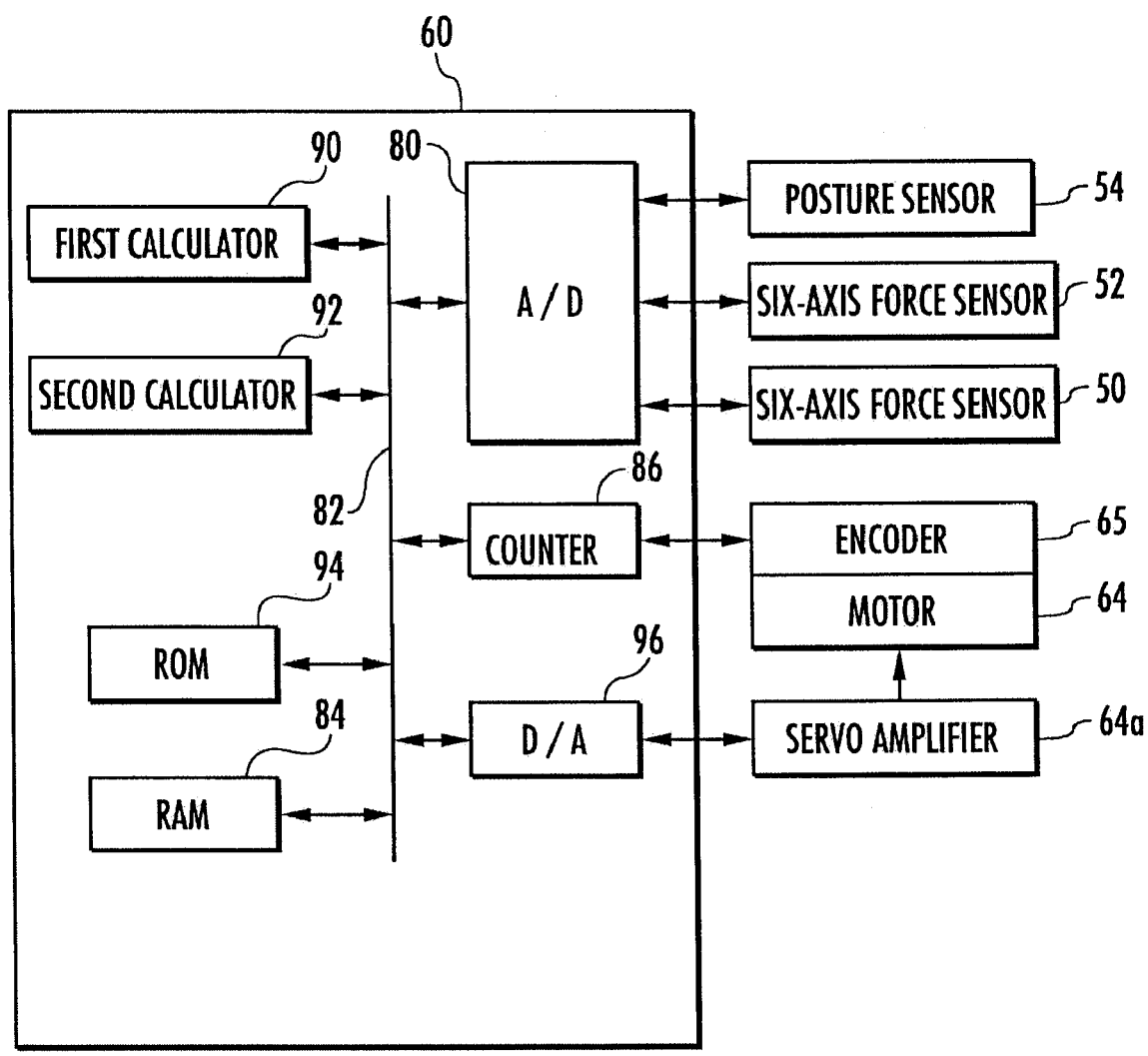
FIG. 2 is a block diagram showing a construction of a control unit provided in the robot shown in FIG. 1.
Figure 3:
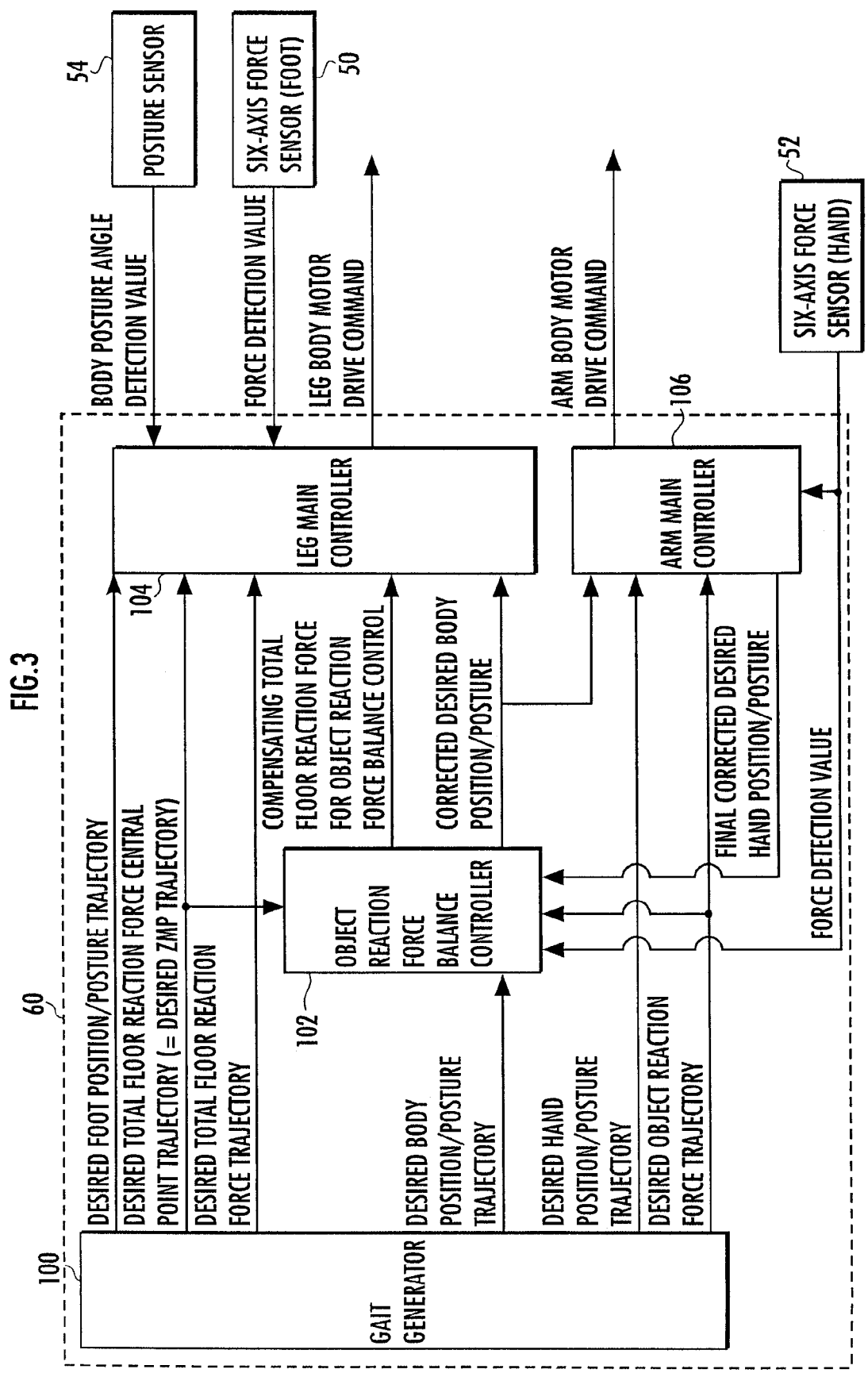
FIG. 3 is a block diagram showing a functional construction of an essential section of the control unit shown in FIG. 2.
Figure 4:
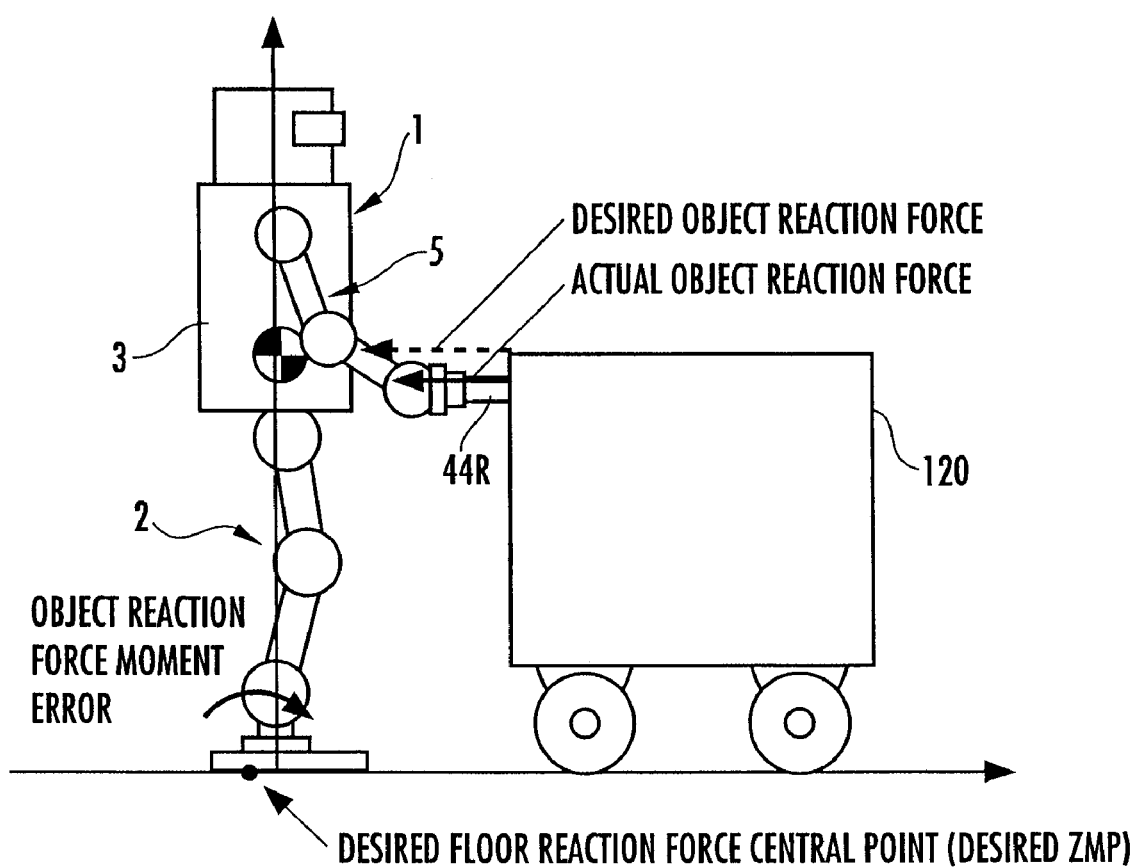
FIG. 4 is a diagram showing a relationship between the robot and an object in the embodiments.
Figure 5:
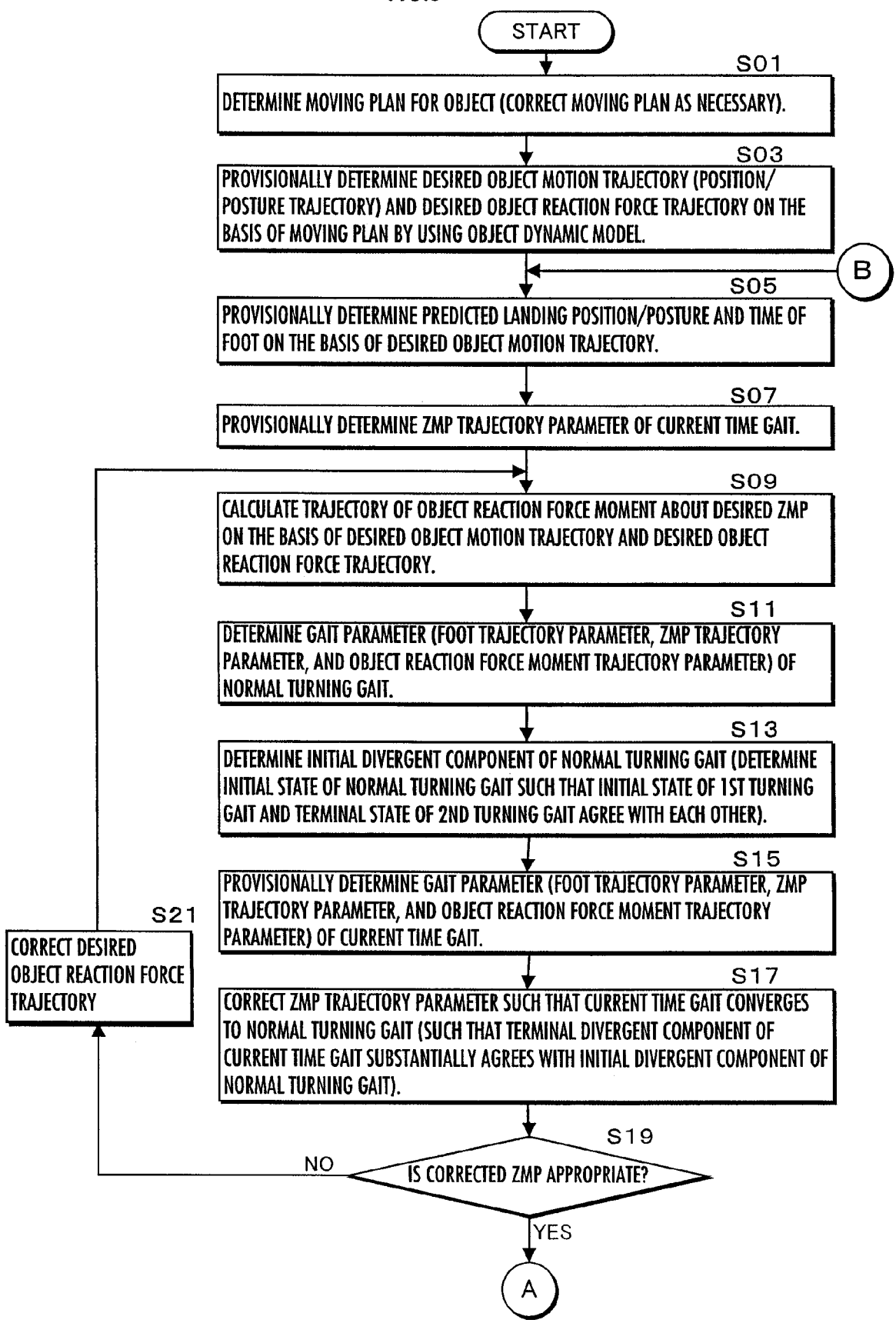
FIG. 5 is a flowchart showing the calculation processing of a gait generator in a first embodiment.
Figure 6:
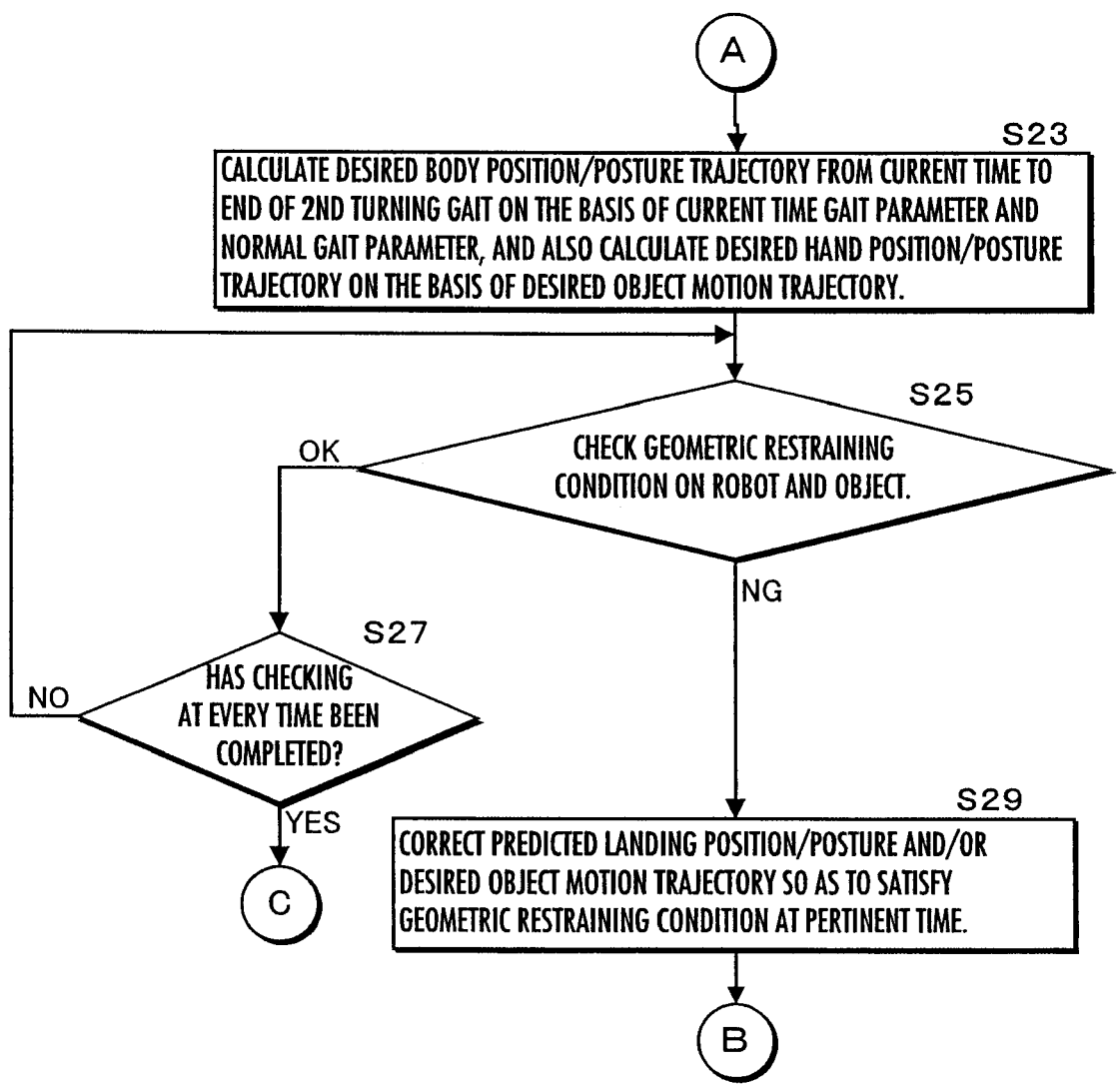
FIG. 6 is a flowchart showing the calculation processing of the gait generator in the first embodiment.
Figure 7:
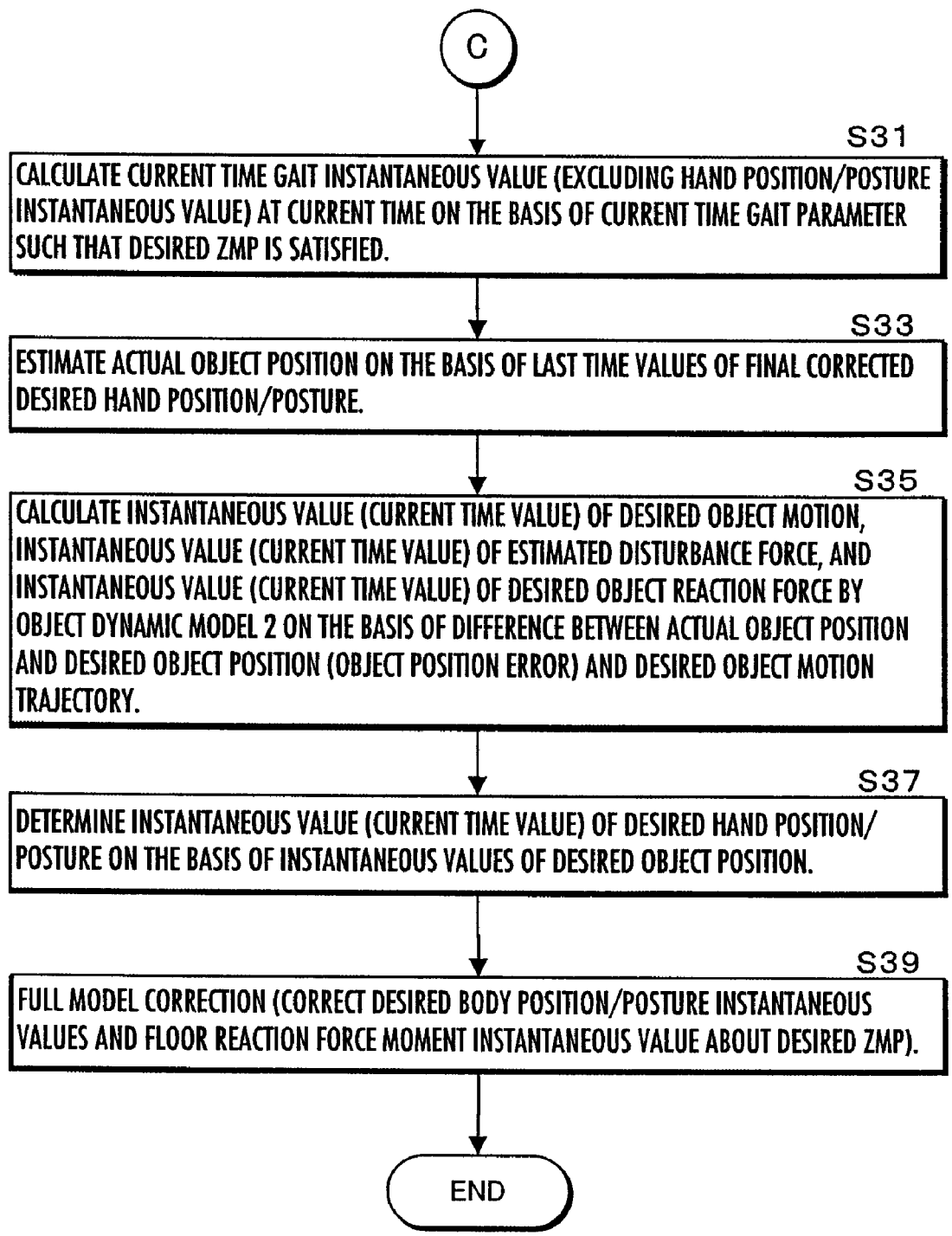
FIG. 7 is a flowchart showing the calculation processing of the gait generator in the first embodiment.
Figure 8:
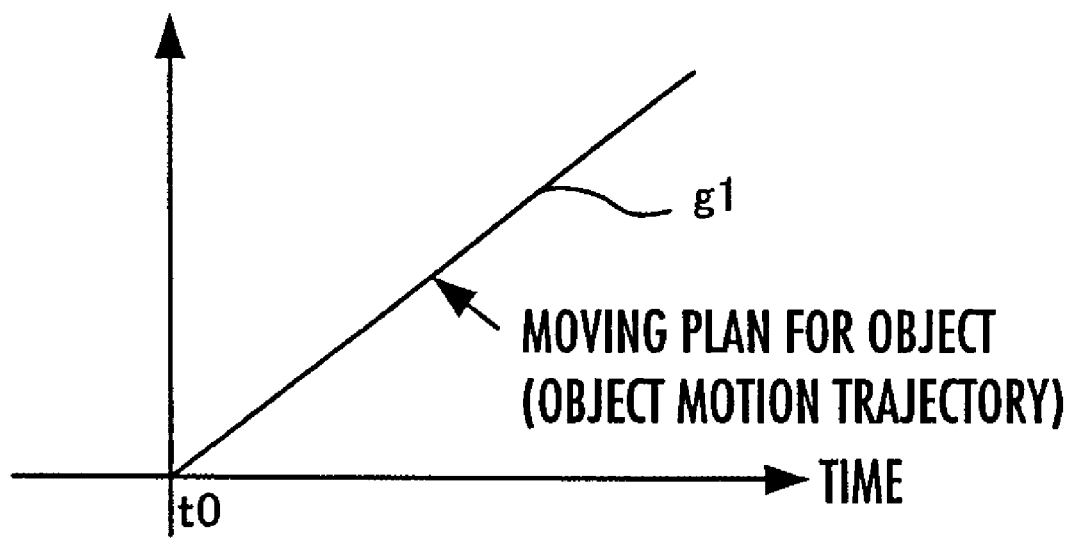
FIG. 8 is a diagram showing an example of a moving plan determined in S02 of FIG. 5.
Figure 9:
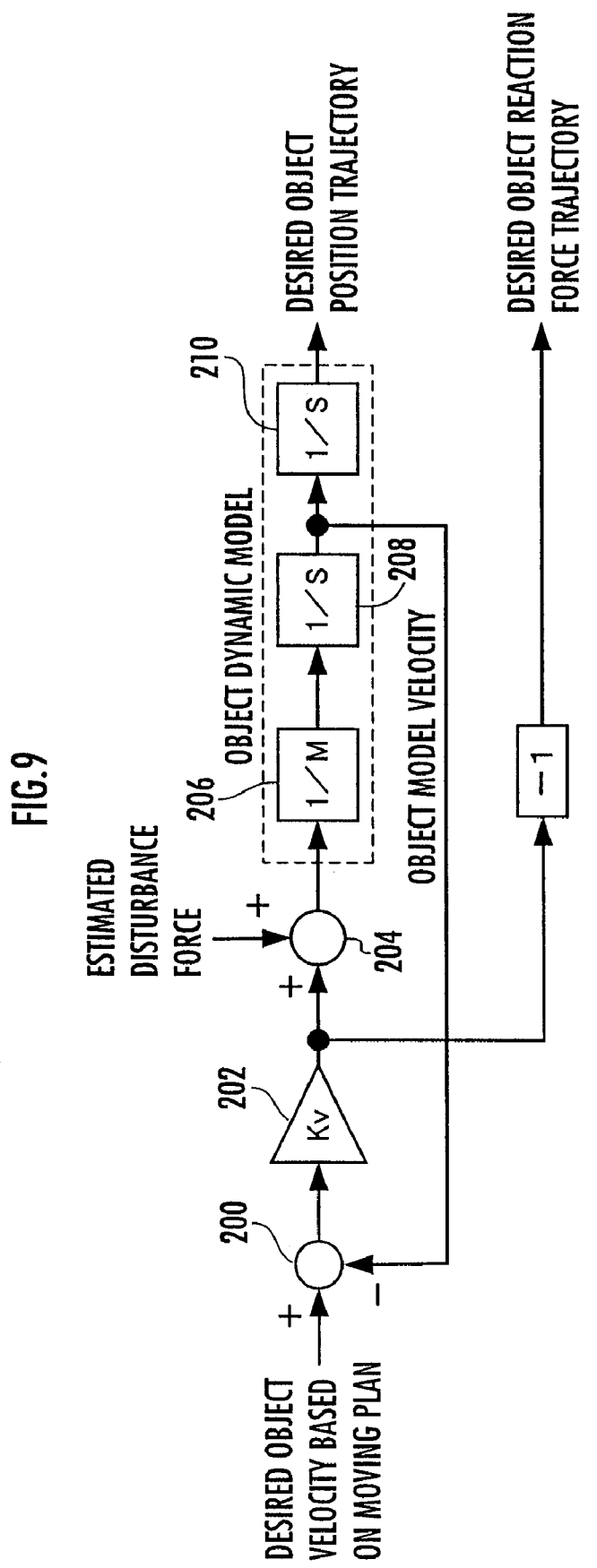
FIG. 9 is a block diagram showing the processing of S02 of FIG. 5.
Figure 10:
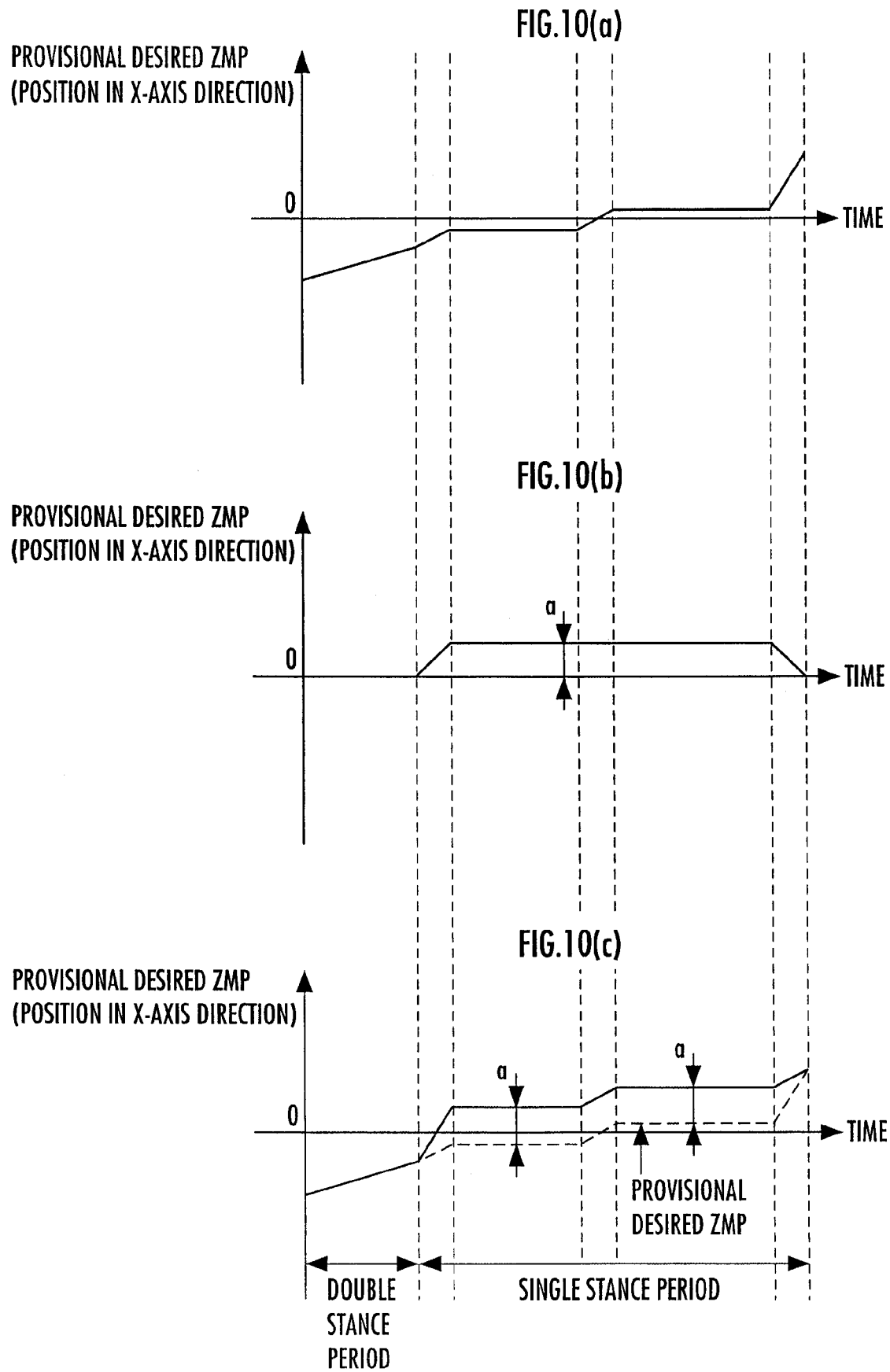
FIG. 10($a$) is a diagram showing an example of a provisional desired ZMP trajectory related to S07 of FIG. 5, FIG. 10($b$) is a diagram showing an example of a ZMP correction amount determined in S17 of FIG. 5, and FIG. 10($c$) is a diagram showing an example of a desired ZMP trajectory corrected in S17.
Figure 11:
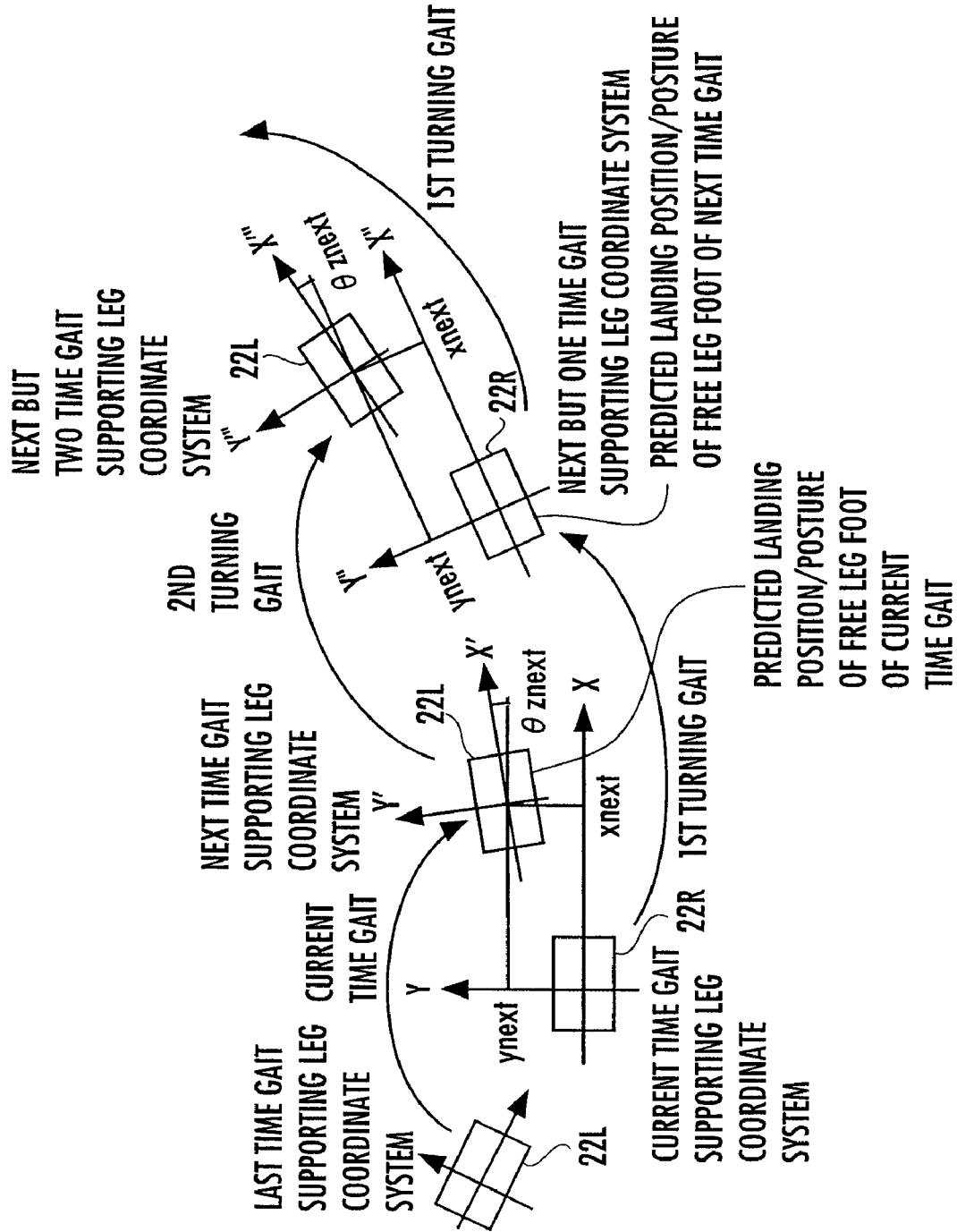
FIG. 11 is a diagram showing an example of a foot trajectory parameter determined in S11 of FIG. 5.
Figure 12A:
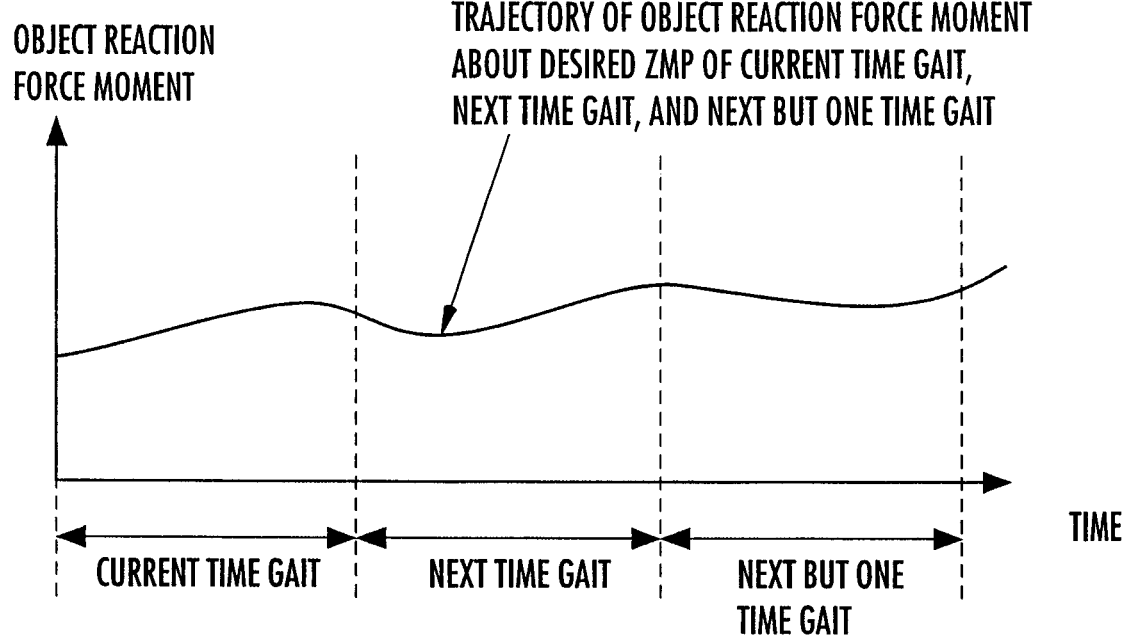
FIG. 12($a$) is a diagram showing an example of an object floor reaction force moment trajectory of a current time's gait, and FIG. 12($b$) is a diagram showing an example of an object reaction force moment trajectory of a normal gait determined in S11 of FIG. 5.
Figure 12B:
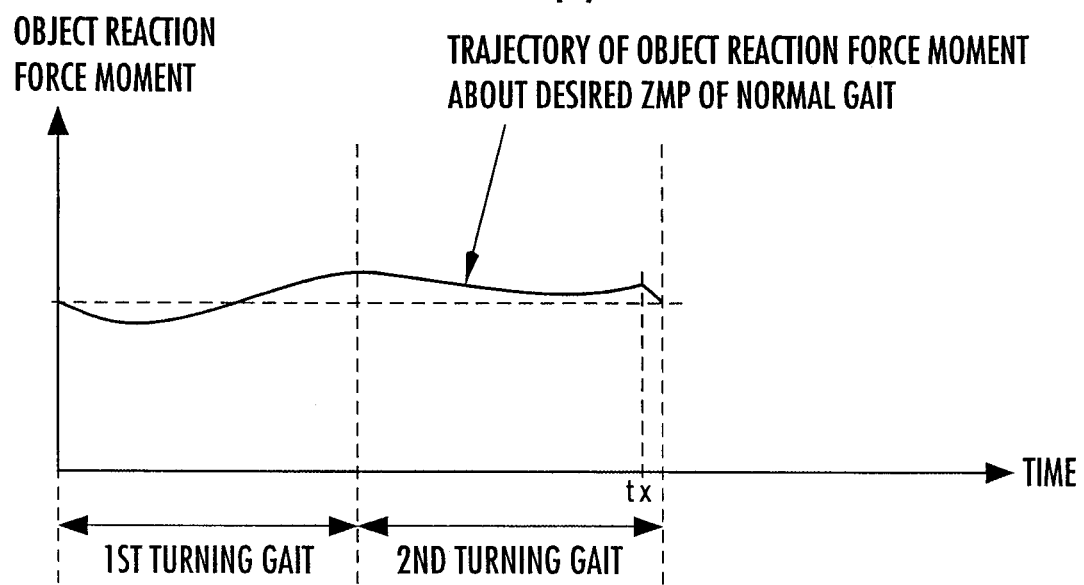
Figure 13:
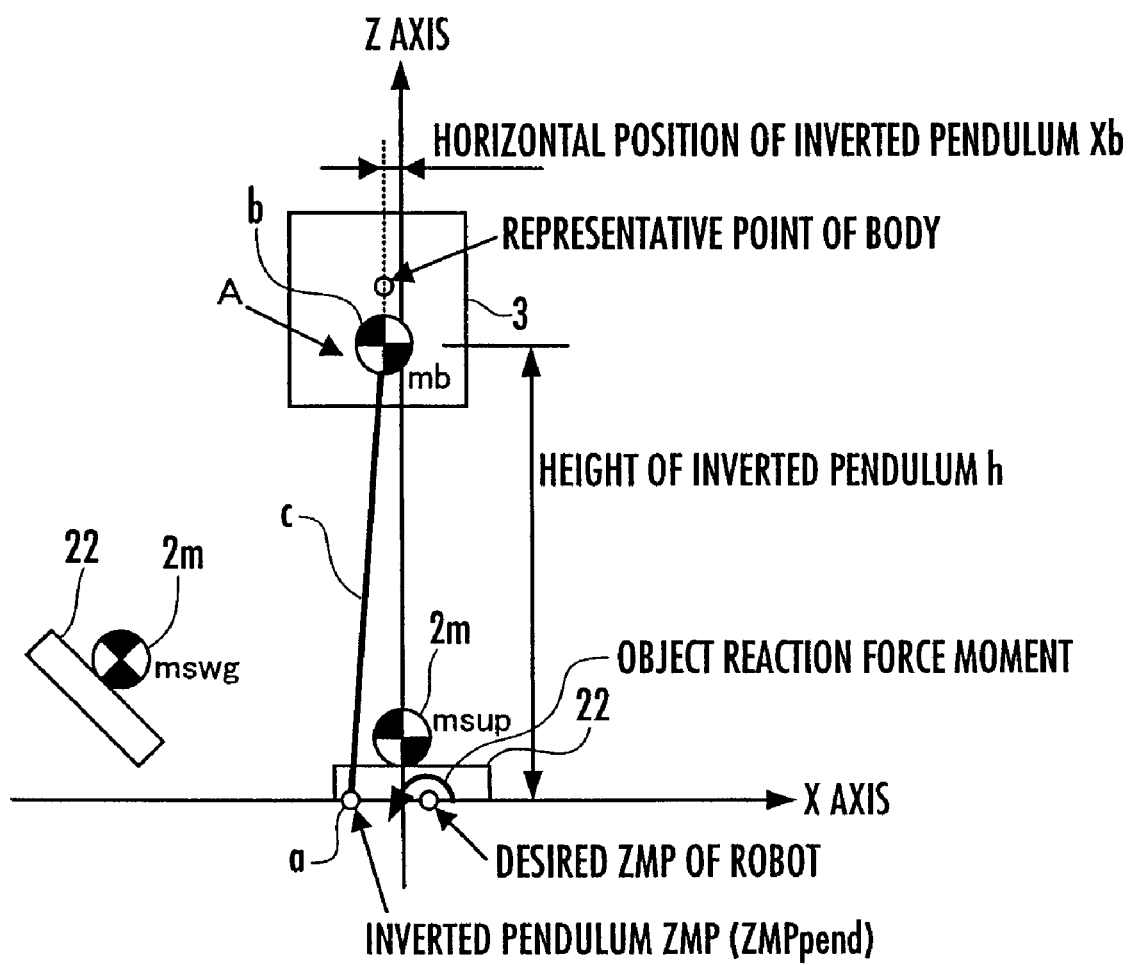
FIG. 13 is a diagram showing an example of a robot dynamic model used in the embodiments.
Figure 14:
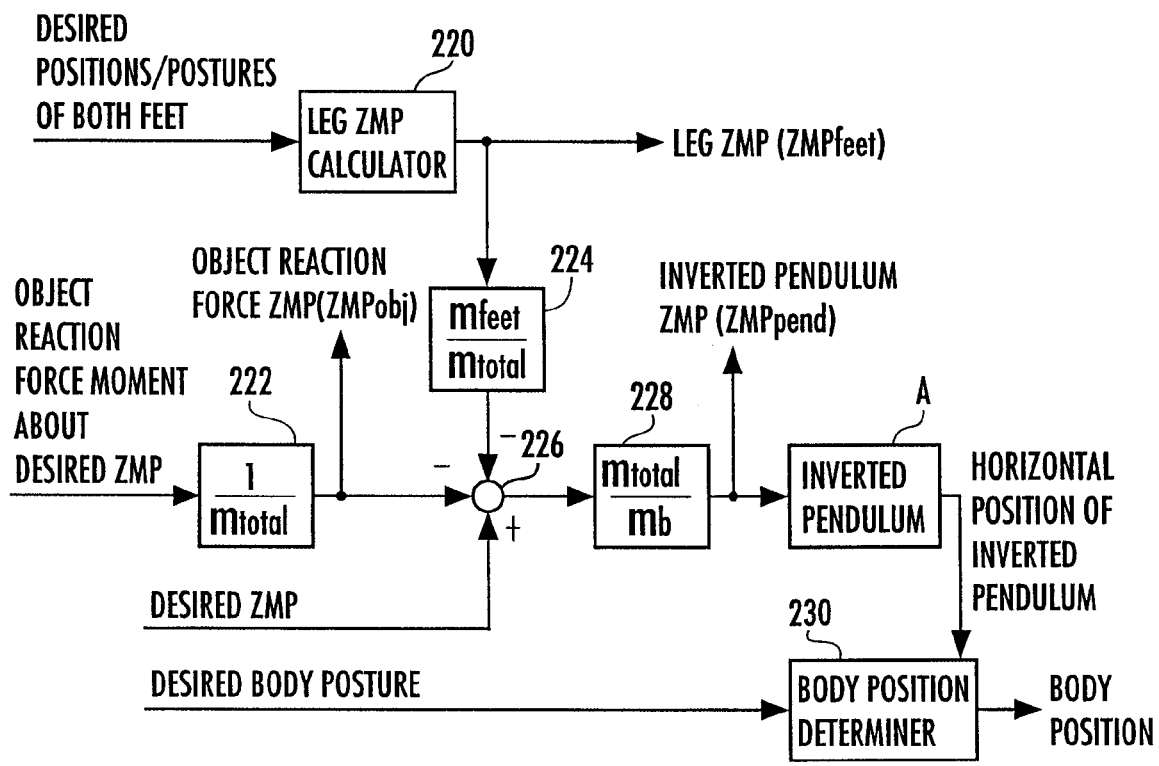
FIG. 14 is a block diagram showing the processing for determining a body position by using the robot dynamic model shown in FIG. 13.
Figure 15A:
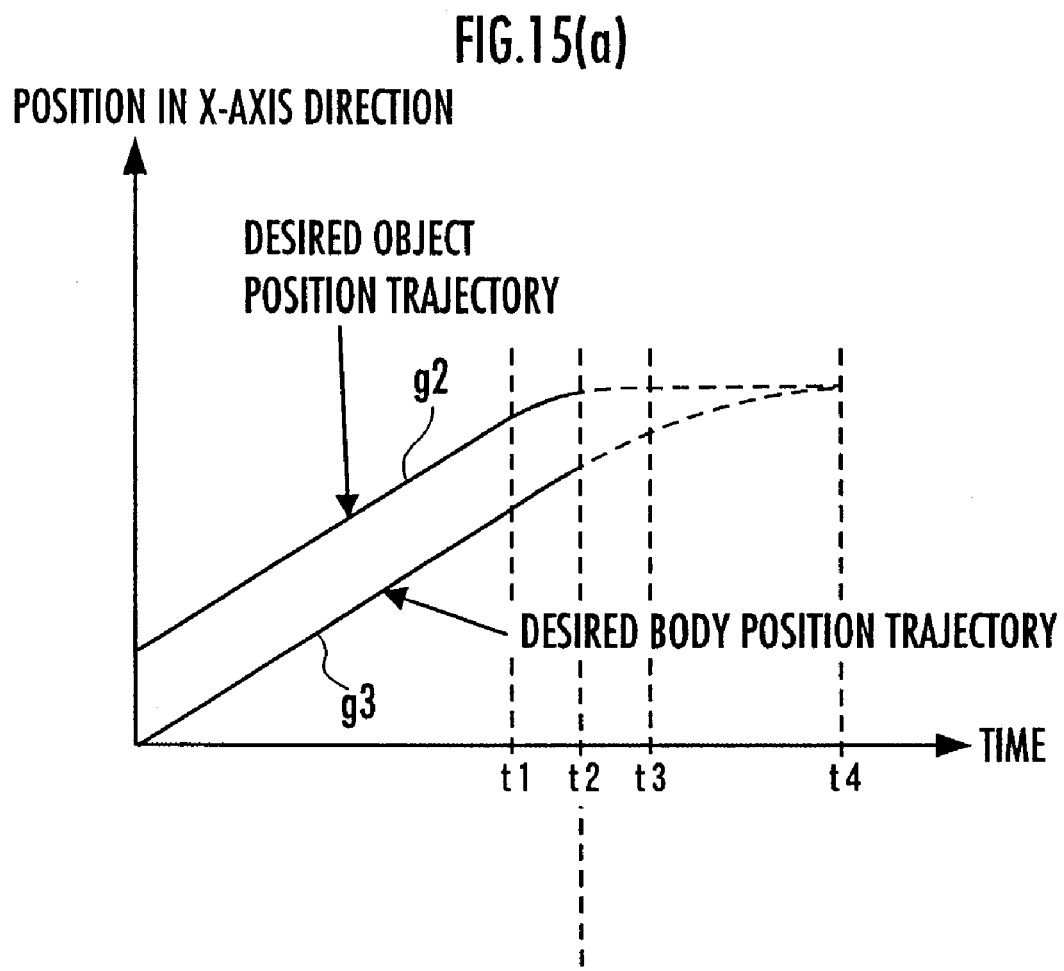
FIGS. 15($a$) and ($b$) are diagrams for explaining the processing in S21 of FIG. 5.
Figure 15B:
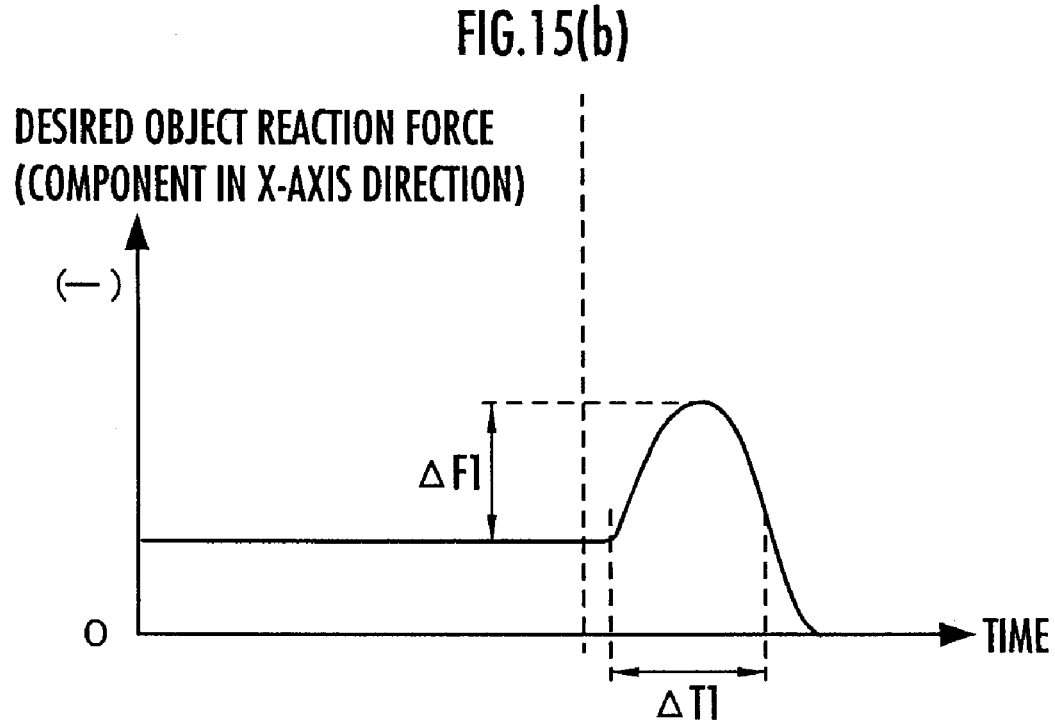
Figure 16:
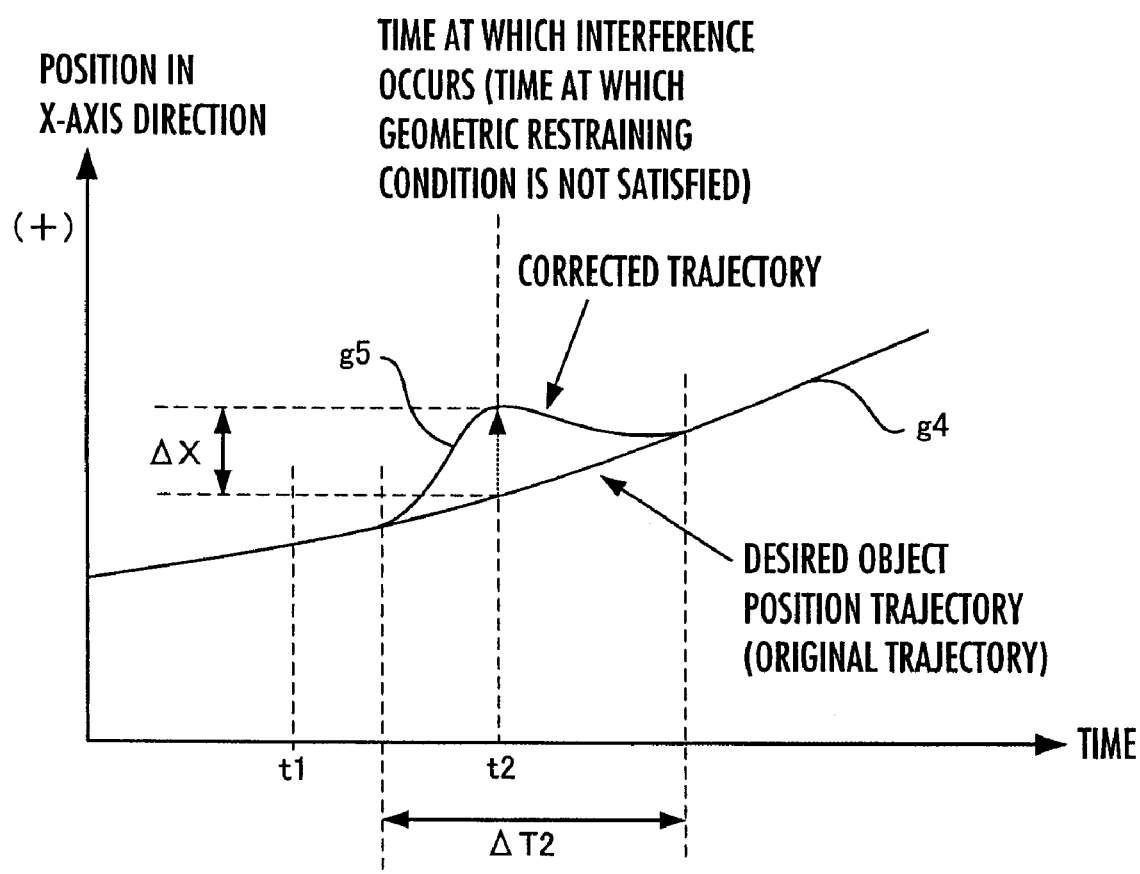
FIG. 16 is a diagram for explaining the processing in S29 of FIG. 6.
Figure 17:
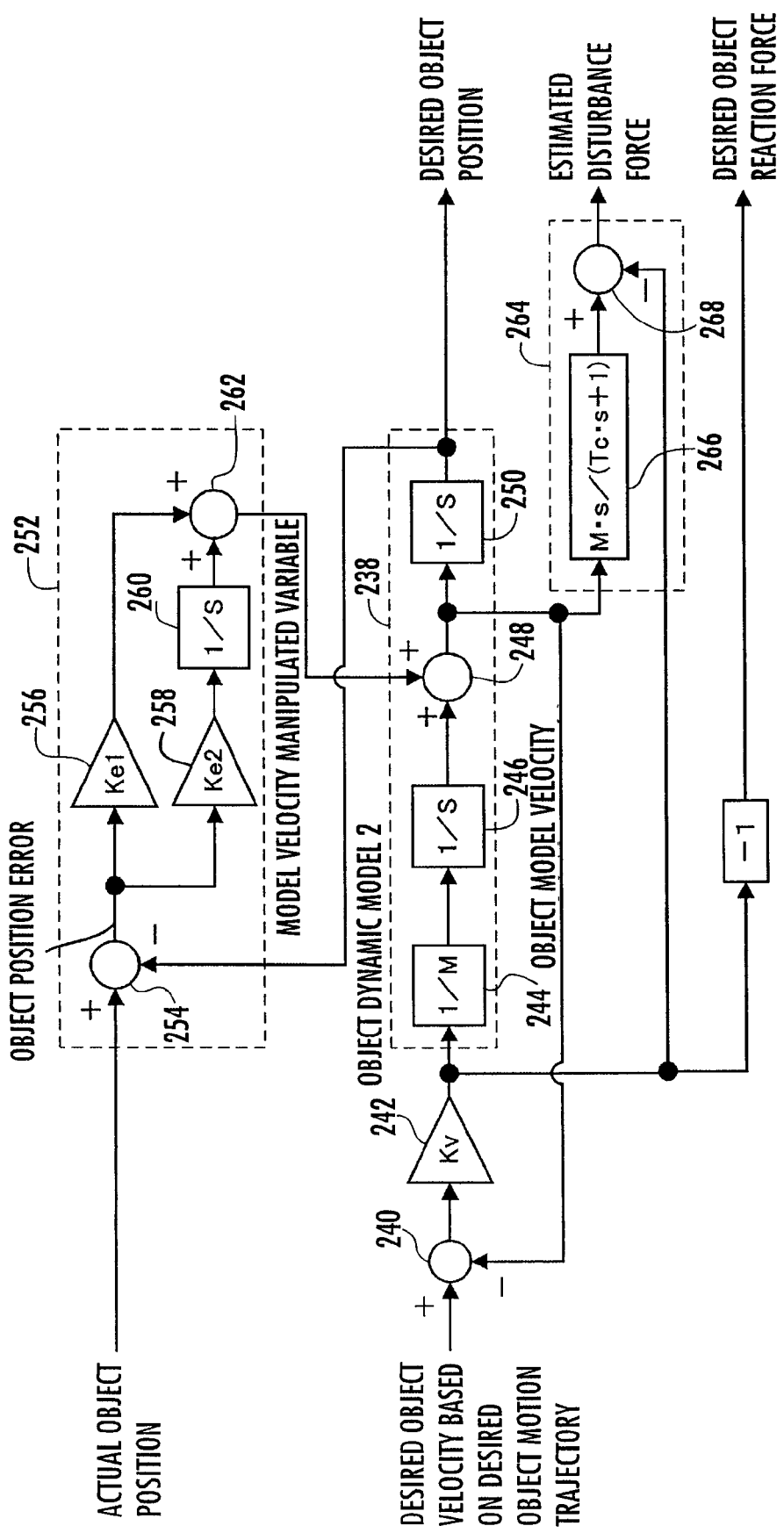
FIG. 17 is a block diagram showing the processing in S35 of FIG. 7.
Figure 18A:
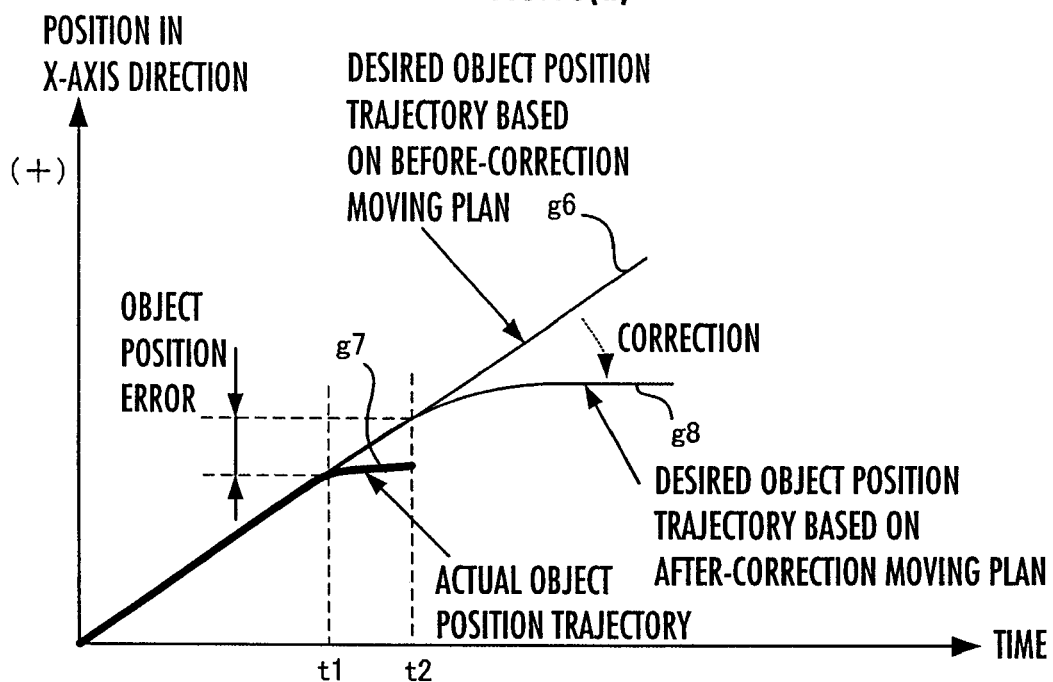
FIGS. 18($a$) and ($b$) are diagrams for explaining the processing for correcting a moving plan in S01 of FIG. 5.
Figure 18B:
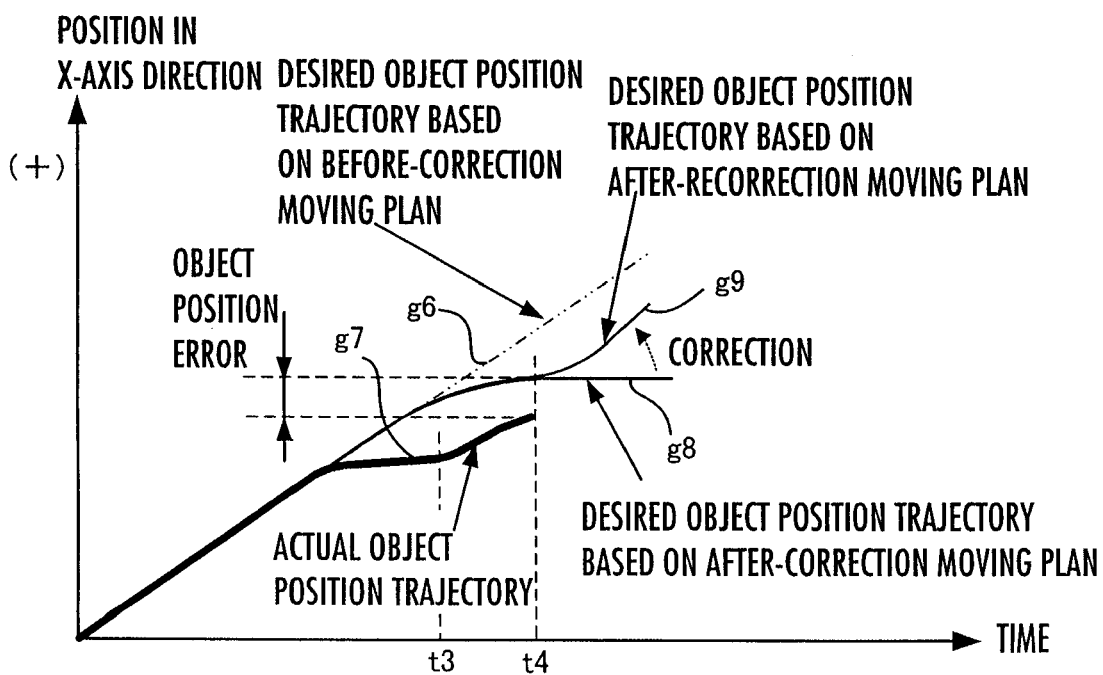
Figure 19:
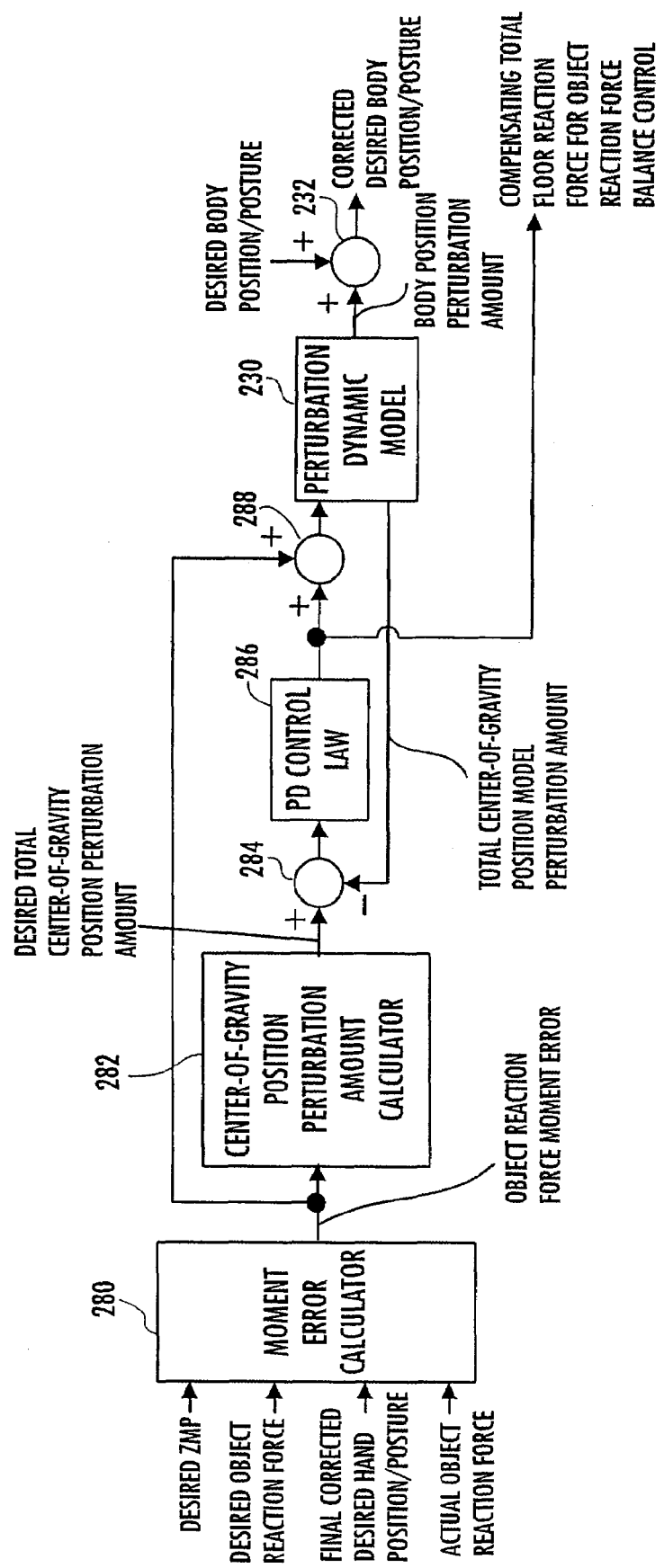
FIG. 19 is a block diagram showing the processing by an object reaction force balance controller shown in FIG. 3.
Figure 20:
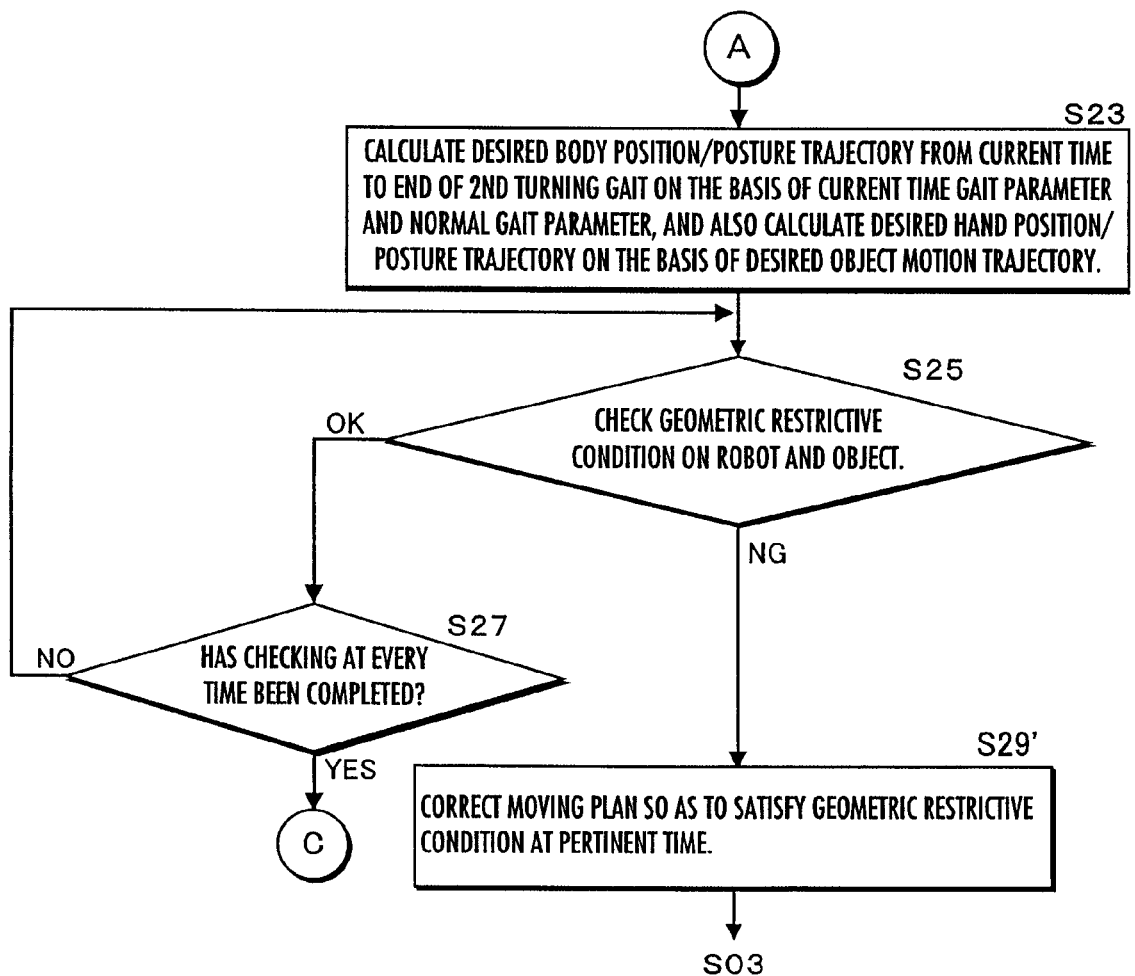
FIG. 20 is a flowchart showing the processing by an essential section of a gait generator in a second embodiment of the present invention.
Figure 21:
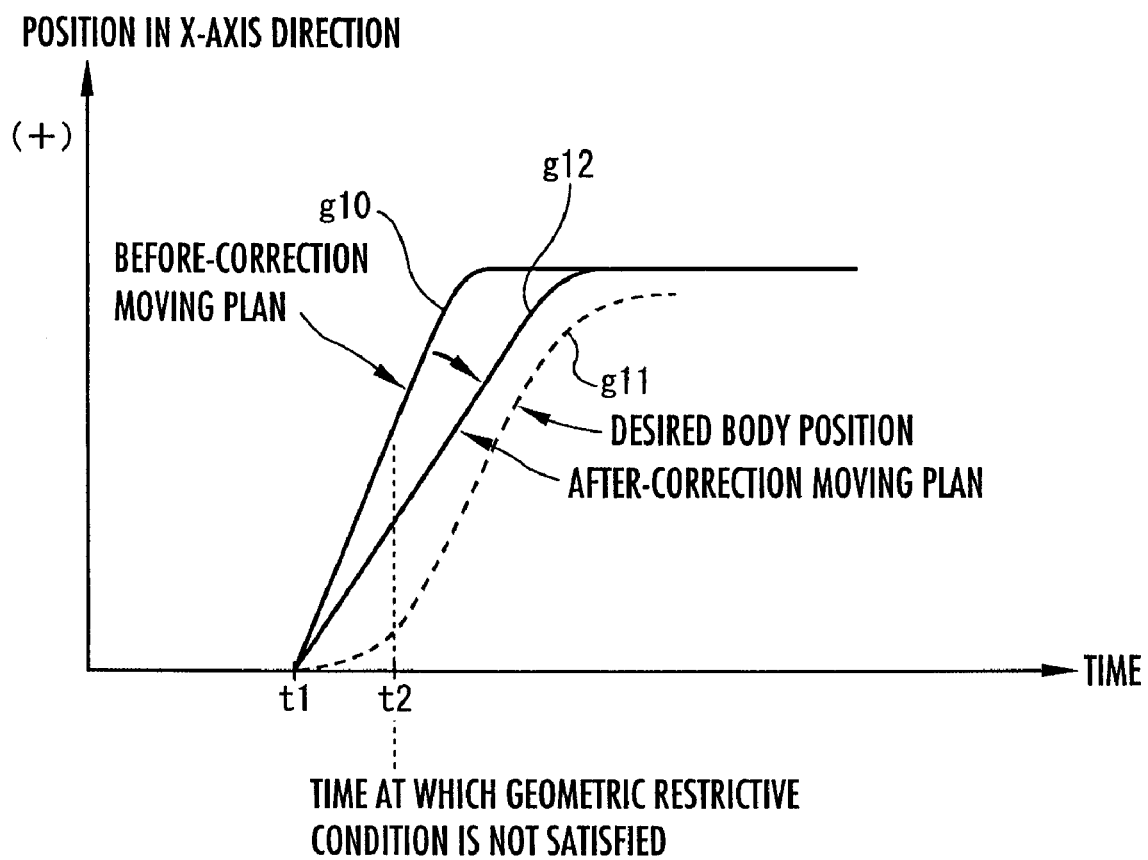
FIG. 21 is a diagram for explaining the processing in S29' of FIG. 20.
Figure 22:
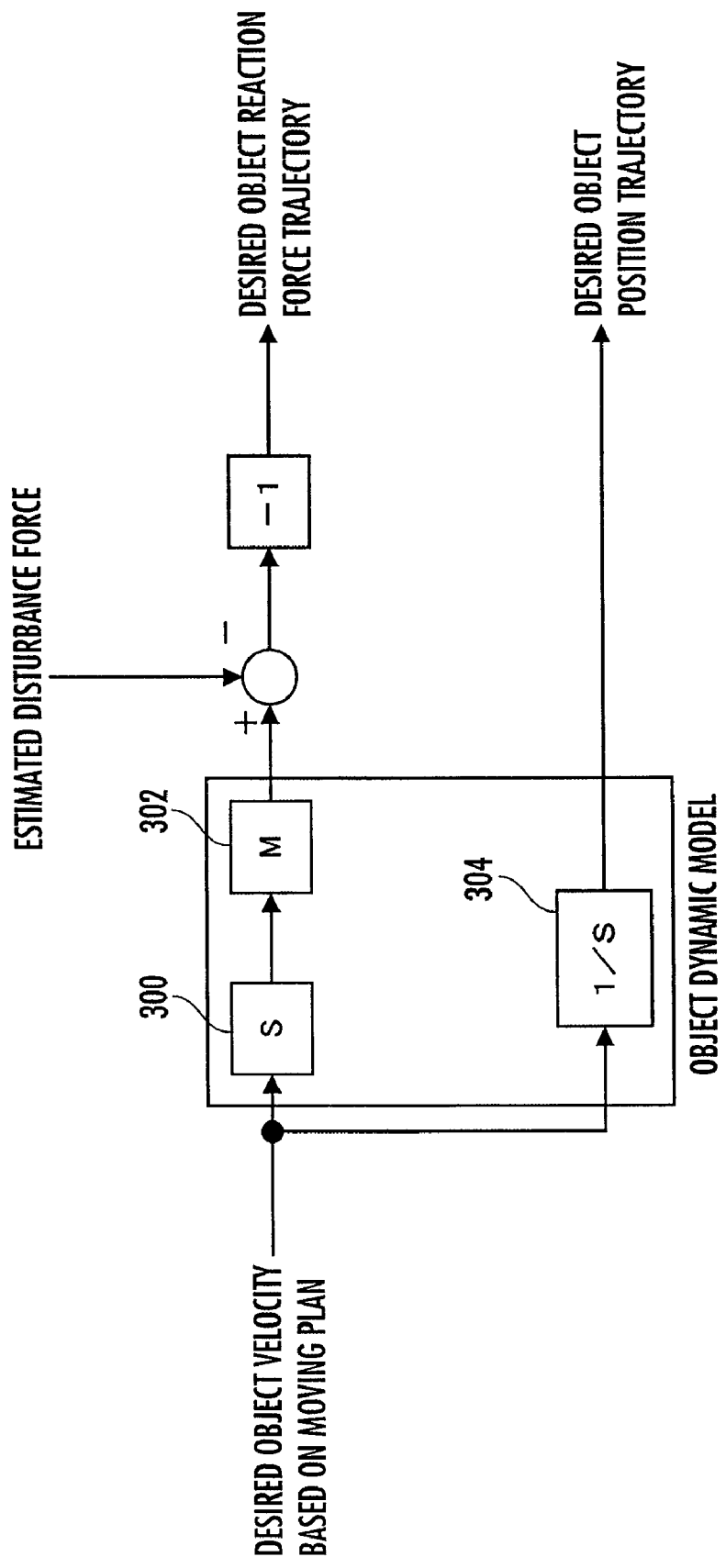
FIG. 22 is a block diagram showing the processing in S03 (FIG. 5) in a third embodiment of the present invention.
Figure 23A:
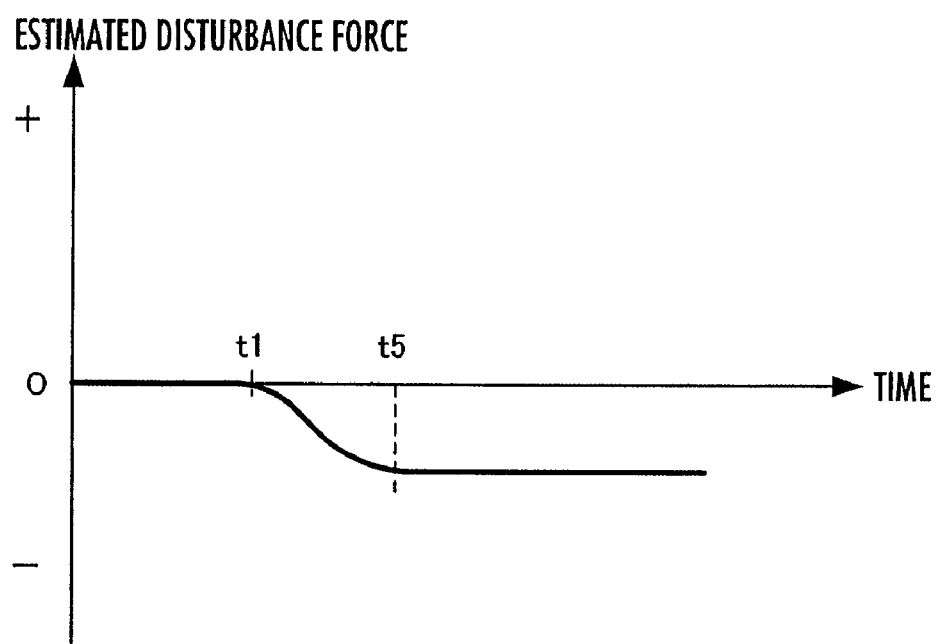
FIG. 23 is a diagram for explaining the processing for correcting a moving plan in S01 (FIG. 5) in a fourth embodiment of the present invention.
Figure 23B:
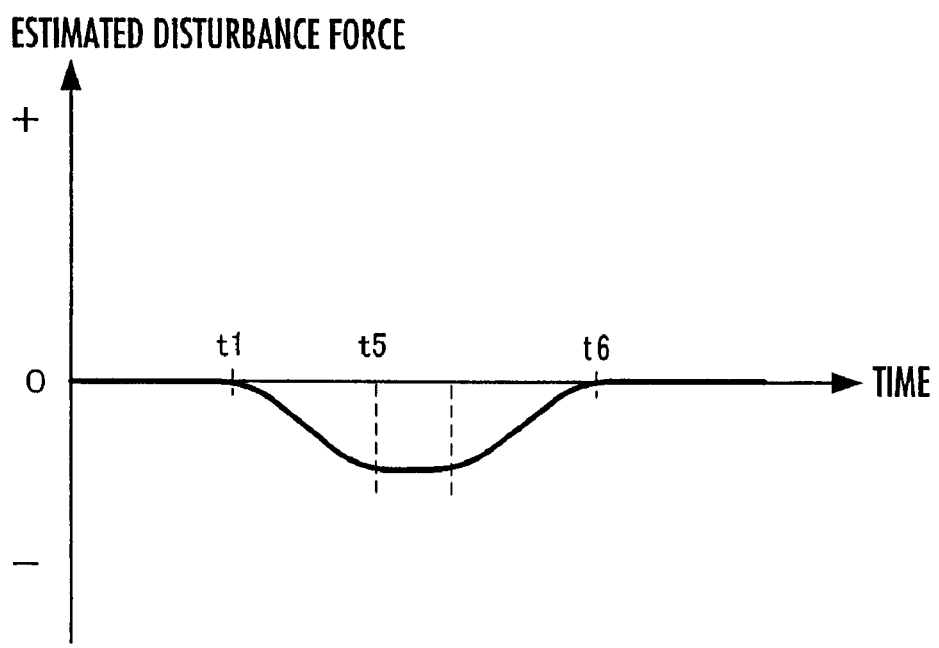
Figure 24:
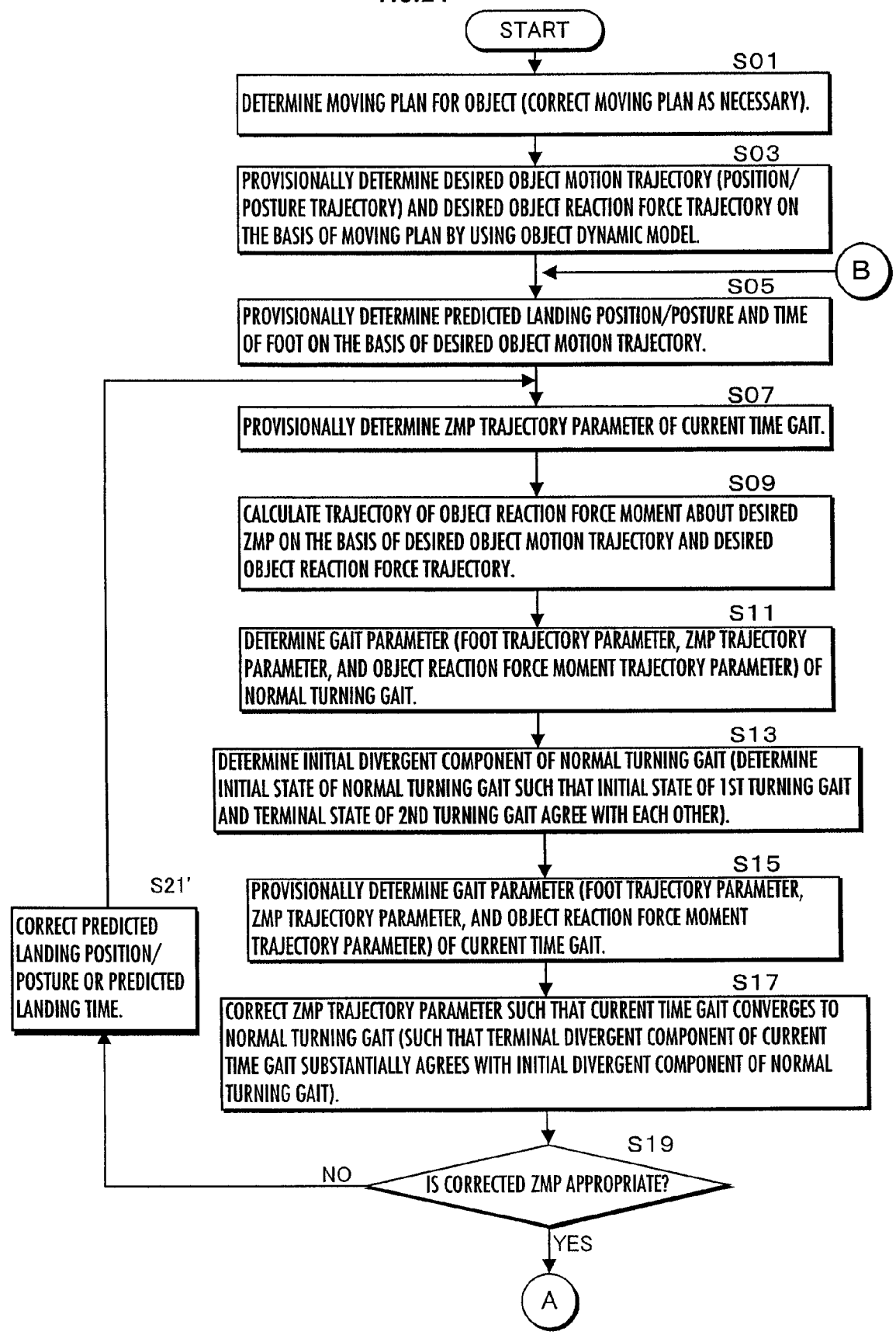
FIG. 24 is a flowchart showing the processing of an essential section of a gait generator in a fifth embodiment of the present invention.
Figure 25:
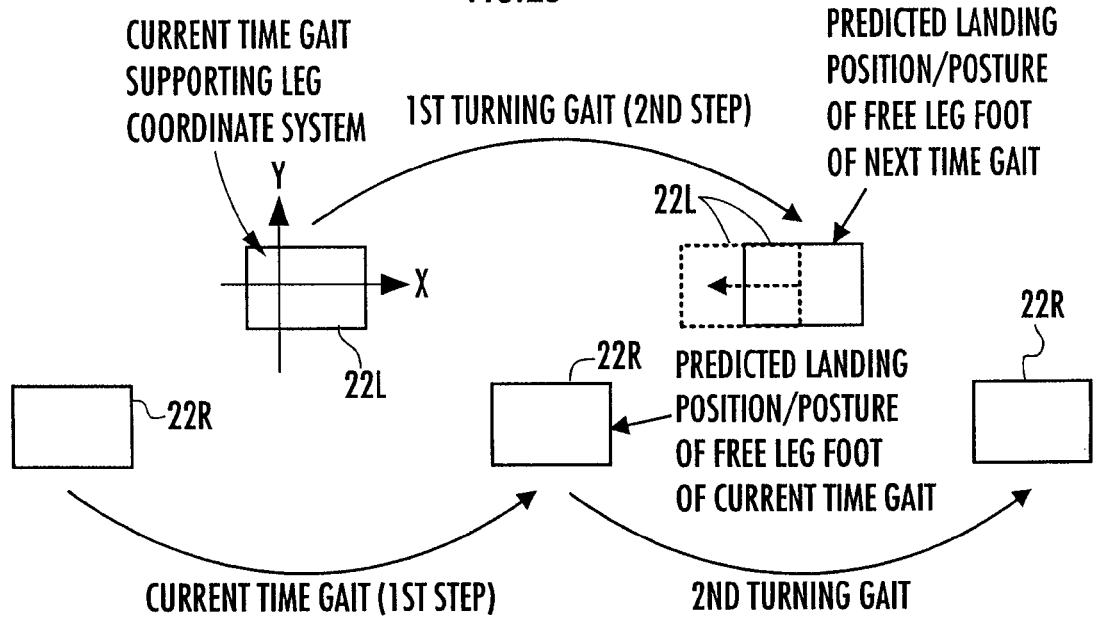
FIG. 25 is a diagram for explaining the processing in S21' of FIG. 24.
Figure 26A:
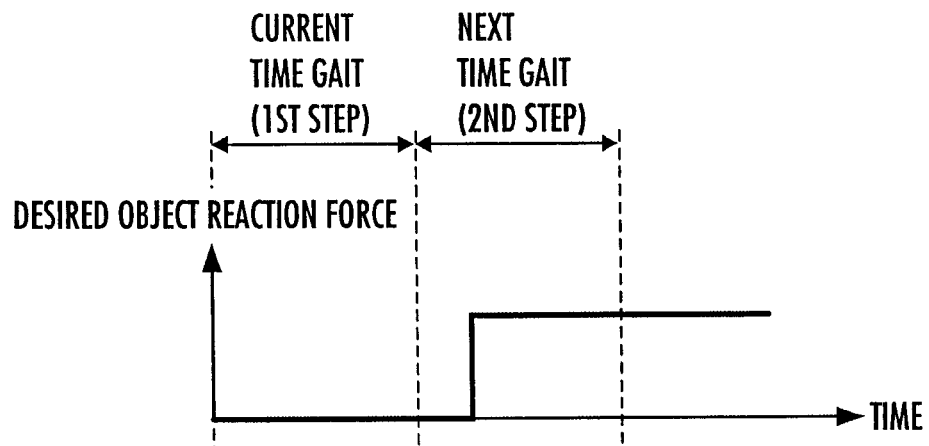
FIGS. 26(a) and (b) are diagrams for explaining the processing in S21' of FIG. 24.
Figure 26B:
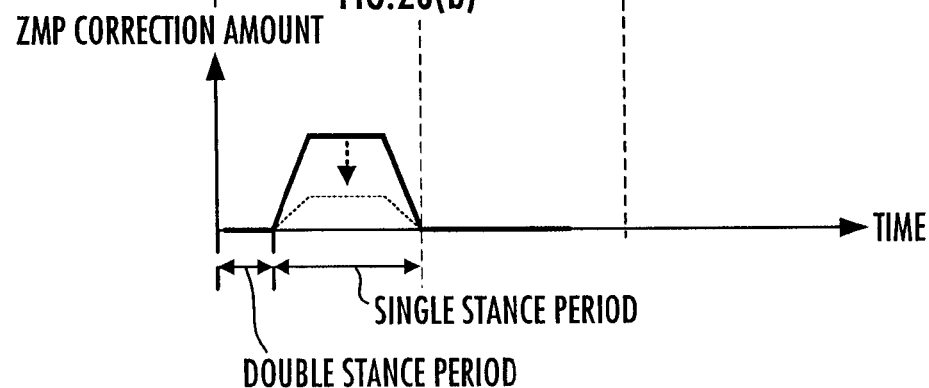

The invention claimed is:

1. A gait generator of a legged mobile robot for generating a desired gait for causing the legged mobile robot equipped with a plurality of leg bodies extended from its body to perform an operation for moving an external object while actuating the robot such that the desired gait is followed, the gait generator comprising:

an object dynamic model representing a relationship between forces acting on an object and motions of the object;

a model manipulated variable determining means for determining a model manipulated variable to be imparted to the object dynamic model in order to bring a behavior of the object on the object dynamic model close to a behavior of the actual object while observing the behavior of the actual object when actuating the robot such that the desired gait is followed;

a between-robot-and-object action force trajectory provisionally determining means for provisionally determining, on the basis of at least a moving plan of the object and a motion state amount of the object on the object dynamic model, the trajectory of a desired action force between the robot and the object, which is a desired trajectory of an action force between the object and the robot in a predetermined period after the present time such that the motion state amount follows the motion state amount of the object based on the moving plan while imparting the determined model manipulated variable to the object dynamic model when generating a new desired gait to be followed by the robot;

an object motion trajectory provisionally determining means for provisionally determining a desired motion trajectory of the object in the predetermined period by using the object dynamic model by inputting the provisionally determined trajectory of the desired action force between the robot and the object to the object dynamic model while imparting the determined model manipulated variable to the object dynamic model;

a robot gait provisionally generating means for provisionally determining a gait parameter to be used to generate a desired gait of the robot on the basis of at least the provisionally determined desired motion trajectory of the object and the provisionally determined trajectory of the desired action force between the robot and the object, and for provisionally generating a desired gait of the robot in the predetermined period by using the provisionally determined gait parameter;

a restrictive condition determining means for determining whether a predetermined geometric restrictive condition related to at least one of the object and the robot is satisfied on the basis of the provisionally determined desired motion trajectory of the object and a motion trajectory of the provisionally generated desired gait of the robot; and a correcting means for selecting at least one of the moving plan, the provisionally determined gait parameter, and the provisionally determined desired motion trajectory of the object as a correction target and for correcting the correction target so as to satisfy the geometric restrictive condition if the geometric restrictive condition is not satisfied, wherein the new desired gait is generated by using the correction target that has been corrected.

2. The gait generator of a legged mobile robot according to claim 1, wherein the model manipulated variable determining means is a means for estimating, as the model manipulated variable, a disturbance force other than a force acting on an object from the robot out of a force acting on an actual object.

3. A gait generator for generating a desired gait for causing the legged mobile robot equipped with a plurality of leg bodies extended from its body to perform an operation for moving an external object while actuating the robot such that the desired gait is followed, the gait generator comprising:

an object dynamic model representing a relationship between motions of the object and forces acting on the object;

a disturbance force estimating means for estimating a disturbance force, other than a force acting on the object from the robot, of a force acting on an actual object while observing a behavior of the actual object when actuating the robot such that the desired gait is followed;

a motion state amount provisionally determining means for provisionally determining a desired motion state amount that defines a desired motion trajectory of the object in a predetermined period after the present time on the basis of at least the moving plan of the object when generating a new desired gait to be followed by the robot;

an object action force trajectory provisionally determining means for provisionally determining an object action force desired trajectory, which is a desired trajectory of a force to be applied to the object in the predetermined period after the present time, by inputting the provisionally determined desired motion state amount to the object dynamic model and by using the object dynamic model;

a between-robot-and-object action force trajectory provisionally determining means for provisionally determining the trajectory of a desired action force between the robot and the object, which is a desired trajectory of an action force between the object and the robot in the predetermined period on the basis of the provisionally determined object action force desired trajectory and the estimated disturbance force;

a robot gait provisionally generating means for provisionally determining a gait parameter to be used to generate a desired gait of the robot on the basis of at least a desired motion trajectory of the object defined by the provisionally determined desired motion state amount and the provisionally determined trajectory of the desired action force between the robot and the object, and for provisionally generating a desired gait of the robot in the predetermined period by using the provisionally determined gait parameter, the estimated disturbance force, and the provisionally determined desired action force between the robot and the object;

a restrictive condition determining means for determining whether a predetermined geometric restrictive condition related to at least one of the object and the robot is satisfied on the basis of the desired motion trajectory of the object defined by the provisionally determined desired motion state amount and a motion trajectory of the provisionally generated desired gait of the robot; and a correcting means for selecting at least one of the moving plan, the provisionally determined gait parameter, and the desired motion trajectory of the object that is defined by the provisionally determined desired motion state amount as a correction target and for correcting the correction target so as to satisfy the geometric restrictive condition if the geometric restrictive condition is not satisfied, wherein the new desired gait is generated by using the correction target that has been corrected.

4. The gait generator of a legged mobile robot according to claim 1, wherein the gait parameter to be corrected by the correcting means includes a predicted landing position of a leg body of the robot.

5. The gait generator of a legged mobile robot according to claim 2, wherein the gait parameter to be corrected by the correcting means includes a predicted landing position of a leg body of the robot.

* * * * *